United States Patent
Pitalúa García et al.

(10) Patent No.: US 11,856,093 B2
(45) Date of Patent: Dec. 26, 2023

(54) METHOD FOR SPACETIME-CONSTRAINED OBLIVIOUS TRANSFER

(71) Applicants: Centre National de la Recherche Scientifique, Paris (FR); UNIVERSITÉ DE PARIS, Paris (FR)

(72) Inventors: Damián Pitalúa García, Cambridge (GB); Iordanis Kerenedis, Paris (FR)

(73) Assignees: CENTRE NATIONAL DE LA RECHERCHE SCIENTIFIQUE (CNRS), Paris (FR); UNIVERSITÉ PARIS CITÉ, Paris (FR)

( * ) Notice: Subject to any disclaimer, the term of this patent is extended or adjusted under 35 U.S.C. 154(b) by 607 days.

(21) Appl. No.: 17/043,300

(22) PCT Filed: Mar. 29, 2019

(86) PCT No.: PCT/IB2019/000426
§ 371 (c)(1),
(2) Date: Sep. 29, 2020

(87) PCT Pub. No.: WO2019/186279
PCT Pub. Date: Oct. 3, 2019

(65) Prior Publication Data
US 2021/0021414 A1    Jan. 21, 2021

Related U.S. Application Data

(60) Provisional application No. 62/650,791, filed on Mar. 30, 2018.

(51) Int. Cl.
*H04L 9/08* (2006.01)
*G06N 10/00* (2022.01)

(52) U.S. Cl.
CPC ........... *H04L 9/0852* (2013.01); *G06N 10/00* (2019.01); *H04L 2209/46* (2013.01); *H04L 2209/50* (2013.01)

(58) Field of Classification Search
CPC ............... H04L 9/0852; H04L 2209/46; H04L 2209/50; H04L 9/0662; G06N 10/00
See application file for complete search history.

(56) References Cited

U.S. PATENT DOCUMENTS

| | | | |
|---|---|---|---|
| 7,184,555 B2 | 2/2007 | Whaley et al. | |
| 8,171,051 B2 * | 5/2012 | Fattal | H04L 9/0852 707/688 |

(Continued)

OTHER PUBLICATIONS

International Search Report issued in Application No. PCT/IB2019/000426, dated Aug. 30, 2019 (3 pages).

(Continued)

*Primary Examiner* — Baotran N To
(74) *Attorney, Agent, or Firm* — Osha Bergman Watanabe & Burton LLP

(57) ABSTRACT

A method for performing spacetime-constrained oblivious transfer between various laboratories of a first party A and various laboratories of a second party B. The method includes providing the spacetime-constrained oblivious transfer to satisfy various conditions. The method further includes encoding, by the laboratories of the first party A, various messages in a quantum state selected from various non-orthogonal quantum states. The method further includes transmitting, by the laboratories of the first party A, the quantum state to a first laboratory of the second party B. The method further includes applying, by the first laboratory of the second party B, a quantum measurement on the quantum state to obtain a classical measurement outcome. The method further includes transmitting, by the first laboratory of the second party B, the classical measurement outcome to the laboratories of the second party B.

15 Claims, 13 Drawing Sheets

(56) References Cited

U.S. PATENT DOCUMENTS

| | | |
|---|---|---|
| 8,897,449 B1 | 11/2014 | Broadbent |
| 10,715,319 B2 | 7/2020 | Pital a Garcia |
| 2002/0106084 A1 | 8/2002 | Azuma et al. |
| 2006/0045269 A1 | 3/2006 | Freedman et al. |
| 2009/0012938 A1 | 1/2009 | Lloyd et al. |
| 2010/0094842 A1* | 4/2010 | Fattal .................. H04L 9/0852 707/E17.131 |
| 2010/0150349 A1 | 6/2010 | Choi et al. |
| 2018/0287788 A1* | 10/2018 | Pitalúa García ...... H04L 1/0618 |
| 2020/0259800 A1* | 8/2020 | Masny .................. H04L 9/3242 |
| 2022/0045994 A1* | 2/2022 | Masny .................. H04L 9/3073 |

OTHER PUBLICATIONS

Written Opinion issued in International Application No. PCT/IB2019/000426, dated Aug. 30, 2019 (3 pages).

Pitalúa-García, D.; "Spacetime-constrained oblivious transfer;" Physical Review A; vol. 93; No. 6; Sep. 12, 2018; XP055613532 (9 pages).

Kent A.; "Location-Oblivious Data Transfer with Flying Entangled Qudits," arxiv.org, Cornell University Library; Feb. 14, 2011; XP080498949 (5 pages).

Lo H.; "Insecurity of quantum secure computations;" Physical Review A; vol. 56; No. 2; Aug. 1997 (9 pages).

Nielsen M. et al.; "Quantum Computation and Quantum Information;" Cambridge University Press; 10th Anniversary Edition; 2010 (704 pages).

Kent A.; "Quantum Tasks in Minkowski Space;" University of Cambridge; Apr. 2012 (17 pages).

Pitalúa-García, D.; "Spacetime-constrained oblivious transfer;" Physical Review A; vol. 93, 062346; 2016 (8 pages).

* cited by examiner

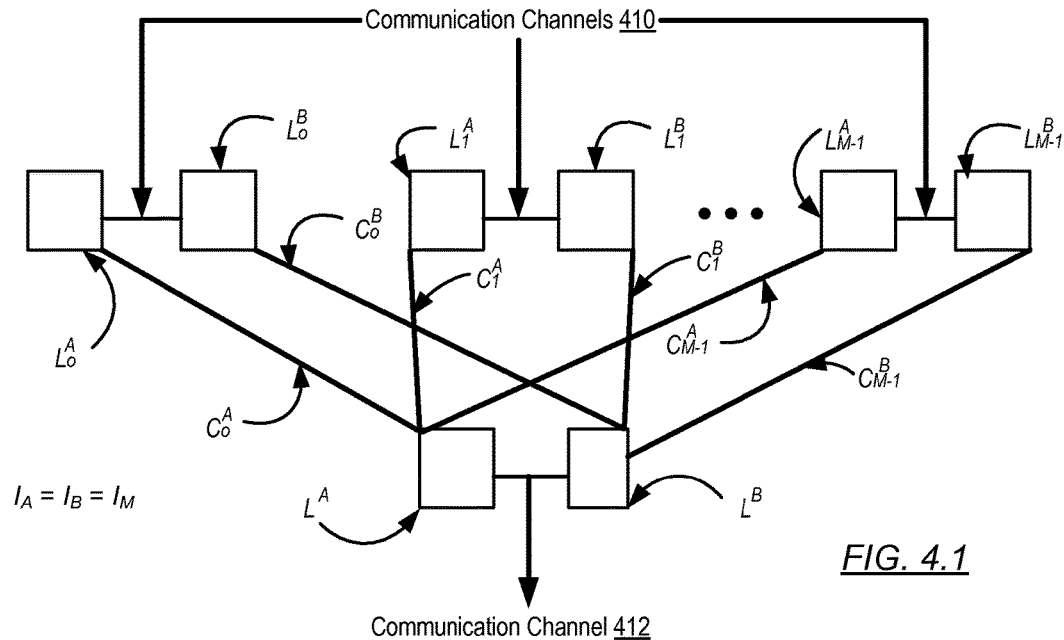
FIG. 4.1
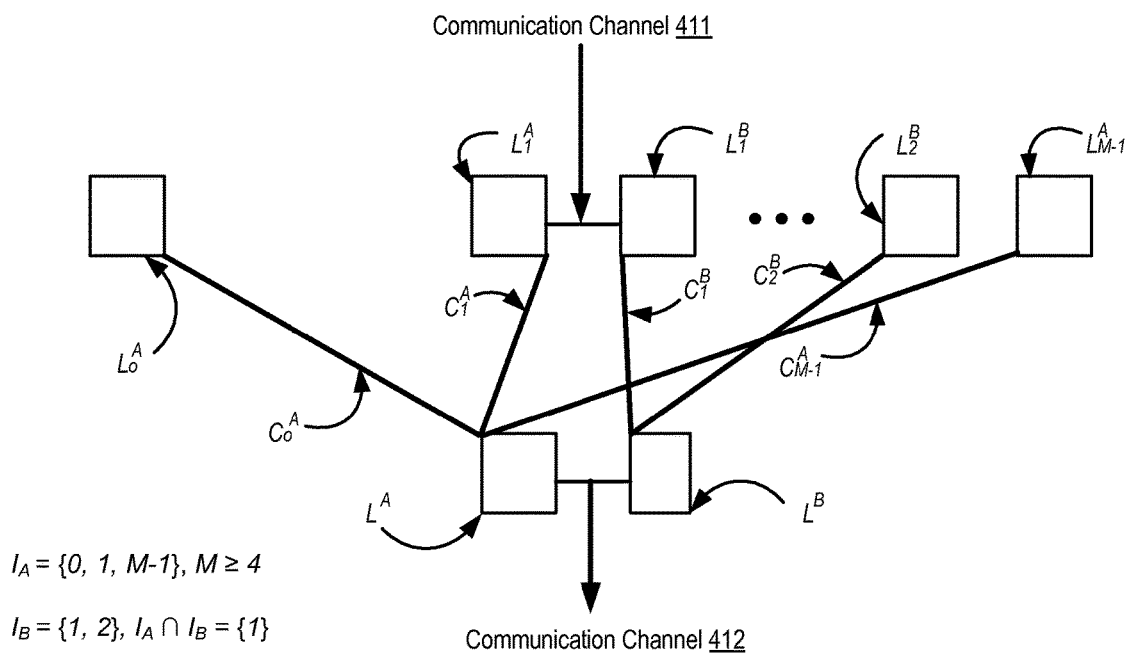
FIG. 4.2

METHOD FOR SPACETIME-CONSTRAINED OBLIVIOUS TRANSFER

CROSS-REFERENCE TO RELATED APPLICATIONS

This application claims the benefit of U.S. Provisional Application 62/650,791 filed on Mar. 30, 2018, and entitled "METHOD FOR SPACETIME-CONSTRAINED OBLIVIOUS TRANSFER", and PCT Application PCT/IB2019/000426 filed on Mar. 29, 2019, and entitled "METHOD FOR SPACETIME-CONSTRAINED OBLIVIOUS TRANSFER." The entire disclosures of both applications are hereby expressly incorporated by reference herein.

BACKGROUND

One-out-of-m oblivious transfer is useful in transactions between mistrustful parties A and B, where party A has a secret database with m entries and party B requests one of the m entries. Party B may be guaranteed the secrecy of its choice, and party A may be guaranteed that party B can only obtain one entry of its database. One-out-of-m oblivious transfer enables the implementation of other complex cryptographic tasks such as secure multi-party computation. Current implementations of one-out-of-m oblivious transfer fall into two broad categories. The first category is based on the processing and transmission of classical information. The second category relies on the processing and transmission of quantum systems. Both categories are considered non-relativistic.

The security of the first category of non-relativistic implementations of one-out-of-m oblivious transfer is based on the assumed difficulty of solving some mathematical problems, for example, the problem of finding the factors of large integer numbers. With the progressive development of more powerful computers, and better computing algorithms, solving mathematical problems that once were thought difficult may become less difficult, thereby potentially making these implementations vulnerable. The security of the second category of non-relativistic implementations of one-out-of-m oblivious transfer is based on assumptions on the quantum technologies that are accessible to the parties. With the development of better quantum technologies these implementations become vulnerable too.

SUMMARY

In general, in one aspect, the disclosed technology relates to a method for performing spacetime-constrained oblivious transfer between a plurality of laboratories of a first party A and a plurality of laboratories of a second party B. The method includes providing the spacetime-constrained oblivious transfer to satisfy a first condition by a first spacetime region and a second spacetime region that there does not exist any causal curve in spacetime that connects any spacetime point of the first spacetime region to any spacetime point of the second spacetime region. The method further includes encoding, by the plurality of laboratories of the first party A, a first plurality of messages in a quantum state selected from a plurality of non-orthogonal quantum states; transmitting, by the plurality of laboratories of the first party A, the quantum state to a first laboratory of the second party B; applying, by the first laboratory of the second party B, a quantum measurement on the quantum state to obtain a classical measurement outcome; transmitting, by the first laboratory of the second party B, the classical measurement outcome to a plurality of laboratories of the second party B; providing the spacetime-constrained oblivious transfer to satisfy a second condition selected from a group consisting of a condition (2.1) and a condition (2.2). The condition (2.1) states that a plurality of laboratories of the second party B receive, in the causal past of at least one spacetime point of the first spacetime region, a second plurality of messages comprising information about the quantum state from the plurality of laboratories of the first party A, and the classical measurement outcome obtained by the first laboratory of the second party B; a plurality of laboratories of the second party B use the classical measurement outcome received from the first laboratory of the second party B and the messages received from the plurality of laboratories of the first party A to decode, in a plurality of spacetime regions comprising the first spacetime region, a first message from the first plurality of messages encoded by the plurality of laboratories of the first party A; no laboratory among the plurality of laboratories of the second party B can decode, in the second spacetime region, a second message from the first plurality of messages encoded by the plurality of laboratories of the first party A. The condition (2.2) states that no laboratory among the plurality of laboratories of the second party B receive, in the causal past of any spacetime point of the first spacetime region, any message comprising information about the quantum state from the plurality of laboratories of the first party A and no laboratory among the plurality of laboratories of the second party B can decode, in the first spacetime region, any message from the first plurality of messages encoded by the plurality of laboratories of the first party A.

Other aspects will be apparent from the following description and the appended claims.

BRIEF DESCRIPTION OF DRAWINGS

FIGS. 4.1 and 4.2 schematically show examples of systems for spacetime-constrained oblivious transfer (SCOT) in accordance with one or more embodiments.

DETAILED DESCRIPTION

Figure 1:
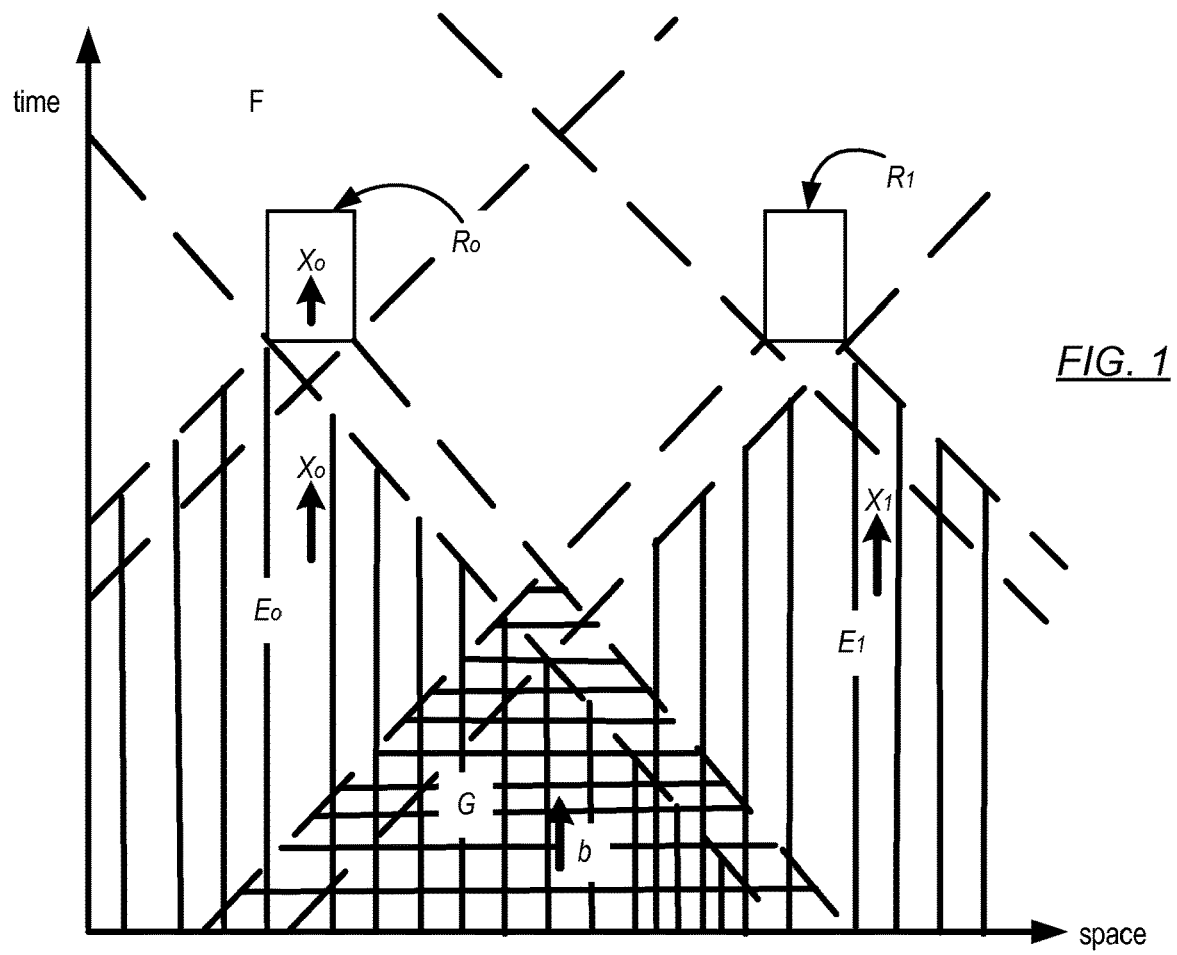
FIG. 1 shows a two-dimensional spacetime diagram in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner. All combinations are contemplated herein.

In general, embodiments provide a method for spacetime-constrained oblivious transfer. Spacetime-constrained oblivious transfer (SCOT) is a variant of the cryptographic task of one-out-of-m oblivious transfer in which relativistic signaling constraints are imposed. From the imposition of relativistic signaling constraints and the use of quantum systems, various embodiments may provide unconditional security.

One-out-of-m oblivious transfer is useful in transactions between mistrustful parties A ("Alice") and B ("Bob"), where Alice has a secret database with m entries and Bob requests one of the m entries. More specifically, Alice has m messages $x_0, x_1, \ldots x_{m-1}$ initially secret to Bob, for some integer m≥2. Bob has a number $b \in I_m \equiv \{0, 1, \ldots, m-1\}$ initially secret to Alice. In what follows, $I_m$ denotes the set $I_m \equiv \{0, 1, \ldots, m-1\}$, for any integer m≥2. As a result of the one-out-of-m oblivious transfer protocol Bob obtains $x_b$. Bob may obtain the secrecy of his choice, and Alice may be guaranteed that Bob can only obtain one entry of her database. In other words, two security conditions must be fulfilled by a one-out-of-m oblivious transfer protocol. First, Alice cannot learn Bob's input b, and second, Bob can only obtain one of Alice's messages. One-out-of-m oblivious transfer may, thus, be useful in transactions between mistrustful parties Alice and Bob, where Alice has a secret database with m entries. One-out-of-m oblivious transfer enables the implementation of other complex cryptographic tasks such as secure multi-party computation.

Methods to implement one-out-of-m oblivious transfer generally fall in two broad categories. One category is based on protocols in which Alice and Bob process classical information and communicate classical messages between near laboratories, one controlled by Alice, and the other one controlled by Bob. These protocols are denoted as classical non-relativistic. Another category is based on protocols in which in addition to classical information, Alice and Bob process quantum systems and transmit quantum systems between near laboratories, again, one controlled by Alice, and the other one controlled by Bob. These protocols are denoted as quantum non-relativistic.

In classical-cryptography methods, classical information is communicated and processed by classical computers. These methods base their security in mathematical and computational assumptions, for example, on the assumed difficulty of finding the prime factors of a large integer number. These methods become vulnerable with the development of better algorithms and more powerful computers. For example, in methods based on the assumed difficulty of the mathematical problem consisting in finding the prime factors of large integer numbers a dishonest party runs a factoring algorithm in a computer and outputs the prime factors after some time of computation. Universal quantum computers can obtain the prime factors of large integer numbers much faster than classical computers can do. Thus, with the eventual development of universal quantum computers these methods will become insecure.

Lo's no-go theorem states that there cannot be any classical or quantum non-relativistic protocol for one-out-of-m oblivious transfer that achieves unconditional security (H.-K. Lo, Phys. Rev. A, 56, 1154 (1997) ("Lo") is hereby incorporated by reference in its entirety). Lo's no-go theorem states in particular that if a protocol to implement one-out-of-m oblivious transfer is unconditionally secure against Alice, meaning that Alice cannot obtain any information about Bob's input b, then Bob can obtain the desired message $x_b$ by following the protocol honestly, and then by implementing a quantum operation on his quantum systems, he can obtain also Alice's message $x_k$, for any $k \in \{0, 1, \ldots, m-1\} \backslash \{b\}$.

Spacetime-constrained oblivious transfer (SCOT) is a cryptographic task where relativistic signaling constraints are imposed on the cryptographic task of one-out-of-m oblivious transfer. SCOT is implemented by two mistrustful parties A ("Alice") and B ("Bob"). Alice and Bob synchronize to a reference frame F in a spacetime that is at least approximately Minkowski, and specify m output spacetime regions $R_0, R_1, \ldots, R_{m-1}$ in the frame F, with the property that every pair of output spacetime regions is spacelike separated, i.e., there is not any pair of output spacetime regions that is connected by any causal curve in spacetime. Alice has m messages $x_0, x_1, \ldots x_{m-1}$ initially secret to Bob, for some integer m≥2. Bob has a number $b \in \{0, 1, \ldots, m-1\}$ initially secret to Alice. As a result of the SCOT protocol Bob obtains $x_b$ in the output spacetime region $R_b$. Two security conditions must be fulfilled by a SCOT protocol. First, Alice cannot learn Bob's input b anywhere in spacetime and second, Bob cannot obtain $x_i$ in $R_i$ for more than one i from the set $\{0, 1, \ldots, m-1\}$.

By defining SCOT in such a way that Bob must not obtain $x_i$ in $R_i$ for more than one i from the set $\{0, 1, \ldots, m-1\}$, where every pair from the output spacetime regions $R_0, R_1, \ldots, R_{m-1}$ is spacelike separated, SCOT evades Lo's no-go theorem.

SCOT is a cryptographic task in the setting of relativistic quantum cryptography. In the setting of relativistic quantum cryptography, the security of the cryptographic methods is guaranteed from the properties of quantum information and the causality of spacetime. In particular, the no-superluminal principle of relativity theory, stating that physical systems and information cannot travel faster than light is satisfied by quantum theory, and is exploited to guarantee security of the cryptographic tasks.

Although relativistic-quantum cryptography is usually considered for Minkowski spacetime or for curved spacetimes that are close to Minkowski, as near the Earth surface, it can apply to arbitrary curved spacetimes with well defined causal structure. It is assumed in relativistic quantum cryptography that, within the region of spacetime where the cryptographic tasks take place, there are not wormholes or other mechanisms to send signals faster than the speed of light, that the parties participating in the cryptographic tasks have a well description of the spacetime geometry and that they cannot substantially alter the geometry of spacetime. It is also assumed that each of the parties participating in the cryptographic tasks, here denoted as Alice and Bob, consist of various agents participating in the task at different points of spacetime. The parties may agree on a reference frame F, which may have global spacetime coordinates (t, x, y, z), where the first entry is temporal and the others are spatial, and where units are used in which the speed of light is unity. It is assumed that all the agents keep their frames synchronized to the agreed frame F during the whole implementation of the cryptographic tasks, and that they do this in a cryptographically secure way. In the case of mistrustful cryptography, which includes the task of SCOT, Alice's (Bob's) agents work in collaboration and trust each other, but Alice's agents do not trust Bob's agents and vice versa. Particularly, relativistic quantum cryptography, and various embodiments of the present invention, can be used in the spacetime on the Earth surface and its surroundings, including the region of satellites orbiting the Earth and beyond into the solar system.

SCOT is a variant of one-out-of-m oblivious transfer with relativistic signalling constraints, defined as follows. SCOT is implemented by two parties, denoted as Alice and Bob, each having one or more agents, who may control laboratories at different regions of spacetime. Alice and Bob agree on a reference frame F in spacetime, and on m spacetime regions $R_0, R_1, \ldots, R_{m-1}$ in the frame F, denoted as the output spacetime regions, with the property that for any pair of different numbers j, $k \in I_m$, $R_j$ and $R_k$ are not causally connected; i.e for any spacetime point P in $R_j$ and any spacetime point Q in $R_k$, there is not any causal curve connecting P with Q, which means that any physical system traveling at a speed not higher than the speed of light cannot leave the spacetime point P and arrive to the spacetime point Q and vice versa. Bob obtains an input number $b \in I_m$ in the spacetime region G, which may consist in the intersection of the causal pasts of at least one spacetime point of the output spacetime region $R_i$, for all $i \in I_m$. For $i \in I_m$, Alice obtains an input number $x_i$ in a spacetime region $E_i$; the spacetime region $E_i$ being, for example, the intersection of the causal pasts of all the spacetime points of $R_i$, or the causal past of a spacetime point of $R_i$, which may be previously agreed by Alice ad Bob, for $i \in I_m$. A SCOT protocol works correctly if Bob obtains the message $x_b$ in the output spacetime region $R_b$. The SCOT method may allow for a small error in Bob's output: Alice and Bob may previously agree on a threshold for which Bob's output within the spacetime region $R_i$ is considered correct, for $i \in I_m$. A method or protocol to implement SCOT is said to be unconditionally secure if the two following conditions are satisfied: 1) if Bob follows the actions specified by the method honestly and Alice tries to cheat, Alice having access to various quantum technology, which may be arbitrarily advanced, Alice cannot obtain any information about Bob's input b anywhere in spacetime, i.e., the probability that Alice guesses b is 1/m or arbitrarily close to 1/m by taking some security parameter to be sufficiently large; and 2) if Alice follows the actions specified by the method honestly and Bob tries to cheat, Bob having access to quantum technology, which may be arbitrarily advanced, Bob cannot succeed in obtaining $x_i$ in $R_i$ (or a message $x_i'$ sufficiently close to $x_i$ satisfying a threshold previously agreed by Alice and Bob) for more than one i from the set $I_m$, unless with some probability that can be made very small by increasing some security parameter.

An illustration of the task of SCOT for the case m=2 is given in FIG. 1, in a reference frame F of a two-dimensional spacetime diagram in a spacetime that is Minkowski (or approximately Minkowski). FIG. 1 exemplifies the case in which Bob inputs b=0. The dotted lines represent light rays enclosing light cones. It can be observed from FIG. 1 that the output spacetime regions $R_0$ and $R_1$ are not causally connected. The spacetime region $E_i$ where Alice obtains her input $x_i$, for $i \in \{0,1\}$, are illustrated with vertical lines. The spacetime region G where Bob obtains his input b is illustrated with horizontal lines.

Figure 2:
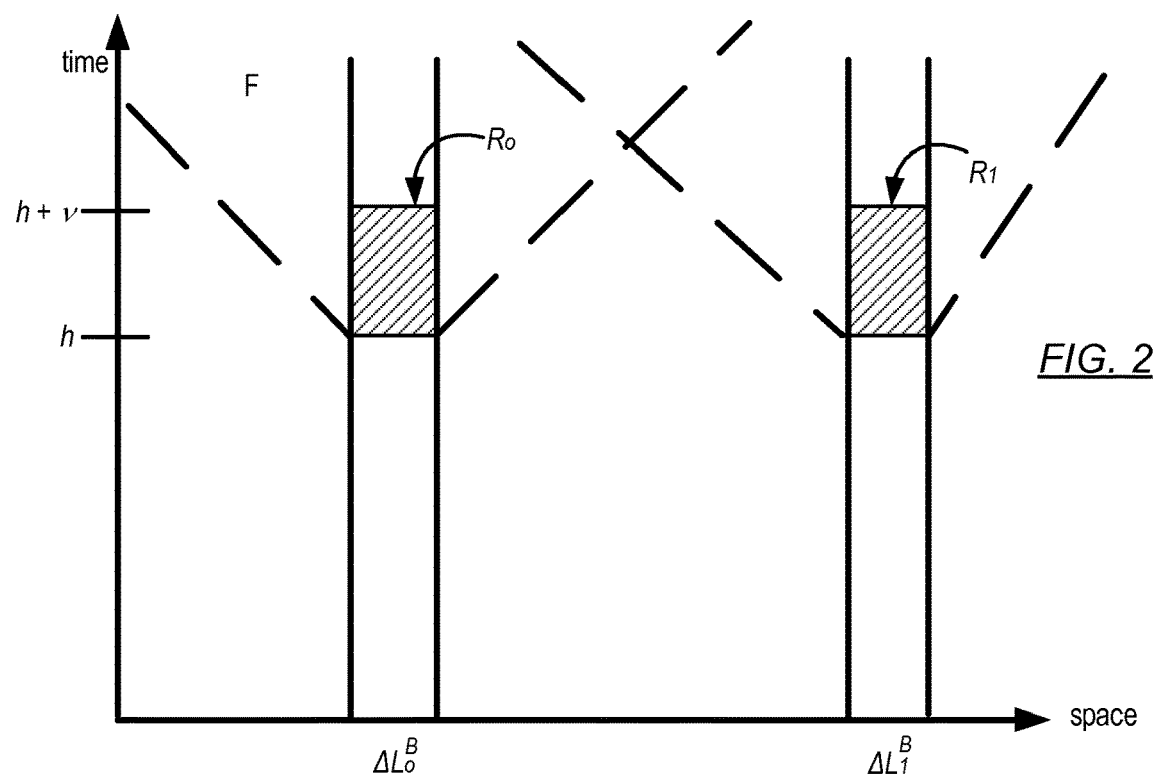
FIG. 2 shows a two-dimensional spacetime diagram in accordance with one or more embodiments.

The spacetime region $R_i$ can consist, for example, in the set of spacetime points that define the three-dimensional space coordinates $\Delta L_i^B$ of one of Bob's laboratories adjacent to the location $L_i$ within a time interval [h, h+v], that is, in the agreed reference frame F, $R_i = \{(t, x, y, z) | h \leq t \leq h+v, (x, y, z) \in \Delta L_i^B\}$, where v>0, for $i \in I_m$. In order to satisfy the condition that no pair of regions $R_i$ and $R_k$ are causally connected, the shortest time that light takes to travel between any spatial point in $\Delta L_i^B$ and any spatial point in $\Delta L_k^B$ must be greater than v, for all pair of different numbers i and k from the set $I_m$; for example, since the speed of light through vacuum is approximately 300 000 km/s, and since the spacetime geometry near the Earth surface is approximately Minkowski, by setting the pair of Bob's laboratories whose sets of spatial coordinates are $\Delta L_i^B$ and $\Delta L_k^B$ on (or near) the Earth surface with a straight line distance separation of at least 150 km, for all i, $k \in I_m$ with i≠k, and by setting the value of the time interval v to be shorter than 0.5 ms, the condition that no pair of spacetime regions from $R_0$, $R_1, \ldots, R_{m-1}$ are causally connected is provided. FIG. 2 illustrates this example for the case m=2 in a two dimensional spacetime diagram, in a spacetime that is Minkowski or approximately Minkowski, in a reference frame F, where the vertical lines represent the world lines of Bob's laboratories with space coordinates $\Delta L_0^B$ and $\Delta L_1^B$, where the gray areas represent the output spacetime regions $R_0$ and $R_1$, and where the dotted lines represent light rays.

SCOT may have the important property that it evades Lo's no-go theorem stating that one-out-of-m oblivious transfer cannot be achieved with unconditional security in the setting of quantum cryptography without relativistic signaling constraints. By defining SCOT so that Bob must not obtain $x_i$ in $R_i$ for more than one $i \in I_m$, where the spacetime regions $R_0, R_1, \ldots, R_{m-1}$ are pair-wise not causally connected, SCOT evades Lo's no-go theorem. SCOT can be achieved with unconditional security, without contradicting Lo's no-go theorem, because if Bob obtains $x_b$ in the spacetime region $R_b$ by following the protocol honestly then, in agreement with Lo's theorem, Bob is also able to obtain $x_k$ in another spacetime region $R'_k$, for any $k \in I_m \backslash \{b\}$, but due to the causality of spacetime, $R'_k$ must be necessarily in the causal future of $R_b$, which is consistent with the security definition of SCOT because the output spacetime regions $R_b$ and $R_k$ in SCOT are by definition not causally connected.

SCOT can have applications where, with high levels of security, a party Bob wants to learn an entry of a database from another party Alice, in some specific region of spacetime (e.g., at a specific location and at a specific time), while keeping his entry choice private from Alice, and by guaranteeing to Alice that if Bob access a first entry of her database in a first spacetime region, then Bob cannot access a second entry of her database in a second spacetime region that is spacelike separated from the first spacetime region. For example, potential applications of SCOT are in high frequency trading strategies (HFT) in the stock market, where transactions require high levels of security, and where transactions must be completed within very short time intervals (e.g. of half a millisecond). Other potential applications of SCOT correspond to situations where Alice and Bob own moving objects traveling at high speeds for which they want to keep their locations and trajectories secret from the other party, even though some information on their future trajectories must be disclosed in some situations, for example, if there is danger of collision.

Consider, for example, applications of SCOT in the stock market. Alice is a company that sells information about the stock market in real time in a set of different possible locations and Bob is a company that trades in the stock market using HFT strategies. Alice offers Bob one piece of her database $x_0, x_1, \ldots, x_{m-1}$, each being information on the stock market at the respective location $L_0, L_1, \ldots, L_{m-1}$ at real time. Each $L_i$ could be the location of a stock market in some part of the world, e.g. New York, Toronto, Paris, London, Brussels, etc. Bob pays Alice a fixed amount of money to obtain an entry $x_b$ in the location $L_b$ in real time. Bob requires that his choice b remains private from Alice, while Alice requires that Bob cannot access her entry $x_i$ in $L_i$ at real time, for more than one i from the set $I_m$. SCOT guarantees with unconditional security that Alice cannot learn Bob's choice b anywhere in spacetime and that within a time interval smaller than 0.5 ms, which is relevant for HFT strategies, Bob cannot obtain $x_i$ in $L_i$ and also $x_j$ in $L_j$ for any pair of different numbers i, j from the set $\{0, 1, \ldots, m-1\}$ if the distance between any pair of locations from the set $L_0, L_1, \ldots, L_{m-1}$ is at least 150 km, which is the maximum distance that light can travel in 0.5 ms, in the approximately Minkowski spacetime of the Earth surface.

SCOT can be applied to the problem of private communication of the trajectories of moving objects in case of danger of collision. Consider, for example, that Alice and Bob each own a satellite orbiting the Earth and that they want to avoid their satellites to collide without revealing unnecessary information about the location and programmed trajectory of their satellite to the other party. Alice and Bob can perform this task by implementing SCOT as follows. In a reference frame F agreed by Alice and Bob, let $\Delta\tau=[h, h+v]$ be a time interval and let $\{\Delta L_j^B\}_{j=0}^{m-1}$ be a set of regions of three-dimensional space known by Alice and Bob, such that Bob's satellite is programmed to be within $\Delta L_b^B$ in the time interval $\Delta\tau$, with $b \in I_m$ being unknown to Alice. For $i \in I_m$, Alice's input $x_i$ is such that if her satellite is programmed to pass within a neighborhood of $\Delta L_i^B$ within a given time interval $\Delta\tau'$ immediately after the time h+v in such a way that if b=i there is danger of collision between Alice's and Bob's satellites within the time interval $\Delta\tau'$ then $x_i$ indicates the programmed trajectory of Alice's satellite within the time interval $\Delta\tau'$. In this way, if Bob's satellite obtains Alice's message $x_b$ in $\Delta L_b^B$ within the time interval $\Delta\tau$, and if there is danger of collision, $x_b$ indicates the trajectory that Alice's satellite is programmed to follow within the time interval $\Delta\tau'$; Bob's satellite is then able to adapt its trajectory on time in order to avoid collision with Alice's satellite in the time interval $\Delta\tau'$. SCOT guarantees with unconditional security that Alice cannot learn Bob's input b, hence that Alice cannot learn the location of Bob's satellite, and that within the time interval $\Delta\tau$, Bob's satellite can only learn the programmed trajectory of Alice's satellite for the time interval $\Delta\tau'$ if there is danger of collision.

An illustration of SCOT applied to the problem described above is given in FIG. 3 in a two-dimensional spacetime diagram in the reference frame F. Spacetime is approximately Minkowski in the vicinities of the Earth surface. The diagonal dotted lines represent light rays, enclosing light cones. The small rectangles represent the space-time regions $\Delta L_j^B$ within the time interval $\Delta\tau=[h, h+v]$, for $j \in I_m$, where the world-line of Bob's satellite (320) may pass. The bigger double-lined rectangles represent the spacetime regions where Alice's and Bob's satellites may collide if b=i. Alice's satellite (310) sends encoded information $x_i$ about her programmed trajectory (311) within the time interval $\Delta\tau'$, using the SCOT method, in such a way that this information is received in the space region $\Delta L_i^B$ within the time interval $\Delta\tau$, and decoded by Bob's satellite (320) there if Bob has input b=i to the SCOT method, i.e. if there is danger of collision between Alice's and Bob's satellite (310, 320).

Figure 3:
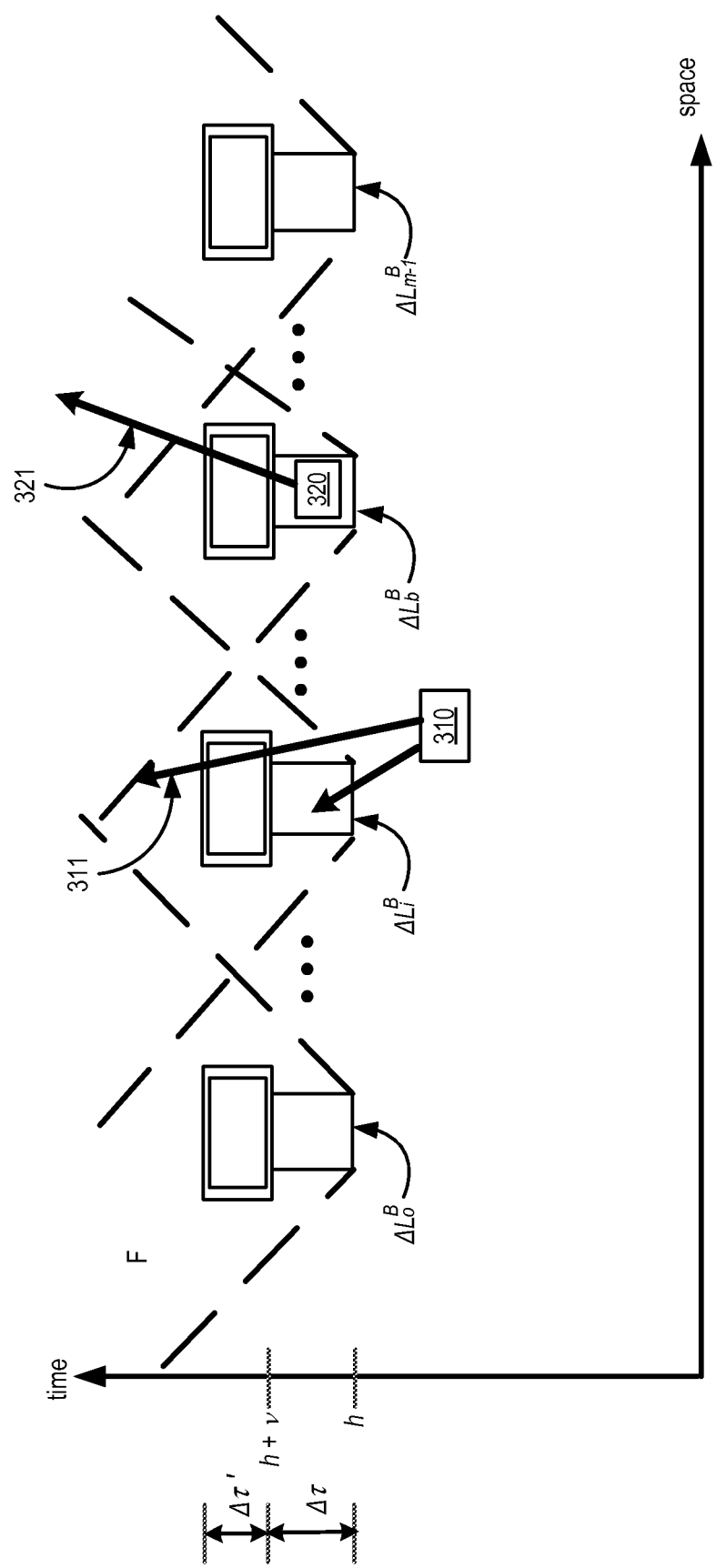
FIG. 3 shows a two-dimensional spacetime diagram in accordance with one or more embodiments.

With respect to FIG. 3, even if Alice and Bob do not perform SCOT, and Alice's satellite (310) simply broadcasts its information trajectory $x_i$ to the three-dimensional space region $\Delta L_i^B$ within the time interval $\Delta\tau$, if it is programmed to pass within a neighborhood of $\Delta L_i^B$ within the time interval $\Delta\tau'$ immediately after the time h+v, a satellite of Bob whose location is in $\Delta L_i^B$ within the time interval $\Delta\tau$ would receive $x_i$. More precisely, in this case, Alice would not learn Bob's input b—indicating the three-dimensional region $\Delta L_b^B$ of the location of Bob's satellite (320) within the time interval $\Delta\tau$—and within the time interval $\Delta\tau$, Bob's satellite (320) can only learn the programmed trajectory (311) of Alice's satellite (310) for the time interval $\Delta\tau'$ if there is danger of collision. However, the method using SCOT illustrated in FIG. 3 provides, additionally, that satellites of a third party, Charlie, which may also be within the three dimensional region of space $\Delta L_i^B$ within the time interval $\Delta\tau$ will not be able to decode Alice's laboratory trajectory information $x_i$, even if it is able to receive messages from Alice's corresponding satellite, if Charlie does not perform SCOT with Alice, as Bob does.

It would seem that the following simpler method in which Alice and Bob share secret key material achieves the same security conditions than the method based on SCOT discussed above. Consider that Alice and Bob share private key material that is secret from Charlie or any other party. Alice's satellite (310) may simply encode her information trajectory $x_i$ using the key material shared with Bob, for example, using the one-time pad, and broadcast this to the space region $\Delta L_i^B$ within the time interval $\Delta\tau$, if it is programmed to pass within a neighborhood of $\Delta L_i^B$ within the time interval $\Delta\tau'$ immediately after the time h+v. This method achieves the following: 1) Bob decodes the programmed trajectory (311) of Alice's satellite (310) for the time interval $\Delta\tau'$ only if there is danger of collision; 2) Alice cannot learn Bob's input b; and 3) Charlie, or any third party cannot learn any information about the programmed trajectory (311) of Alice's satellite (310).

However, various embodiments of the SCOT method of the present invention may be more powerful and have advantages over the previously described method using shared keys in more complex situations. For example, consider that in addition to a satellite, Bob has N other devices that are capable of traveling through space. N may be much smaller than m, and particularly N may satisfy N+1<m; or N may satisfy N+1≥m. These extra devices may as well be other satellites, but may be labeled as 'devices' in order to distinguish them from the particular Bob's satellite (320). It could be that Bob's satellite (320) is in general difficult to maneuver; hence, it requires a sufficiently long time to change its trajectory (321) in an emergency situation in which it is about to collide, with Alice's satellite (310) for example. On the other hand, Bob's flying devices could maneuver their trajectories much more easily, perhaps because they are much smaller. Some embodiments include a situation in which Bob wants to know Alice's programmed trajectory (311) for the time interval $\Delta\tau'$ in case that there is danger of collision with Bob's satellite (320) within the time interval $\Delta\tau'$. Bob does not worry about his devices colliding with Alice's satellite (310), perhaps because these can maneuver their trajectories much better and hence avoid collision better. Bob could spread his N devices along space, so that they are at N of the m space regions $\Delta L_i^B$ within the time interval $\Delta\tau$, trying to find the position and trajectory (311) of Alice's satellite (310). Assume that Alice's satellite passes through the space region $\Delta L_i^B$ within the time interval $\Delta\tau$, for some $i \in \{0, 1, \ldots, m-1\}$. In the method discussed above in which Alice and Bob use shared secret keys, if any one of N Bob's devices is in $\Delta L_i^B$ within $\Delta\tau$, this device owned by Bob could decode Alice's information on her satellite's programmed trajectory (311) for the time interval $\Delta\tau'$. In particular, if N+1=m, with unit probability either Bob's satellite (320), or one of his devices, learns the programmed trajectory (311) of Alice's satellite for the time interval $\Delta\tau'$. This is a clear violation of the security condition for Alice, according to which only Bob's satellite (320) should learn the programmed trajectory (311) of Alice's satellite in case that there is danger of collision, i.e. if both Alice's and Bob's satellites are within the space region $\Delta L_i^B$ within the time interval $\Delta\tau$ (i.e. if b=i). However, the method based on SCOT may guarantee to Alice that Bob can only learn the programmed trajectory of her satellite for the time interval $\Delta\tau'$ if Bob has input the number b=i in the SCOT protocol, i.e. with probability 1/m if Bob has no prior information about i, independently of how many devices Bob can spread through space.

Previous methods to implement SCOT may require the secure transmission of quantum systems over distant laboratories by Bob, for example. Depending on the application, SCOT methods could require the spatial separation of the output spacetime regions $R_i$ to be considerably large in order to make their time lengths sufficiently large, which may require the transmission of quantum systems over long distances. For example, considering the output spacetime regions near the Earth surface described above, and illustrated in FIG. 2, some applications of SCOT might provide security for time intervals of v=1 ms while others might require v=10 ms, for example. Previous methods to implement SCOT may require the distance separation between locations $L_0, L_1, \ldots, L_{m-1}$ of Bob's laboratories to be at least 300 km in the former case and at least 3000 km in the latter, which means that at least one quantum channel must have a length of at least 150 km in the former case and of at least 1500 km in the latter (by setting the laboratory of Bob transmitting the quantum states at half distance between $L_0$ and $L_1$ in the case m=2).

Transmission of quantum states over long distances can be very expensive and challenging, and providing that the quantum channel is secure is even more challenging. For example, transmission of quantum states over long distances is usually done via optical fibre, with the quantum systems encoding the quantum states being photons. State-of-the-art optical fibre may have an attenuation of 0.142 db/Km, for example. This means, for example, that the transmission probability of a photon over an optical fibre of 1500 km is $10^{-1500(0.142)/10} = 5 \times 10^{-22}$. Thus, not only it is very expensive to establish and maintain optical fibre over long distances, but also, due to the great losses of photons in the fibre, a great number of photons must be generated in order to achieve a desired level of security, which may require impractically large times for the preparation, transmission and reception of the required number of photons.

Even for optical fibre of shorter length, which have higher transmission probabilities, where the required number of photons sent through the fibre to achieve a desired level of security could be generated in a reasonable time $\tau$, e.g., from a few seconds to several hours, this time could be too large to allow one of Bob's agents, agent $B_b$, to receive all the incoming photons and to measure them all within the small time interval v, which is of the order of a few milliseconds if Bob's laboratories are restricted to be on the Earth surface, unless Bob's agent $B_b$ has a quantum memory that is able to store all the received quantum states reliably during the time $\tau$. But quantum memories may have coherent times of the order of only a fraction of a second, for example. Therefore, for a broad range of applications in which the output spacetime regions $R_i$ are such that Bob's laboratories are very far apart, producing a great amount of losses of the transmitted quantum states through the quantum channels (e.g., optical fibre), previous SCOT methods that rely on the transmission of quantum states among Bob's laboratories may not be practical to implement with current technology.

The present invention overcomes the above difficulties, by introducing a method to implement SCOT that is practical to implement with current technology, where the communication over distant laboratories is only classical, and can be easily implemented, for example via internet channels, and where the transmission of quantum states takes place at a single location, between laboratories that can be as close as a few meters or a few centimetres, something which is relatively easy to implement in practice with current technology. Furthermore, some embodiments do not require quantum memories, and the quantum communication between adjacent laboratories is allowed to take an arbitrarily long time, while still giving Bob the freedom to choose his input b only slightly in the past of the output spacetime regions $R_i$.

Furthermore, some embodiments of the present invention consider the more general situation, with respect to previous SCOT methods, in which the number M of output spacetime regions $R_0, R_1, \ldots, R_{M-1}$ could be different to the number m of input messages by Alice $x_0, x_1, \ldots, x_{m-1}$. Moreover, some embodiments explicitly consider the possibility that Alice and Bob cannot access all the output spacetime regions $R_0, R_1, \ldots, R_{M-1}$, because they have a limited amount of laboratories that may be smaller than M, for example. This property of some embodiments of the present invention is in contrast with previous SCOT method where it is explicitly stated that Alice has m agents that are able to send information close to the output spacetime regions $R_0, R_1, \ldots, R_{m-1}$, and Bob has m agents receiving and processing information in, or close to, the output spacetime regions. This property of some embodiments of the present invention provides a broader range of applications than previous SCOT methods, which includes, for example, applications like the one illustrated in FIG. 3.

A. MAIN PART OF THE INVENTION

A.1 Description of the Method

The main part of some embodiments of the present invention consists in the following actions. For some integer M≥2, Alice and Bob specify M spacetime regions $R_0$, $R_1, \ldots, R_{M-1}$, denoted as the output spacetime regions, satisfying the property that there does not exist any causal curve in spacetime that connects any spacetime point of $R_i$ to any spacetime point of $R_j$, for any pair of different numbers i and j from the set $I_M = \{0, 1, \ldots, M-1\}$. Alice (Bob) has a laboratory $L^A$ ($L^B$) and a plurality of laboratories $L_i^A$ ($L_i^B$), for $i \in I_A$ ($i \in I_B$), where $I_A$ ($I_B$) is a non-empty subset of $I_M$ with all elements being different. For an integer m≥2, Alice encodes a string of m classical messages $r = (r_0, r_1, \ldots, r_{m-1})$ in a quantum state $|\Psi_r^s\rangle$ of a quantum system from a set of non-orthogonal quantum states $\{|\Psi_r^s\rangle r \in \Omega_{outcome}, s \in \Omega_{basis}\}$, where $\Omega_{outcome}$ is the set of possible values for the classical messages r and $\Omega_{basis}$ is the set of possible values for the classical labels s. The quantum state is transmitted to Bob's laboratory $L^B$ by the exchange of signals between the laboratories $L^A$ and $L^B$, which may include quantum and classical signals, via communication channels that may include classical and quantum channels. In some embodiments the laboratories $L^A$ and $L^B$ are close to each other during the transmission of the quantum state. The values of M and m may in general not be equal, but in various embodiments discussed below it holds that M=m.

The set of quantum states $\{|\Psi_r^s\rangle r \in \Omega_{outcome}, s \in \Omega_{basis}\}$, the probability distributions for $r \in \Omega_{outcome}$ and for $S \in \Omega_{basis}$ satisfy the following physical properties. First, for all $i \in I_m$ there exists a quantum measurement $M_i$ independent of s and independent of r that implemented on the quantum state $|\Psi_r^s\rangle$ gives a classical measurement outcome d, such that knowing d, the measurement $M_i$ that is implemented, and the label s it is possible to effectively decode the message $r_i$, or a message $r_i'$ that is very close to $r_i$ according to a predetermined threshold previously agreed by Alice and Bob, with a probability equal or very close to unity, for $r \in \Omega_{outcome}$, $s \in \Omega_{basis}$ and $i \in I_m$. Second, for any pair of different numbers i, j from the set $I_m$, for any quantum operation O independent of s and independent of r acting on the quantum state $|\Psi_r^s\rangle$ that produces at least two quantum systems $B_0$ and $B_1$, and for any sets of quantum measurements $\{\tilde{M}_0^s\}_{s \in \Omega_{basis}}$ and $\{\tilde{M}_1^s\}_{s \in \Omega_{basis}}$, the probability to obtain respective outcomes $r_i'$ and $r_j'$ that are respectively equal or very close to $r_i$ and $r_j$ according to a predetermined threshold, by respectively applying $\tilde{M}_0^s$ on $B_0$ and $\tilde{M}_1^s$ on $B_1$, is smaller than unity, which may be negligible, and which may decrease exponentially with n in embodiments in which $r_0, r_1, \ldots, r_{m-1}$ are strings of n bits.

The laboratory $L^B$ applies a quantum measurement $M_c$ on the quantum state and obtains a classical measurement outcome d, for some $c \in I_m$. The measurement outcome d is communicated via a communication channel $C_i^B$, of Bob, from the laboratory $L^B$ to Bob's laboratory $L_i^B$, for a plurality of numbers i from the set $I_B$. In some embodiments the communication channel $C_i^B$ is a classical channel, and may be secure and authenticated, for $i \in I_B$.

The value of s is communicated from the laboratory $L^A$ to Alice's laboratory $L_i^A$ via a communication channel $C_i^A$ of Alice, which may be a secure and authenticated classical channel, for $i \in I_A$.

The laboratory $L_i^A$ transmits the value of s within a spacetime region $Q_i$, wherein $Q_i$ satisfies the properties that it lies within the causal past of at least one spacetime point of the spacetime region $R_i$, and that there is not any causal curve in spacetime that connects any spacetime point of $Q_i$ to any spacetime point of the spacetime region $R_j$ for all $j \in I_M \setminus \{i\}$, for $i \in I_A$. Bob's laboratory $L_i^B$ receives the value of s within the causal past of at least one spacetime point of the spacetime region $R_i$, for $i \in I_A \cap I_B$. Bob's laboratory $L_i^B$ uses the values of s and d, and the label c of the implemented measurement $M_c$, to effectively decode a message $r_c'$ that is equal to the message $r_c$, or very close to $r_c$ according to a predetermined threshold, in the spacetime region $R_i$, or in the causal past of at least one spacetime point of $R_i$, for a plurality of numbers i from the set $I_A \cap I_B$.

Alice and Bob may agree on a reference frame F of global coordinates in spacetime in order to specify the output spacetime regions $R_0, R_1, \ldots, R_{M-1}$ in the frame F. Alice's and Bob's laboratories may keep their reference frames aligned to F during the whole implementation of the method; some embodiments may do this in a way that is cryptographically secure from the other party, for example, using GPS devices with the GPS signals being encrypted. For $i \in I_M$, Alice and Bob may agree on a spacetime region $Q_i$ where one of Alice's laboratories may transmit the value of s, satisfying the property described above that $Q_i$ lies within the causal past of at least one spacetime point of $R_i$ and that there is not any causal curve in spacetime that connects any spacetime point of $Q_i$ to any spacetime point of $R_j$ for all $j \in I_M \setminus \{i\}$, and for $i \in I_M$, or for $i \in I_A$.

Alice and Bob specify sets $I_A$ and $I_B$, with $k_A$ and $k_B$ elements respectively, where each of these sets is equal to the set $I_M$ or is a non-empty proper subset of $I_M$. As mentioned above, Alice has laboratories $L_i^A$ and Bob has laboratories $L_j^B$, for $i \in I_A$ and $j \in I_B$. The set $I_A$ is known by Alice and the set $I_B$ is known by Bob. In some embodiments, Alice knows $I_B$ or has some knowledge about $I_B$ (e.g, Alice knows the value of $k_B$), while in other embodiments Alice does not have any knowledge about $I_B$, except that it is a subset of $I_M$. Similarly, in some embodiments Bob knows $I_A$ or has some knowledge about $I_A$ (e.g, Bob knows the value of $k_A$), while in other embodiments Bob does not have any knowledge about $I_A$, except that it is a subset of $I_M$. For example, in some embodiments $I_A = I_B = I_M$, for which the discussion below is simplified. Furthermore, in some embodiments, Alice's laboratory $L_A$ is the laboratory $L_i^A$, for a $i \in I_A$; in which case, the laboratory $L^B$ may be the laboratory $L_i^B$, if $i \in I_B$.

FIGS. 4.1 and 4.2 illustrate examples of systems to implement some embodiments. FIG. 4.1 illustrates an example in which $I_A = I_B = I_M$. FIG. 4.2 illustrates an example in which M≥4, $I_A = \{0, 1, M-1\}$, $I_B = \{1, 2\}$, hence, $I_A \cap I_B = \{1\}$. The communication channel (412) between the laboratories $L^A$ and $L^B$ may transmit quantum and classical signals. For $i \in I_A \cap I_B$ (i=1 in FIG. 4.2) there exists a communication channel ((410) in FIG. 4.1, and (411) in FIG. 4.2) between the laboratories $L_i^A$ and $L_i^B$, which may be a classical channel from $L_i^A$ to $L_i^B$. For $i \in I_A$, Alice's laboratory $L_i^A$ may have a transmitter of signals (not shown). For $i \in I_B$, Bob's laboratory $L_i^B$ may have a receptor of signals (not shown). Thus, for $i \in I_A \cap I_B$, the transmitter of Alice's laboratory $L_i^A$ and the receptor of Bob's laboratory $L_i^B$ may work together as a communication channel to send signals from $L_i^A$ to $L_i^B$. For $i \in I_A$, there exists a communication channel $C_i^A$ between Alice's laboratories $L^A$ and $L_i^A$. Similarly, for $i \in I_B$, there exists a communication channel $C_i^B$ between Bob's laboratories $L^B$ and $L_i^B$. In some embodiments the communication channels $C_i^A$ and $C_j^A$ are classical, and may be secure and authenticated, for $i \in I_A$ and $j \in I_B$.

For the correct functioning of the embodiments described above, the worldlines in spacetime of Alice's and Bob's laboratories must satisfy some constraints. In order to transmit the value of s within the spacetime region $Q_i$, the worldline of Alice's laboratory $L_i^A$ must intersect $Q_i$, for $i \in I_A$. For $i \in I_A \cap I_B$, in order to receive the value of s within the causal past of at least one spacetime point of $R_i$, the worldline of Bob's laboratory $L_i^B$ must intersect the causal future of at least one spacetime point of $Q_i$ and the causal past of at least one spacetime point of $R_i$. In some embodiments the worldline of $L_i^B$ intersects the causal future of all spacetime points of $Q_i$ and the causal past of all spacetime points of $R_i$, for $i \in I_A \cap I_B$, e.g., for all $i \in I_B$. For a plurality of numbers i from the set $I_A \cap I_B$ that includes a number $b \in I_A \cap I_B$, in order for Bob to be able to effectively compute $r_c$ (or a message $r_c'$ very close to $r_c$ according to a predetermined threshold) in the spacetime region $R_i$, the worldline in spacetime of Bob's laboratory $L_i^B$ must intersect the spacetime region $R_i$. In one or more embodiments, the worldline of $L_i^B$ intersects $R_i$ for all $i \in I_B$.

In order for Bob to be able to effectively compute $r_c$ in a spacetime region $R_b$, for some $b \in I_M$, the quantum state $|\Psi_r^s\rangle$ must be transmitted to Bob's laboratory $L^B$ within the causal past of at least one spacetime point of $R_b$, hence, the worldline of $L^B$ must intersect the causal past of at least one spacetime point of $R_b$. In order to give Bob the freedom of effectively computing $r_c$ (or a message $r_c'$ very close to $r_c$ according to a predetermined threshold) in $R_i$ for any $i \in I_B$, it may be a feature that $|\Psi_r^s\rangle$ is transmitted to $L^B$ within the intersection of the causal past of at least one spacetime point of $R_i$, for all $i \in I_B$, hence, that the worldline of $L^B$ intersects the causal past of at least one spacetime point of $R_i$, for all $i \in I_B$. For this reason, in some embodiments the worldline of Alice's laboratory $L^A$ also intersects the causal past of at least one spacetime point of $R_i$, for all $i \in I_B$. In order to have complete freedom on the output spacetime regions where Bob can effectively compute $r_c$ (or a message $r_c'$ very close to $r_c$ according to a predetermined threshold), in some embodiments the worldlines of the laboratories $L^A$ and $L^B$ intersect the causal past of at least one spacetime point of $R_i$, for all $i \in I_M$, and the quantum state $|\Psi_r^s\rangle$ is transmitted to Bob's laboratory $L^B$ within the intersection of the causal pasts of at least one spacetime point of $R_i$ for all $i \in I_M$.

Figure 5:
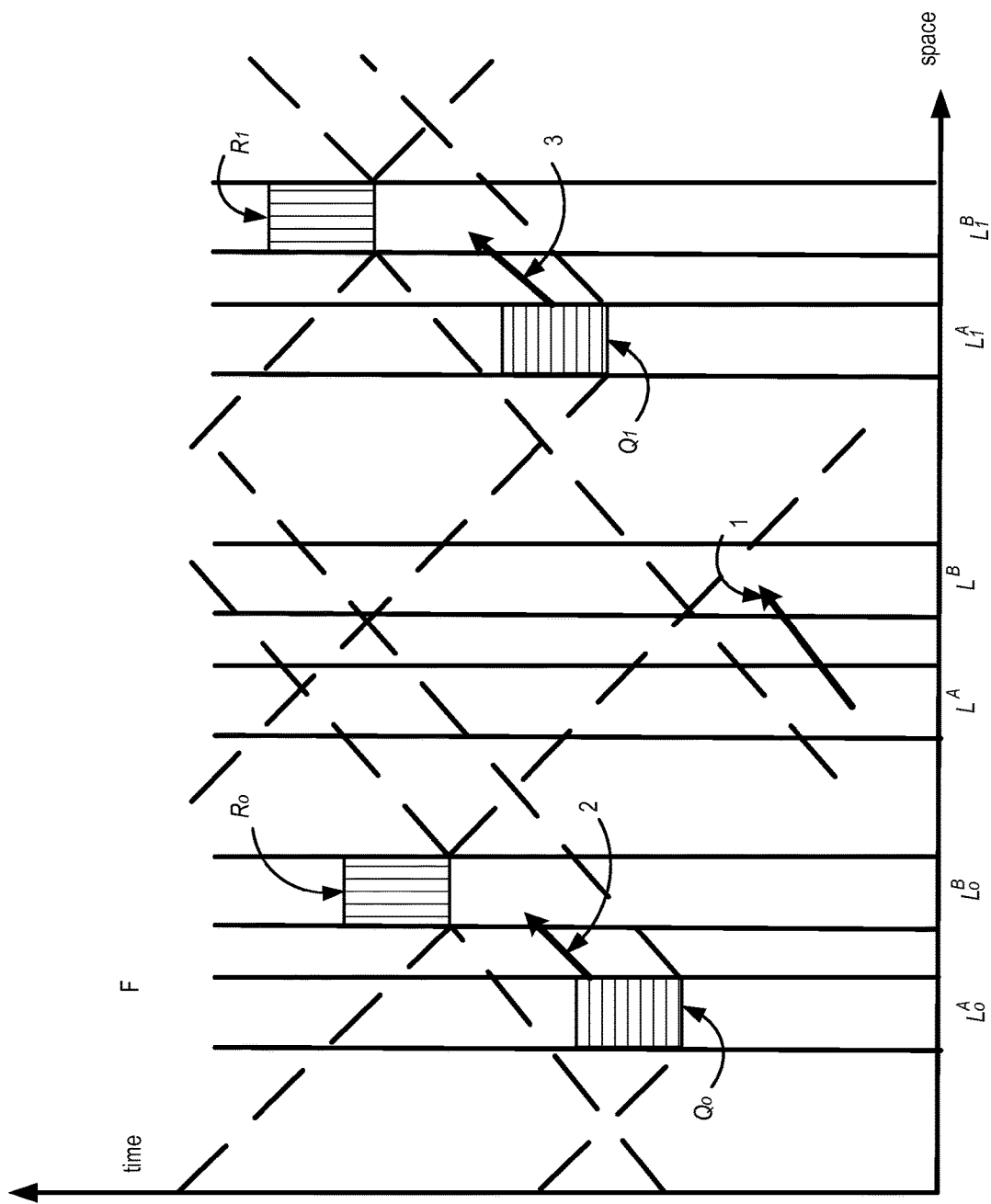
FIG. 5 shows a two-dimensional spacetime diagram in accordance with one or more embodiments.

FIG. 5 illustrates an example of the spacetime constraints discussed above in accordance with one or more embodiments. In particular, FIG. 5 illustrates the case where M=2 with $I_A = I_B = \{0,1\}$ in a two-dimensional spacetime diagram in a spacetime that is Minkowski, or approximately Minkowski, in a reference frame F. The worldlines of Alice's laboratories $L^A$, $L_0^A$, $L_1^A$, and of Bob's laboratories $L^B$, $L_0^B$, $L_1^B$, are illustrated with the long rectangles. For $i \in \{0,1\}$, the spacetime region $Q_i$ where Alice's laboratory $L_i^A$ transmits the value of s is represented by the small rectangle filled with horizontal lines. For $i \in \{0,1\}$, the output spacetime region $R_i$ is represented by the small rectangle filled with vertical lines. The dotted lines represent light rays, enclosing light cones. As shown, there is not any causal curve in spacetime connecting any spacetime point of $R_0$ with any spacetime point of $R_1$. Further, the worldlines of the laboratories $L^A$ and $L^B$ intersect the causal pasts of at least one spacetime point of $R_0$ and of at least one spacetime point of $R_1$, and in fact intersect the causal pasts of all spacetime points of $R_0$ and of all spacetime points of $R_1$. The transmission of the quantum state $|\Psi_r^s\rangle$ to Bob's laboratory $L^B$ is represented by the filled arrow with label 1, which occurs within the intersection of at least one spacetime point of $R_0$ and at least one spacetime point of $R_1$. For $i \in \{0,1\}$, $Q_i$ lies within the causal past of at least one spacetime point of $R_i$, in fact of all spacetime points of $R_i$; and there is not any causal curve in spacetime that connects any spacetime point of $Q_i$ to any spacetime point of $R_{\bar{i}}$, where $\bar{i}$ is the bit complement of i, i.e., $\bar{0}=1$ and $\bar{1}=0$. The transmission of s from Alice's laboratory $L_0^A$ ($L_1^A$) to Bob's laboratory $L_0^B$ ($L_1^B$) is represented by the filled arrow labelled by the number 2 (3), and is completed within the intersection of the causal future of at least one spacetime point of $Q_0$ ($Q_1$) and the causal past of at least one spacetime point of $R_0$ ($R_1$).

Figure 6:
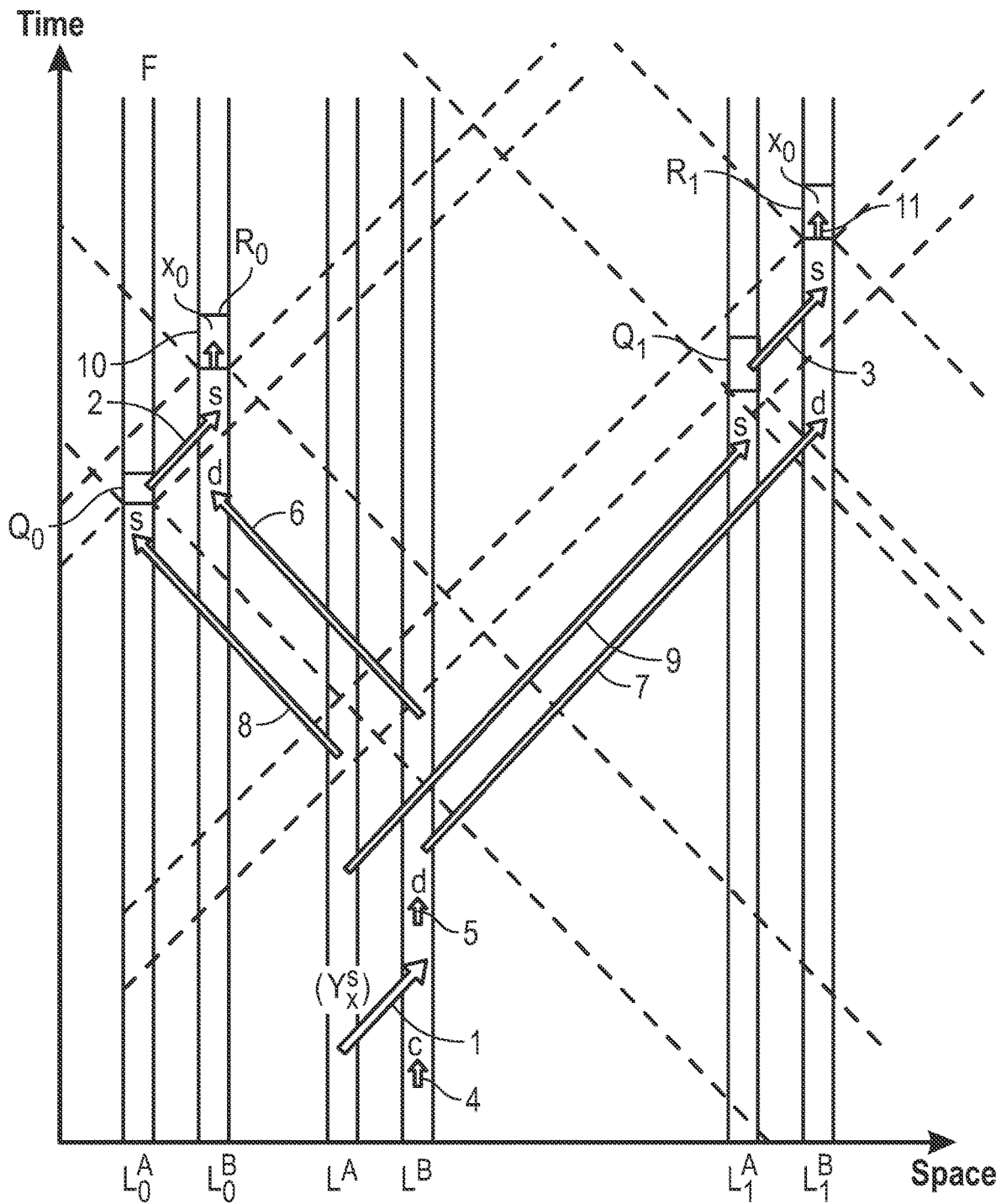
FIG. 6 shows a two-dimensional spacetime diagram in accordance with one or more embodiments.

FIG. 6 illustrates an implementation of the method for the simple case M=2 and $I_A = I_B = \{0,1\}$ in a two-dimensional spacetime diagram in a reference frame F of a spacetime that is Minkowski or approximately Minkowski. The worldlines of Alice's laboratories $L^A$, $L_0^A$ and $L_1^A$ are illustrated, as well as the worldlines of Bob's laboratories $L^B$, $L_0^B$ and $L_1^B$. In some embodiments Alice's (Bob's) laboratories are secure from Bob (Alice). The dotted lines represent light rays, enclosing light cones. The output spacetime regions $R_0$ and $R_1$ are illustrated, and can be seen to be not causally connected, as required. For $i \in \{0,1\}$, the spacetime region $Q_i$ is illustrated, and can be seen to satisfy the required properties that it lies within the causal past of a spacetime point of $R_i$ and that there is not any causal curve in spacetime that connects any spacetime point of $Q_i$ with any spacetime point of $R_{\bar{i}}$. The steps in the method are labelled by numbers, which do not represent a particular time order. The regions of spacetime where the steps are performed in order for the functioning of some embodiments, as previously discussed, are illustrated. The steps labelled by the numbers 1, 2 and 3 correspond to the steps illustrated in FIG. 5. The step 1 corresponds to the transmission of the quantum state $|\Psi_r^s\rangle$ to Bob's laboratory $L^B$ by the exchange of signals with Alice's laboratory $L^A$, which may include quantum and classical signals, through communication channels (not shown), which may include a quantum and a classical channel. In particular, the step 1 may include signals from $L^B$ to $L^A$ indicating that the quantum state was transmitted to a quantum system A. In some embodiments s is randomly (or close to randomly) generated from the set of possible values $\Omega_{basis}$, and $r = (r_0, r_1)$ is generated in a way such that $r_i$ is randomly (or close to randomly) generated from the set of possible values $\Omega_i$, for $i \in \{0,1\}$. The step 2 (3) corresponds to Alice's laboratory $L_0^A$ ($L_1^A$) communicating s to Bob's laboratory $L_0^B$ ($L_1^B$) in the causal past of a spacetime point of $R_0$ ($R_1$), through a communication channel (not shown), which begins with a transmission step from Alice's laboratory $L_0^A$ ($L_1^A$) in the spacetime region $Q_0$ ($Q_1$). The step 4 corresponds to Bob's laboratory $L^B$ generating an input $c \in \{0,1\}$. In the step of the transmission of the quantum state to Bob's laboratory $L^B$, in some embodiments any signals sent to Alice's laboratory $L^A$ do not leak any (or do not leak much) information about Bob's input c. The step 5 consists in implementing the quantum measurement $M_c$ on the transmitted quantum state, giving as outcome a classical message d. The step 6 (7) consists in communicating the outcome d from $L^B$ to Bob's laboratory $L_0^B$ ($L_1^B$) through a communication channel $C_0^B$ ($C_1^B$), not shown, which may be a secure and authenticated classical channel. The step 8 (9) consists in communicating s from Alice's laboratory $L^A$ to Alice's laboratory $L_0^A$ ($L_1^A$) through a communication channel $C_0^A$ ($C_1^A$), not shown, which may be a secure and authenticated classical channel. A step (not shown) in which the value of c is transmitted from Bob's laboratory $L^B$ to Bob's laboratory $L_i^B$ via the communication channel $C_i^B$ may be required if c is not previously known by $L_i^B$, for $i \in \{0,1\}$. For $i \in \{0,1\}$, after reception of d and s, and using the label c of the implemented measurement $M_c$, Bob's laboratory $L_i^B$ can compute and effectively obtain $r_c$ (or a message $r_c'$ that is very close to $r_c$ according to a predetermined threshold) in $R_i$, which corresponds to the steps 10 and 11. If Bob only requires to effectively obtain $r_c$ in $R_0$ ($R_1$), the steps 7 and 11 (6 and 10) may be discarded.

Figure 11:
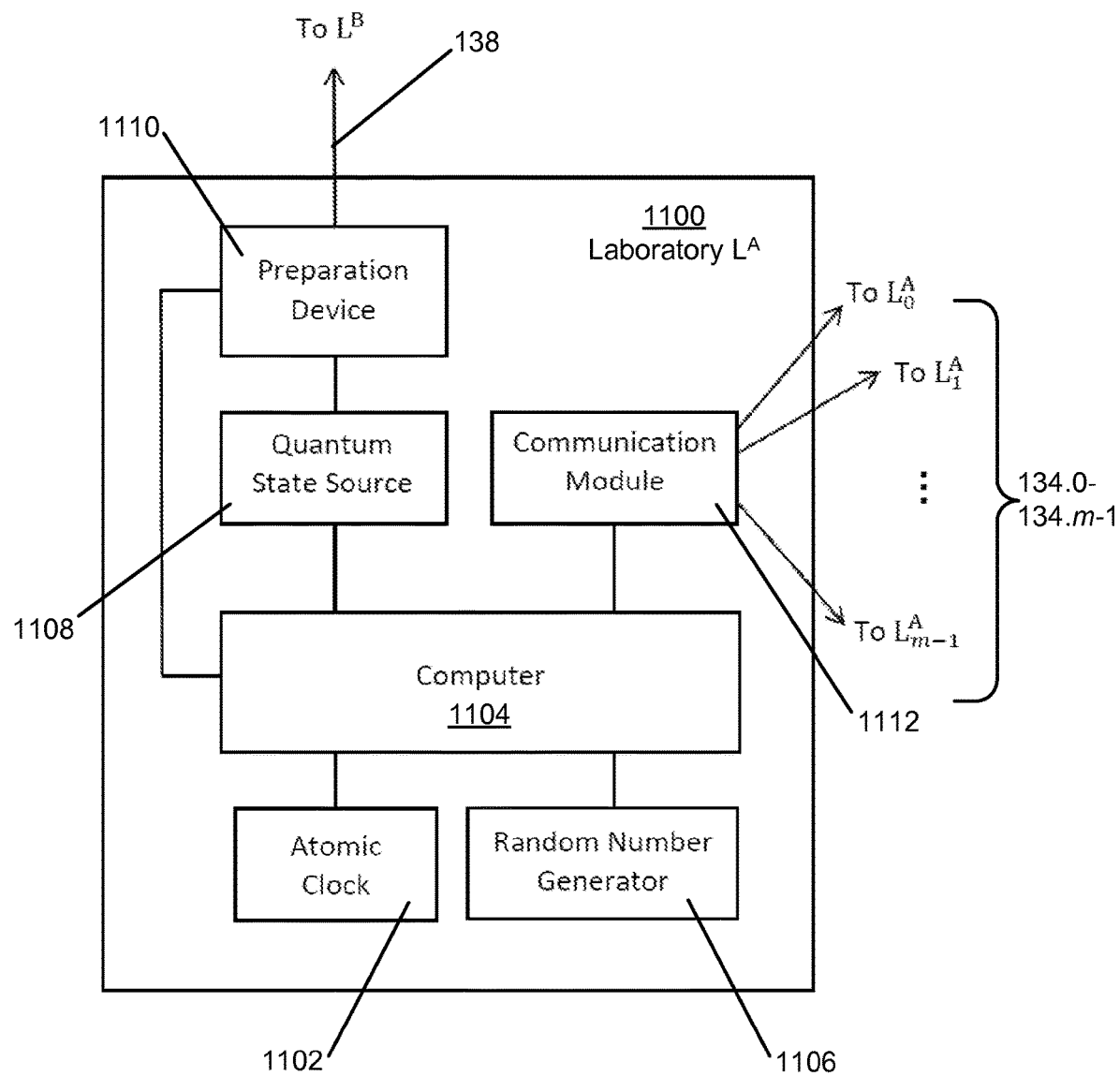
FIG. 11 schematically shows a laboratory $L^A$ in accordance with one or more embodiments.
Figure 12:
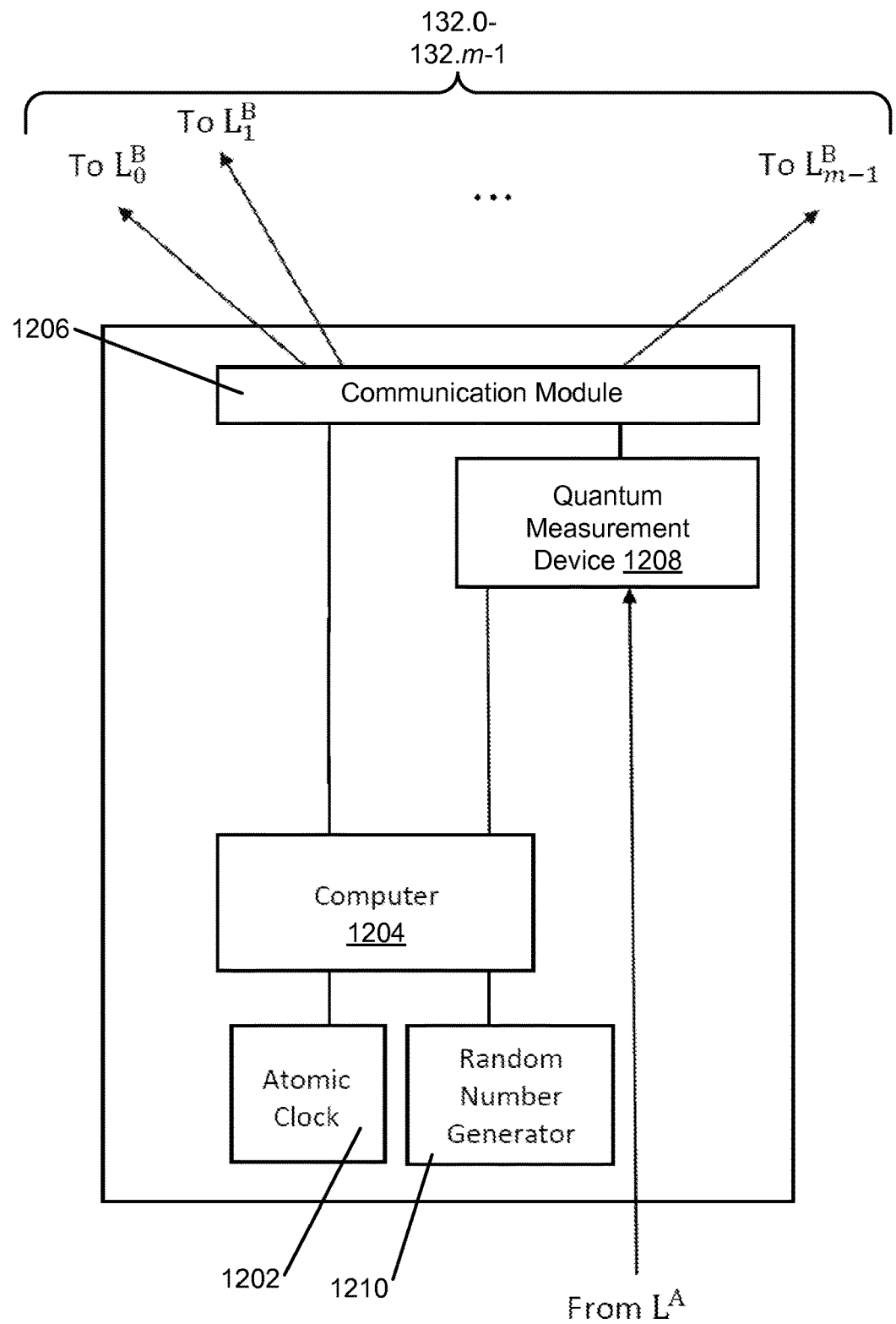
FIG. 12 schematically shows a laboratory $L^B$ in accordance with one or more embodiments.

Turning to FIGS. 11 and 12, FIGS. 11 and 12 illustrate various components that Alice's and Bob's laboratories may use in order to perform one or more embodiments, as well as the channels among them. Alice's laboratory $L^A$ may have a quantum source and a preparation device, and may have quantum measurement devices, among other components. Bob's laboratory $L^B$ includes a quantum measurement device and may include quantum sources and preparation devices, among other components. Additionally, Bob's laboratory $L^B$ may include further devices in order to detect and countermeasure security attacks from Alice's laboratory $L^A$, for example, in the case that the quantum systems transmitted through the quantum channel are photons, these may include intensity monitors at the input of the quantum channel, phase randomizers, and auxiliary photon detectors. Alice's laboratory $L^A$ may include similar devices too.

Turning to FIG. 11, a laboratory $L^A$, in accordance with one or more embodiments, is shown. The laboratory $L^A$ (1100) may be controlled by Alice. Laboratory $L^A$ (1100) may include an atomic clock (1102), a computer (1104), a random number generator (1106), a quantum state source (1108), a preparation device (1110) which is connected to the quantum channel (138) to the laboratory $L^B$ (as illustrated in FIGS. 4.1 and 4.2) and a communication module (1112), which is connected to the m secure and authenticated classical channels (134.0-134.m-1) to the laboratories $L_0^A$, $L_1^A$, ..., $L_{m-1}^A$, which may be controlled by Alice. The random number generator (1106) may generate the random numbers, which may be provided to the computer (1104), where they may be recorded. For i∈{0, 1, ..., m-1}, the computer (1104) may instruct the communication module (1112) to communicate the numbers $r_i$ and s to the laboratory $L_i^A$ via the secure and authenticated classical channels (134.0-134.m-1) between $L^A$ and $L_i^A$. The communication module (1112) may be similar to the communication interface described in FIG. 14. The computer (1104) may be any type of computing system, e.g., a computing system similar to the computing system discussed with reference to FIG. 14. Using the input of the computer (1104) and the value of the time provided by the atomic clock (1102), the quantum state source (1108) produces a quantum system, which may be of n qubits, within a specific interval of time, which after passing through the preparation device (1110) may be prepared in a quantum state $|\Psi_r^s\rangle$. Then, the quantum state is sent through the quantum channel (138) to the laboratory $L^B$, controlled by Bob. FIG. 11 illustrates the case of embodiments with $I_A=I_M$ and M=m. In embodiments with $I_A$ being a proper subset of $I_M$, the classical communication channels (134.0-134.m-1) comprise only communication channels between Alice's laboratory $L^A$ and Alice's laboratories $L_i^A$, for i∈$I_A$.

Turning to FIG. 12, FIG. 12 shows a laboratory $L^B$, in accordance with one or more embodiments. The laboratory $L^B$ (1200) may be controlled by Bob. Laboratory $L^B$ (1200) may include an atomic clock (1202), a computer (1204), a communication module (1206) connected to m secure and authenticated classical channels (132.0-132.m-1), which are respectively connected to the laboratories $L_0^B$, $L_1^B$, ..., $L_{m-1}^B$, which may be controlled by Bob, a quantum measurement device (1208), and a random number generator (1210). The computer (1204) may be any type of computing system, e.g., a computing system similar to the computing system discussed with reference to FIG. 14. Controlled by the computer (1204), the quantum measurement device (1208) applies a quantum measurement $M_c$, and obtains a classical measurement outcome d, which, via the communication module (1206), is communicated to the laboratory $L_i^B$, through the secure and authenticated classical channel (132.0-132.m-1) between $L^B$ and $L_i^B$. FIG. 12 illustrates the case of embodiments with $I_B=I_M$ and M=m. In embodiments with $I_B$ being a proper subset of $I_M$, the classical communication channels (132.0-132.m-1) comprise only communication channels between Bob's laboratory $L^B$ and Bob's laboratories $L_i^B$, for i∈$I_B$.

Returning to FIGS. 11 and 12, at least within the spacetime region where the quantum state is transmitted to $L^B$, there exists a quantum channel between $L^A$ and $L^B$, and there may be also a classical channel among them. The laboratories $L^A$, $L^B$, $L_i^A$ and $L_{i'}^B$, for i∈$I_A$ and i'∈$I_B$ may include a computer, a clock with high precision (e.g., an atomic clock), communication modules, external connections to receive and to transmit information from and to the exterior, devices to keep their frames aligned to the agreed frame F (e.g., GPS devices, which may receive and decrypt encrypted GPS signals), and may include also random number generators. Furthermore, some or all of Alice's and Bob's laboratories may include quantum storage facilities. Alice's and Bob's laboratories may be secure. In particular, in some embodiments Alice's laboratories are secure from Bob's laboratories and vice versa.

For i∈$I_A \cap I_B$, there exists a communication channel, which may be a classical channel, between the laboratory $L_i^A$ and the laboratory $L_i^B$, which communicates messages at least from $L_i^A$ to $L_i^B$, and which exists at least within the spacetime region where communication between $L_i^A$ and $L_i^B$ takes place.

For i∈$I_A$, there exists a communication channel $C_i^A$, which may be a classical channel, between Alice's laboratory $L^A$ and Alice's laboratory $L_i^A$. For i∈$I_B$, there exist a communication channel $C_i^B$, which may be classical, between Bob's laboratory $L^B$ and Bob's laboratory $L_i^B$. In some embodiments the communication channel between the laboratories of agents of the same party are authenticated and secure, which can be implemented with shared secure keys that are previously distributed to them in a secure way, in the case that the channels are classical, for example.

It is important to clarify that the label 'laboratory' for each of $L^A$, $L^B$, $L_i^A$ and $L_{i'}^B$, for i∈$I_A$ and i'∈$I_B$ does not restrict the form of any of these. For example, some or all laboratories could be offices or scientific laboratories, they could be small and portable devices (e.g., within smartphones, or within desktop computers or laptops), or they could be satellites orbiting the Earth. A combination of laboratories from these of other forms are possible too. Some laboratories could have fixed locations while other could be displacing, in a particular reference frame F. For example, some laboratories could have fixed locations on the Earth surface, others could be portable and displacing devices, while other laboratories could be within satellites orbiting the Earth.

In some embodiments, the message $r_i$ is generated randomly from a set of possible messages $\Omega_i$, for i∈$I_n$, i.e. r=($r_0$, $r_1$, ..., $r_{m-1}$) is generated randomly from the set of possible messages $\Omega_{outcome}=\Omega_0 \times \Omega_1 \times \ldots \times \Omega_{m-1}$, and s is generated randomly from the set of possible labels $\Omega_{basis}$. In this way, a priori, Bob's laboratory $L^B$ does not have any information about the possible messages $r_i$ encoded by Alice's laboratory $L^A$, nor about the label s, apart from the fact that they belong to respective sets $\Omega_i$ and $\Omega_{basis}$, for i∈$I_m$. In practice, it may not be possible for Alice's laboratory to provide that $r_i$ and s are randomly generated from $\Omega_i$ and $\Omega_{basis}$, for i∈$I_m$. Thus, in some embodiments $r_i$ and s are generated with probability distributions that are close to be totally random, so that the information that Bob's laboratory $L^B$ may initially have about $r_i$ and s be very small, for i∈$I_m$.

In some embodiments, in the step of the quantum state being transmitted to the laboratory $L^B$, the laboratory $L^B$ sends a classical message to the laboratory $L^A$ indicating a quantum system A to which the quantum state was transmitted. This could be, for example, due to the fact that the quantum channel between the laboratories $L^A$ and $L^B$ may be subject to losses. For example, in embodiments in which $L^A$ sends photon pulses to $L^B$ through a quantum channel, which may be an optical fibre, for example, some photons are lost in the channel and only a fraction of them arrive to Bob's laboratory $L^B$. Furthermore, in this kind of embodiments using photons as the quantum systems, the laboratory $L^B$ may apply the quantum measurement $M_c$ by using single-photon detectors, in addition to other optical components. Because the single-photon detectors may not have unit detection efficiency, not all photons arriving at $L^B$ and then being subject to the corresponding quantum measurement may activate a detection event in the detectors in the laboratory $L^B$. For this reason Bob's laboratory $L^B$ may require to report to Alice's laboratory $L^A$ the labels of a set of photon pulses that activated a detection event. Thus, in practice, in this case, the quantum system A that Bob's laboratory $L^B$ indicates to Alice's laboratory $L^A$ as the quantum system to which the quantum state $|\Psi_r^s\rangle$ is transmitted consists in the set of quantum systems encoded in the photons activating a detection and being reported by $L^B$. More precisely, A may correspond, for example, to the polarization degrees of freedom of the photons activating a detection and being reported by $L^B$ in embodiments in which Alice's laboratory $L^A$ encodes the message r in the polarization degrees of freedom of photons.

In some embodiments in the step corresponding to the quantum state being transmitted from Alice's laboratory $L^A$ to Bob's laboratory $L^B$, if signals are sent from $L^B$ to $L^A$, these may leak no more than a small amount of information about the label c of the measurement $M_c$ that is implemented by Bob's laboratory $L^B$, or these may not leak any information about c at all.

In some embodiments Alice's laboratories and the communication channels among her laboratories are secure from Bob, and Bob's laboratories and the communication channels among his laboratories are secure from Alice.

A.2 Description of why the Method Works

The previous actions correspond to the main part of some embodiments of the present invention. In particular, the embodiments described above may satisfy the following conditions: I) Bob can effectively obtain a message $r_c'$ equal to $r_c$, or very close to $r_c$ according to a predetermined threshold with a probability equal, or very close, to unity, in any output spacetime region $R_i$ for $i \in I_A \cap I_B$, according to the label $c \in I_m$ of his implemented measurement $M_c$; II) Alice cannot effectively learn Bob's input c anywhere in spacetime; and III) for any pair of different numbers i, $j \in I_M$ and for any pair of different numbers $l_i$, $l_j \in I_n$, Bob cannot effectively obtain a message $r_{l_i}'$ in the output spacetime region $R_i$ and a message $r_{l_j}'$ in the output spacetime region $R_j$, with $r_{l_i}'$, and $r_{l_j}'$ being respectively equal to $r_{l_i}$ and $r_{l_j}$, or very close to $r_{l_i}$ and $r_{l_j}$ according to a predetermined threshold, with probability equal to unity, or with non-negligible probability, or with a probability that does not decrease exponentially with n in embodiments in which $r_0, r_1, \ldots, r_{m-1}$ are strings of n bits. This means that in some embodiments, for any pair of different numbers i, $j \in I_M$ and for any pair of different numbers h, $l_j \in I_m$, the probability that Bob obtains a message $r_{l_i}'$ in the output spacetime region $R_i$ and a message $r_{l_j}'$ in the output spacetime region $R_j$, with $r_{l_i}'$, and $r_{l_j}'$ being respectively equal to $r_{l_i}$ and $r_{l_j}$, or very close to $r_{l_i}$ and $r_{l_j}$ according to a predetermined threshold, is negligible, or decreasing exponentially with n in embodiments in which $r_0, r_1, \ldots, r_{m-1}$ are strings of n bits. Condition I) basically says that the method works, while conditions II) and III) say that some security conditions hold. Conditions II) and III) will be sometimes in what follows referred as security against dishonest Alice and security against dishonest Bob, respectively, or simply as security against Alice and security against Bob.

With respect to condition I), according to the embodiments discussed above, for all $c \in I_m$, for all $s \in \Omega_{basis}$, and for all messages $r = (r_0, r_1, \ldots, r_{m-1}) \in \Omega_{outcome}$ encoded by Alice, there exists a quantum measurement $M_c$ independent of s and independent of r that implemented on the quantum state $|\Psi_r^s\rangle$ gives a classical measurement outcome d, such that knowing d, s and c it is possible to effectively obtain a message $r_c'$ that is equal to $r_c$ or very close to $r_c$ according to a predetermined threshold, with a probability that is equal, or very close, to unity. Bob applies the measurement $M_c$ on the quantum state and obtain a classical measurement outcome d in the laboratory $L^B$, which sends d and c to a plurality of laboratories $L_i^B$, for $i \in I_B$, which may include some laboratory $L_b^B$—requiring that $b \in I_B$. The laboratory $L_i^B$ receives s in the causal past of at least one spacetime point of $R_i$, for $i \in I_A \cap I_B$. Thus, if $b \in I_A \cap I_B$, the laboratory $L_b^B$ receives s in the causal past of at least one spacetime point of $R_b$ and can effectively compute a message $r_c'$, that is equal to $r_c$, or very close to $r_c$ according to a predetermined threshold, with a probability equal or very close to unity, after reception of the outcome d and the label c, which can take place within the spacetime region $R_b$, if d and c are sent by $L^B$ in the causal past of at least one spacetime point of $R_b$, such that their reception by $L_b^B$ takes place in the causal past of at least one spacetime point of $R_b$. For this to happen, it is a requirement that the world line in spacetime of $L_b^B$ intersects the causal future of at least one spacetime point of $Q_b$ and the causal past of at least one spacetime point of $R_b$. In other words, Bob's laboratory $L_b^B$ must be at the right location and at the right time in order to receive s from Alice's laboratory $L_b^A$ and then be able to use this to compute effectively the message $r_c$ in $R_b$. Thus, Bob can effectively obtain $r_c$ (or a message $r_c'$ that is very close to $r_c$ according to a predetermined threshold, with probability equal or very close to unity) in the output spacetime region $R_i$, for a plurality of numbers i from the set $I_A \cap I_B$, for any $c \in I_m$. In embodiments in which $I_A = I_B = I_M$, Bob can effectively obtain $r_c$ (or a message $r_c'$ that is very close to $r_c$ according to a predetermined threshold, with probability equal or very close to unity) in the output spacetime region $R_i$, for a plurality of numbers i from the set $I_M$, for any $c \in I_m$.

Turning to condition II), in the embodiments described above, Bob does not explicitly communicate to Alice his choice of $c \in I_m$. If in the step in which the quantum state is transmitted to Bob's laboratory $L^B$, Bob sends signals to Alice's laboratory $L^A$, Alice may in principle obtain some information about c. But in some embodiments these signals do not leak much information about c, or they do not leak any information about c at all. Furthermore, in embodiment in which Bob's laboratories and communication channels among his laboratories are secure, Alice does not obtain any information about c. It follows that if Bob can make his laboratories and the communication channels among his laboratories secure, and if Bob can provide that the signals that his laboratory $L^B$ sends to Alice's laboratory $L^A$ do not leak any information (or do not leak much information)

about c—in the step in which the quantum state is transmitted to $L^B$—then Alice cannot obtain any information (or cannot obtain much information) about c anywhere in spacetime. Secure and authenticated classical communication channels can be implemented using secure keys that are previously distributed among the communicating laboratories. How to provide that the laboratories are secure and that the signals from $L^B$ to $L^A$ in the step of the transmission of the quantum state does not leak (much) information about c depends specifically on the embodiments. This is discussed further later with respect to embodiments with photonic implementations.

Turning to condition III), this condition may follow from the combination of the causality of spacetime and the properties of quantum information. What this condition says is that Bob cannot effectively obtain one of Alice's messages $r_{l_i}$ in some output spacetime region $R_i$ and another of her messages $r_{l_j}$ in another output spacetime region $R_j$, where $l_i$, $l_j$ are two different elements of the set $I_m = \{0, 1, \ldots, m-1\}$, and where i, j are any two different elements of the set $I_M = \{0, 1, \ldots, M-1\}$.

In principle, Bob could send the quantum state $|\Psi_r^s\rangle$ that he receives in his laboratory $L^B$ to another of his laboratories, say to a laboratory $L_b^B$, for some $b \in I_B$. Then, after reception of s from Alice's laboratory $L_b^A$, assuming that $b \in I_A$, Bob could apply a measurement depending on s on the quantum state and in principle decode the whole message $r = (r_0, r_1, \ldots, r_{m-1})$ encoded by Alice in the quantum state $|\Psi_r^s\rangle$, for example, in some embodiments in which s indicates an orthogonal basis and r indicates an outcome from the orthogonal basis labeled by s. Thus, Bob could in principle effectively obtain all messages $r_0, r_1, \ldots, r_{m-1}$ in one output spacetime region $R_b$, for some $b \in I_A \cap I_B$, or for some $b \in I_A$ assuming that Bob has sufficient laboratories, for example if $I_B = I_M$. However, this is in no-contradiction with the security condition III) of some embodiments, which states that Bob cannot effectively obtain a message $r_{l_i}$ in an output spacetime region $R_i$ and also another message $r_{l_j}$ in another, causally disconnected, output spacetime region $R_j$, for any pair of different numbers $l_i$, $l_j$ from the set $I_m$ and for any pair of different numbers i, j from the set $I_M$.

Furthermore, according to Lo's no go theorem, assuming that the protocol is secure against Alice, i.e. that Alice cannot obtain any information about Bob's input $c \in I_m$, Bob can follow the protocol honestly and effectively obtain a message $r_c$ in at least one output spacetime region $R_i$ and then also obtain another message $r_{l_j}$ in another spacetime region R', for any pair of different numbers c, $l_j$ from the set $I_m$ and for any number $i \in I_M$. However, due to the causality of spacetime, the spacetime region R' must be in the causal future of at least one spacetime point of $R_i$, which is consistent with the security condition III), because the output spacetime regions $R_0, R_1, \ldots, R_{M-1}$ are pair-wise causally disconnected, i.e. there is not any causal curve in spacetime that connects any spacetime point of $R_i$ to any spacetime point of $R_j$ for any pair of different numbers i, j from the set $I_M$.

More precisely, the security condition III) (also called security against Bob), states that for any cheating strategy by Bob, for any pair of different numbers i, j from the set $I_M$ and for any pair of different numbers $l_i$, $l_j$ from the set $I_m$, the probability that Bob obtains the message $r_{l_i}$ (or a message $r_{l_i}'$ very close to $r_{l_i}$ according to a predetermined threshold) in the output spacetime region $R_i$ and the message $r_{l_j}$ (or a message $r_{l_j}'$ very close to $r_{l_j}$ according to a predetermined threshold) in the output spacetime region $R_j$ is smaller than unity, which may be negligible, and may decrease exponentially with n in embodiments in which Alice's input messages $r_0, r_1, \ldots, r_{m-1}$ are strings of n bits. This condition implies that the probability that Bob obtains the message $r_{l_i}$ (or a message $r_{l_i}'$ very close to $r_{l_i}$, according to a predetermined threshold) in the output spacetime region $R_i$ for more than one element i from the set $I_M$ (i.e. for two or more $i \in I_M$) is smaller than unity, which may be negligible, and may decrease exponentially with n in embodiments in which Alice's input messages $r_0, r_1, \ldots, r_{m-1}$ are strings of n bits, for $l_i, l_j \in I_m$ with $l_i \neq l_j$ and for i, $j \in I_M$ with $i \neq j$.

For clarity of the exposition and without loss of generality, an arbitrary cheating strategy by Bob may be considered in which he tries to effectively obtain $r_{l_0}$ in $R_0$ and $r_{l_1}$ n $R_1$, i.e. the case i=0 and j=1 in the notation above. Consider the case that 0, $1 \in I_A$ and 0, $1 \in I_B$, that is, Alice may have at least laboratories $L_0^A$ and $L_1^A$ and Bob may have at least laboratories $L_0^B$ and $L_1^B$. Clearly, if it is not possible for Bob to effectively obtain $r_{l_0}$ in $R_0$ and $r_{l_1}$ in $R_1$ under these conditions, then this is not possible under the more stringent conditions in which either Alice does not have both laboratories $L_0^A$ and $L_1^A$, or Bob does not have both laboratories $L_0^B$ and $L_1^B$. In order to show unconditional security, it is assumed that Bob may have arbitrarily advanced quantum technology; hence, in principle Bob may have many laboratories, and in particular it may be assumed that $I_B = I_M$.

In some embodiments, Alice's laboratories are secure and the communication channels among her laboratories are secure and authenticated. It follows that Bob effectively learns the value of s chosen by Alice only after Alice deliberately communicates its value. In particular, for $i \in I_A$, Alice's laboratory $L_i^A$ transmits s within a spacetime region $Q_i$, which satisfies a first property that it lies within the causal past of at least one spacetime point of $R_i$ and a second property that there is not any causal curve in spacetime that connects any spacetime point of Q with any spacetime point of $R_j$, for all $j \in I_M \setminus \{i\}$.

Since 0, $1 \in I_A$, the first property satisfied by $Q_i$ implies that Bob's laboratory $L_i^B$ can receive s from Alice's laboratory $L_i^A$ in $R_i$, or more generally within the intersection of the causal past of at least one spacetime point of $R_i$ and the causal future of at least one spacetime point of $Q_i$, for $i \in \{0, 1\}$. For this to happen, it is a requirement that the world line in spacetime of $L_i^B$ intersects the causal future of at least one spacetime point of $Q_i$ and the causal past of at least one spacetime point of $R_i$, for $i \in \{0, 1\}$. In other words, Bob's laboratory $L_i^B$ must be at the right location and at the right time in order to receive s from Alice's laboratory $L_i^A$ and then be able to use this to try to effectively compute the message $r_{l_i}$ in $R_i$, for $i \in \{0, 1\}$.

For $i \in I_A$, the second property satisfied by $Q_i$ says that for any element $j \in I_M$ satisfying $j \neq i$, the spacetime region $Q_i$ where Alice's laboratory $L_i^A$ transmits s is not causally connected to $R_j$, which means in particular that a light signal leaving $Q_i$ cannot arrive to $R_j$. Because the causality of spacetime implies that information cannot travel faster than light, it follows that the value of s transmitted by $L_i^A$ cannot arrive to the spacetime region $R_j$, for any $i \in I_A$ and any $j \in I_M \setminus \{i\}$. Thus, for $i \in \{0, 1\}$, the value of s can only be effectively known by Bob's laboratory $L_i^B$ in the causal future of at least one spacetime point of $Q_i$ because of the transmission of s performed by Alice's laboratory $L_i^A$ within $Q_i$. Therefore, in general, for $i \in \{0, 1\}$, Bob's guess of $r_{l_i}$ in $R_i$ is the outcome of a quantum measurement $M_i^s$, which may depend on s, on a quantum system $B_i$ performed by Bob's laboratory $L_i^B$ after reception of s from Alice's laboratory $L_i^A$ in the causal future of at least one spacetime point of $Q_i$ and in the causal past of at least one spacetime point of $R_i$. From the causality of spacetime, since $R_i$ is not causally connected to $Q_j$, for any $j\neq i$ and for any $i\in\{0,1\}$, the quantum systems $B_0$ and $B_1$ could have only interacted in the intersection of the causal past of at least one spacetime point of $R_0$ and the causal past of at least one spacetime point of $R_1$. It follows that Bob's most general strategy is as follows. After the transmission of the quantum state $|\Psi_r^s\rangle$ to Bob's laboratory $L^B$, the laboratory $L^B$ applies a quantum operation O independent of s and independent of r on the quantum state $|\Psi_r^s\rangle$ and obtains quantum systems $B_0$ and $B_1$. For $i\in\{0,1\}$, the system $B_i$ is sent to Bob's laboratory $L_i^B$; then a quantum measurement $M_i^s$, which may depend on s, is applied on $B_i$ after reception of s from Alice's laboratory $L_i^A$, and the outcome $r_{l_i}'$, is output as Bob's guess of $r_{l_i}$ in $R_i$. However, Bob's guesses cannot effectively be $r_{l_0}$ in $R_0$ and $r_{l_1}$ in $R_1$, because according to the embodiments described above, the set of quantum states $\{|\Psi_r^s\rangle\,|\,r\in\Omega_{outcome}, s\in\Omega_{basis}\}$, the probability distributions for $r=(r_0, r_1, \ldots, r_{m-1})\in\Omega_{outcome}$ and for $s\in\Omega_{basis}$ satisfy the following physical property: for any pair of different numbers $l_0, l_1$ from the set $I_m$, for any quantum operation O independent of s and independent of r acting on the quantum state $|\Psi_r^s\rangle$ that produces two quantum systems $B_0$ and $B_1$, and for any sets of quantum measurements $\{\tilde{M}_0^s\}_{s\in\Omega_{basis}}$ and $\{\tilde{M}_0^s\}_{s\in\Omega_{basis}}$, the probability to obtain respective outcomes $r_{l_0}'$ and $r_{l_1}'$ that are respectively equal or very close to $r_{l_0}$ and $r_{l_1}$ according to a predetermined threshold, by respectively applying $\tilde{M}_0^s$ on $B_0$ and $\tilde{M}_1^s$ on $B_1$, is smaller than unity, which may be negligible, and which may decrease exponentially with n in embodiments in which $r_0, r_1, \ldots, r_{m-1}$ are strings of n bits. Thus, Bob cannot effectively obtain $r_{l_0}$ in $R_0$ and $r_{l_1}$ in $R_1$ for any pair of different elements $l_0, l_1$ from the set $I_m$, and more generally Bob cannot effectively obtain $r_{l_i}$ in $R_i$ and $r_{l_j}$ in $R_j$ for any pair of different elements i, j from the set $I_m$ and for any pair of different elements $l_i, l_j$ from the set $I_m$.

In one or more embodiments, a physical property is satisfied by the set of quantum states $\{|\Psi_r^s\rangle\,|\,r\in\Omega_{outcome}, s\in\Omega_{basis}\}$ and the probability distributions for $r=(r_0, r_1, \ldots, r_{m-1})\in\Omega_{outcome}$ and for $s\in\Omega_{basis}$, according to which for any pair of different numbers $l_i, l_j$ from the set $I_m=\{0, 1, \ldots, m-1\}$, for any quantum operation O independent of s and independent of r acting on the quantum state $|\Psi_r^s\rangle$ that produces two quantum systems $B_0$ and $B_1$, and for any sets of quantum measurements $\{\tilde{M}_0^s\}_{s\in\Omega_{basis}}$ and $\{\tilde{M}_1^s\}_{s\in\Omega_{basis}}$, the probability to obtain respective outcomes $r_{l_i}'$ and $r_{l_j}'$ that are respectively equal or very close to $r_{l_i}$ and $r_{l_j}$ according to a predetermined threshold, by respectively applying $\tilde{M}_0^s$ on $B_0$ and $\tilde{M}_1^s$ on $B_1$, is smaller than unity, which may be negligible, and which may decrease exponentially with n in embodiments in which $r_0, r_1, \ldots, r_{m-1}$ are strings of n bits. This property can be satisfied by some properties of quantum information, for example, the no-cloning theorem, the non-perfect distinguishability of non-orthogonal quantum states, the monogamy of quantum entanglement, etc., as discussed below.

In some embodiments the quantum state $|\Psi_r^s\rangle$ cannot be effectively cloned without knowing s. If the state $|\Psi_r^s\rangle$ could be effectively cloned without knowing s then, in Bob's dishonest strategy considered above, Bob's laboratory $L^B$ could produce two copies of the state $|\Psi_r^s\rangle$ in the quantum systems $B_0$ and $B_1$, then by performing the measurement $\tilde{M}_i^s=M_{l_i}$ on $B_i$ by Bob's laboratory $L_i^B$ n $R_i$, Bob could effectively obtain $r_{l_i}$ in $R_i$ for $i\in\{0,1\}$, violating the security condition III) above. This feature can be satisfied if the set of states $\{|\Psi_r^s\rangle\,|\,r\in\Omega_{outcome}, s\in\Omega_{basis}\}$ contains states that are not orthogonal, because if all states from the set are orthogonal then the can be perfectly cloned.

In some embodiments, for a plurality of messages $r\in\Omega_{outcome}$, the quantum states $|\Psi_r^s\rangle$ and $|\Psi_r^{s'}\rangle$ are not orthogonal for any pair of different numbers s and s' from the set $\Omega_{basis}$. This property makes it even more difficult for Bob's laboratory $L^B$ to clone the transmitted quantum states $|\Psi_r^s\rangle$, hence, increasing the security guarantee against violation of the condition III) above in Bob's dishonest strategies discussed above in which he tries to clone the transmitted quantum state and send one copy to $L_0^B$ and the other one to $L_1^B$. More generally, because non-orthogonal quantum states cannot be perfectly distinguished, this feature implies that any pair of quantum states $|\Psi_r^s\rangle$ and $|\Psi_r^{s'}\rangle$ are not perfectly distinguishable, for different s, $s'\in\Omega_{basis}$. In the most general dishonest strategies by Bob, this feature provides that Bob cannot effectively obtain $r_{l_i}$ in $R_i$ and $r_{l_j}$ in $R_j$, for any pair of different elements $l_i, l_j$ from the set $I_m$, and for any pair of different elements i, j from the set $I_M$.

A quantitative analysis is given in the examples below of the physical property discussed above.

A.3 Quantitative Examples

The following notation is used below. The sets $I_M=\{0, 1, \ldots, M-1\}$, $I_m=\{0, 1, \ldots, m-1\}$ and $[n]=\{1, 2, \ldots, n\}$ are defined for any integer numbers $M\geq 2$, $m\geq 2$ and $n\geq 1$. For a string a of n entries, the jth entry is denoted by $a^j$, for $j\in[n]$. The Hamming distance between strings of bits a and b is denoted by d(a, b). The Hamming weight of a string of bits a is denoted by w(a). When applied to bits (bit strings) '$\oplus$' denotes (bitwise) sum modulo 2. The complement of a bit a is denoted $\bar{a}=a\oplus 1$, and of a bit $a^j$ by $\bar{a}^j$. The binary entropy of $\gamma\in(0,1)$ is given by $h(\gamma)=-\gamma\log_2\gamma-(1-\gamma)\log_2(1-\gamma)$, and of $\gamma\in\{0,1\}$ is defined as zero.

A set $\Omega$ with l distinct elements is defined for some integer $l\geq 2$. A set $\Lambda=\{(a_0, a_1, \ldots, a_{m-1})|a_i\in I_m$ and $a_i\neq a_{i'}$, if $i\neq i'$, for $i, i'\in I_m\}$ is defined, i.e. the set $\Lambda$ is in one-to-one correspondence with the set of permutations of m distinct elements. The strings $s=(s^1, s^2, \ldots, s^n)\in\Lambda^n$ and $r_i=(r_i^1, r_i^2, \ldots, r_i^n)\in\Omega^n$ are defined, i.e., with $s^j=(s_0^j, s_1^j, \ldots, s_{m-1}^j)\in\Lambda$ and $r_i^j\in\Omega$, for $j\in[n]$ and $i\in I_m$. The number of elements of the set $\Lambda$ is m!, hence, the number of elements of the set $\Lambda^n$ is $(m!)^n$. Similarly, as the number of elements of the set $\Omega$ is l, the number of elements of the set $\Omega^n$ is $(l)^n$.

A class of embodiments of the method of the present invention is described below. The quantum state $|\Psi_r^s\rangle$ is transmitted to a quantum system with Hilbert space A at Bob's laboratory $L^B$, by exchange of quantum and classical signals with Alice's laboratory $L^A$, where the strings $s\in\Lambda^n$ and $r_i\in\Omega^n$ are randomly generated, for $i\in I_m$. The quantum state is of the form $$|\Psi_r^s\rangle_A = \bigotimes_{i\in I_m, j\in[n]} |\alpha_{r_i^j}^i\rangle_{A_{s_i^j}^j}, \tag{1}$$

where $r=(r_0, r_1, \ldots, r_{m-1})$ denotes the string of m messages encoded by Alice, and where the Hilbert space A is a tensor product of mn Hilbert spaces $A_i^j$, as follows:

$$A=\bigotimes_{i\in I_m, j\in[n]} A_i^j \tag{2}$$

with the dimension of the Hilbert space $A_i^j$ being equal to l for all $j\in[n]$ and all $i\in I_m$, and where $\mathcal{D}_i=\{|\alpha_r^i\rangle\}_{r\in\Omega}$ is an orthonormal basis of an l-dimensional Hilbert space, for $i\in I_m$. A parameter $\lambda$ is defined by $$\lambda = \max_{i\neq i'}|\langle\alpha_r^i|\alpha_{r'}^{i'}\rangle|^2, \tag{3}$$

where the maximum is taken over all $r$, $r' \in \Omega$ and over all $i$, $i' \in I_m$ with $i \neq i'$.

It is explained now how the property I) is satisfied. Bob generates the input $c \in I_m$ and applies a quantum measurement $M_c$ on the received quantum state $|\Psi_r^s\rangle_A$. The quantum measurement $M_c$ consists in measuring the quantum subsystem $A_i^j$ of A in the basis $\mathcal{D}_c$, whose classical measurement outcome is denoted by $d_i^j$, for $j \in [n]$ and $i \in I_m$. Further, $d^j = (d_0^j, d_1^j, \ldots, d_{m-1}^j)$ is denoted for $j \in [n]$, and Bob's total classical measurement outcome is denoted by $d = (d^1, d^2, \ldots, d^n)$. Thus, the outcomes satisfy $d_{s_c^j}^j = r_c^j$, because the quantum system $$A_{s_c^j}^j$$

is prepared by Alice in the quantum state $$|\alpha_{r_c^j}^c\rangle,$$

i.e. in the orthonormal basis $\mathcal{D}_c$ encoding the classical outcome $r_c^j$, for $j \in [n]$. Thus, for $c \in I_m$, following this method honestly and using c, d and s, Bob can decode Alice's input $r_c$. Therefore, in the ideal case that there are not errors nor losses, the example discussed above works correctly, i.e., the property I) is satisfied.

In this example, Bob may require to obtain a message $r_c$ in one output spacetime region (or in a plurality of output spacetime regions) in order to satisfy the property I) above. In this example there is no information given by Bob to Alice, hence security against Alice, i.e. property II), is satisfied too. In this example, the satisfaction of security against Bob, i.e. condition III), consists in the property that Bob cannot obtain $r_{l_i}$ in an output spacetime region $R_i$ for more than one i from the set $I_M$, unless with a negligible probability, which may decreases exponentially with n, where $l_i, l_{i'} \in I_m$ with $l_i \neq l_{i'}$ for $i \neq i'$ and i, $i' \in I_M$.

In order to implement security against a dishonest Bob (property III) above), the set of bases $\{\mathcal{D}_i\}_{i \in I_m}$ is chosen to satisfy the constraint $$\lambda < 1 \quad (4)$$

For fixed values of l and n, the smaller the value of $\lambda$ is, the greater the security that can be provided. For this reason, in some embodiments the bases $\mathcal{D}_i$ are mutually unbiased, i.e., $|\langle \alpha_r^i | \alpha_{r'}^{i'} \rangle|^2 = l^{-1}$ for all r, $r' \in \Omega$ and all i, $i' \in I_m$ with $i \neq i'$, in which case $\lambda = l^{-1}$. For example, in the case $M=2$, some embodiments may set $l=2$, and a pair of mutually unbiased bases can be given by the computational and Hadamard bases.

In order to quantitatively prove the security against Bob in the examples of this subsection, it is considered that the set of bases $\{\mathcal{D}_i\}_{i \in I_m}$ satisfies the constraint that there exists a maximally entangled state $|\phi\rangle$ of two l-dimensional quantum systems a and a' such that $|\phi\rangle$ can be expressed by $$|\phi\rangle = \frac{1}{\sqrt{l}} \sum_{r \in \Omega} |\alpha_r^i\rangle_{a'} |\alpha_r^i\rangle_a, \quad (5)$$

for all $i \in I_m$.

If Bob is dishonest, he could perform a cheating strategy with the goal of obtaining the message $r_{l_i}$ in the output spacetime region $R_i$ for more than one i from the set $I_M$, where $l_i, l_{i'} \in I_m$ with $l_i \neq l_{i'}$ for $i \neq i'$ and i, $i' \in I_M$. It is considered below that the sets $I_B$ and $I_A$ coincide in at least two elements, i and i', as otherwise Bob cannot cheat. Consider a fixed but arbitrary cheating strategy by Bob. The probability that Bob obtains $r_{l_i}$ in $R_i$ for more than one i from the set $I_m$—where $l_i, l_{i'} \in I_m$ with $l_i \neq l_{i'}$ for $i \neq i'$ and i, $i' \in I_m$—cannot be greater than the probability that Bob obtains $r_{l_i}$ in $R_i$ and $r_{l_{i'}}$ in $R_{i'}$ for some pair of different elements i, i' of the set $I_M$ and some pair of different elements i, i' of the set $I_m$. Thus, consider that Bob tries to obtain $r_{l_i}$ in $R_i$ and $r_{l_{i'}}$ in $R_{i'}$ for a pair of different elements i, i' from the set $I_M$, which as said above are assumed to be elements of $I_A \cap I_B$, with $l_i, l_{i'} \in I_m$ and $l_i \neq l_{i'}$, and it is shown below that this can only happen with a probability that decreases exponentially with n. Consider a fixed but arbitrary cheating strategy by Bob in which he tries to obtain $r_{l_i}$ in $R_i$ and $r_{l_{i'}}$ in $R_{i'}$ for a pair of different numbers i, i' from the set $I_A \cap I_B$, with $l_i, l_{i'} \in I_m$ and $l_i \neq l_{i'}$. From the satisfaction of the conditions (1)-(5), it is shown below, using the mathematical formalism of quantum mechanics that the probability $p_n$ that Bob obtains $r_{l_i}$ in $R_i$ and $r_{l_{i'}}$ in $R_{i'}$ satisfies the bound $$p_n \leq \left(\frac{m-1+\sqrt{\lambda}}{m}\right)^n. \quad (6)$$

Thus, since $\lambda < 1$ as given by (4), it holds that $p_n \to 0$ exponentially with n, meaning that these embodiments are unconditionally secure against Bob (the property III) is satisfied).

Some embodiments may tolerate a small error in Bob's output $r_c'$ with respect to Alice's original input $r_c$, for $c \in I_m$. For example, if the messages $r_0, r_1, \ldots, r_{m-1}$ are expressed as strings of bits, an output $r_c'$ by Bob may be considered correct if the Hamming distance $d(r_c', r_c)$ to Alice's input $r_c$ is smaller than a predetermined threshold, which may be agreed a priori by Alice and Bob. For example, in the example embodiments discussed in the previous paragraphs, consider the case $\Omega = \{0,1\}$, i.e. $r_i$ is a string of n bits, for $i \in I_m$. Bob's output $r_c'$ may be considered correct if $d(r_c', r_c) \leq n\gamma$ for some small allowed error rate $\gamma \in (0,1)$, i.e. if the number of bit errors in $r_c'$ with respect to $r_c$ is not greater than n $\gamma$, for $c \in I_m$. In this case, Bob succeeds in cheating if, for at least two different numbers i, $j \in I_M$ and two different numbers $l_i, l_j \in I_m$, Bob obtains a message $r'_{l_i}$ in $R_i$ and $r'_{l_j}$ in $R_j$ satisfying $d(r'_{l_i}, r_{l_i}) \leq n\gamma$ and $d(r'_{l_j}, r_{l_j}) \leq n\gamma$. As shown below from the bound (6), the probability $p'_n$ that Bob cheats successfully for these embodiments allowing the small amount of bit errors $n\gamma$ satisfies the following upper bound $$p'_n \leq \left[2^{2h(\gamma)}\left(\frac{m-1+\sqrt{\lambda}}{m}\right)\right]^n, \quad (7)$$

for some $\gamma \in (0, \Gamma_m^{(\lambda)})$, where $\Gamma_m^{(\lambda)}$ is the smallest solution to the following equation $$2^{2h(\Gamma_m^{(\lambda)})}\left(\frac{m-1+\sqrt{\lambda}}{m}\right) = 1, \quad (8)$$

which satisfies $\Gamma_m^{(\lambda)} \leq \frac{1}{2}$ and where $h(\gamma)$ denotes the binary entropy of $\gamma$. It follows from (8) that since $\gamma < \Gamma_m^{(\lambda)}$, the term inside the brackets in (7) is smaller than unity, hence, the upper bound on $p'_n$ given by (7) decreases exponentially with n.

Those of skill in the art will appreciate that the security bounds (6) and (7) may not be optimal and that they may be improved with mathematical techniques different to the ones used here. Furthermore, although the disclosed mathematical techniques may use the condition (5), this may not be essential. Moreover, particular examples have been given here in order to provide some quantitative security analyses. However, those of skill in the art will appreciate that the embodiments of the present invention are not limited to these particular examples. For example, while the transmitted quantum state IF) may be expressed as a pure state, in practice due to inevitable errors in the preparation procedure, only states that are close to be pure may be prepared and transmitted in practice. This implies some errors in Bob's outcomes, as well as errors during the measurement procedure and at other stages in the implementation of the method of the present invention. Some embodiments consider that Bob's output $r_c'$ may be allowed to be only approximately equal to Alice's original input $r_c$, for $c \in I_m$, as exemplified above.

Two specific examples are provided below of the embodiments considered in this subsection that satisfy the conditions (1)-(5), from which the security bounds (6) and (7) follow. Those of skill in the art will appreciate that the invention does not limit to these examples, and that more general embodiments may be considered.

Example 1. For the case m=l=2 with $\Omega = \{0,1\}$, the state $|\phi\rangle$ is defined as $|\phi\rangle = |\Phi^+\rangle$, where $|\Phi^+\rangle$ is the Bell state $$|\Phi^+\rangle = \frac{1}{\sqrt{2}}(|0\rangle|0\rangle + |1\rangle|1\rangle). \tag{9}$$

Since l=2, $\mathcal{D}_0$ and $\mathcal{D}_1$ are qubit orthonormal bases, which without loss of generality are fixed on the same plane of the Bloch sphere. Without loss of generality, $\mathcal{D}_0$ is set to be the computational basis, given by the states $|\alpha_r^0\rangle = |r\rangle$, for $r \in \{0,1\}$. The basis $\mathcal{D}_1$ is defined by the states $$|\alpha_r^1\rangle = (-1)^r \cos\left(\frac{\theta}{2}\right)|r\rangle + \sin\left(\frac{\theta}{2}\right)|\bar{r}\rangle, \tag{10}$$

for $r \in \{0,1\}$, for some $\theta \in (0, \pi)$. This example provides that $$\lambda = \max\left\{\cos^2\left(\frac{\theta}{2}\right), \sin^2\left(\frac{\theta}{2}\right)\right\}. \tag{11}$$

Since $\theta \in (0, \pi)$, some embodiments have $\lambda < 1$, hence, (4) holds. It is easy to see that $|\alpha_0^1\rangle|\alpha_0^1\rangle + |\alpha_1^1\rangle|\alpha_1^1\rangle = |0\rangle|0\rangle + |1\rangle|1\rangle$ for any $\theta$, hence, by setting $|\phi\rangle = |\Phi^+\rangle$ (5) holds too. In this example, in order to enhance the security, some embodiments may have $$\theta = \frac{\pi}{2},$$

in which case $\mathcal{D}_0$ and $\mathcal{D}_1$ correspond respectively to the computational and Hadamard bases, which are mutually unbiased, giving from (11) the value $\lambda = \frac{1}{2}$.

This example is very practical to implement. In particular, the case $$\theta = \frac{\pi}{2}$$

corresponds to preparing the Bennett Brassard 1984 (BB84) states, which are very common to implement with current technology. However, this example limits to the simple case of two input messages by Alice, m=2. This example is generalized for arbitrary m below.

Example 2. An arbitrary value for $m \geq 2$ is set, with $\Omega = \{0,1\}$, hence l=2. Since l=2, $\mathcal{D}_i$ are qubit orthonormal bases, for $i \in I_m$. The bases are set to lie on the same plane of the Bloch sphere. Without loss of generality this plane is set to be the x-z plane, and the basis $\mathcal{D}_0$ is set to lie on the z axis, i.e. $\mathcal{D}_0$ is the computational basis, which is given by the states $|\alpha_r^0\rangle = |r\rangle$, for $r \in \{0,1\}$. The other bases can be expressed by the states $$|\alpha_r^i\rangle = (-1)^r \cos\left(\frac{\theta_i}{2}\right)|r\rangle + \sin\left(\frac{\theta_i}{2}\right)|\bar{r}\rangle, \tag{12}$$

for $r \in \{0,1\}$, for different parameters $\theta_i \in (0, \pi)$, for $i \in \{1, 2, \ldots, m-1\}$, which without loss of generality are ordered like $\theta_1 < \theta_2 < \ldots < \theta_{m-1}$. In this example, the following equation is provided:

$$\theta_i = i\frac{\pi}{m}, \tag{13}$$

for $i \in \{1, 2, \ldots, m-1\}$, which gives $$\lambda = \cos^2\left(\frac{\pi}{2m}\right), \tag{14}$$

satisfying (4). As in the example 1 above, the state $|\phi\rangle$ is set to $|\phi\rangle = |\Phi^+\rangle$, given by (9), which as above satisfies (5).

A.3.1 Security Against Bob

As shown below, using the mathematical formalism of quantum mechanics, the probability $p_n$ that Bob obtains $r_{l_i}$ in $R_i$ and $r_{l_j}$ in $R_j$ satisfies the bound (6) for any pair of different numbers i, $j \in I_A \cap I_B$, hence, also for any pair of different numbers i, $j \in I_M$, and for any pair of different numbers $l_i$, $l_j$ $\in I_m$. As above, for clarity of the exposition and without loss of generality it is considered that $l_i = 0$ and $l_j = 1$. As discussed above, due to the causality of spacetime, Bob's most general cheating strategy is as follows. After the transmission of the quantum state $|\Psi_r^s\rangle$ to the quantum system A at Bob's laboratory $L^B$, the laboratory $L^B$ applies a quantum operation O independent of s and independent of r on the quantum state and obtains quantum systems $B_0$ and $B_1$. For $i \in \{0,1\}$, the system $B_i$ is sent to Bob's laboratory $L_i^B$; then a quantum measurement $\tilde{M}_i^s$, which may depend on s, is applied on $B_i$ after reception of s by Bob's laboratory $L_i^B$, and the outcome is output as Bob's guess of $r_{l_i}$ in $R_i$. The most general quantum operation O consists in performing some joint unitary operation U, independent of s and independent of r, on the quantum state $|\Psi_r^s\rangle$ of the quantum system A and a fixed quantum state $|\chi\rangle$ of an ancillary system E, which is assumed to be of arbitrary finite Hilbert space dimension, to obtain the state $$|\Phi_r^s\rangle_{B_0B_1} = U_{AE}|\Psi_r^s\rangle_A|\chi\rangle_E \qquad (15)$$

where the notation has been simplified by writing $r=(r_0, r_1, \ldots, r_{m-1})$, where $AE=B_0B_1$, and where the quantum systems $B_0$ and $B_1$ have arbitrary finite dimensions. Bob's laboratory $L^B$ partitions the global system AE into two quantum systems $B_0$ and $B_1$. Then, for $i \in \{0,1\}$, Bob's laboratory $L^B$ sends $B_i$ to Bob's laboratory $L_i^B$, who receives it in the causal past of at least one spacetime point of $R_i$; then, using the message s, $L_i^B$ applies a projective measurement $\tilde{M}_i^s = \{\Pi_{is}^{e_i}\}_{e_i \in \Omega^n}$ on $B_i$ and obtains the outcome et in the spacetime region $R_i$. Bob's cheating probability in these examples, the probability $p_n$ that $e_0$ and $e_1$ equal $r_{l_0}$ and $r_{l_1}$, respectively, is given by $$p_n = \frac{1}{(l)^{mn}(m!)^n} \sum_{s \in \Lambda^n, r \in \Omega^{nm}} \langle \Phi_r^s | \prod_{0s}^{r_{l_0}} \otimes \prod_{1s}^{r_{l_1}} | \Phi_r^s \rangle, \qquad (16)$$

where $r \in \Omega^{nm}$ denotes that $r_i \in \Omega^n$ for $i \in I_m$, as the notation $r=(r_0, r_1, \ldots, r_{m-1})$ is used, and where $l_0, l_1 \in I_m$ with $l_0 \neq l_1$. Then, using (1)-(5), and in particular, using the property of non-perfect distinguishability of non-orthogonal quantum states exploited in Alice's quantum state preparation (1), as quantified by (3) and (4), the proof of the bound (6) follows from the Appendix I of the filed provisional patent application. More precisely, the Appendix I of the filed provisional patent application presents a mathematical proof of a bound given in the main text of the filed provisional patent application, which is labelled as the bound '(6)', using the equations from the main text of the filed provisional patent application labelled as '(1)' to '(5)', and '(15)' and '(16)'. The equations '(1)' to '(4)', '(15)' and '(16)', and the bound '(6)' of the filed provisional patent application are clearly identified with the equations (1) to (4), (15) and (16), and the bound (6) here, respectively, whereas the equation '(5)' in the filed provisional patent application is replaced here by the equation (5). This is due to a minor typo in equation '(5)' of the filed provisional patent application that has been corrected in the equation (5) here. The proof of the bound (6) follows straightforwardly from the Appendix I of the filed provisional patent application by simply replacing the equations '(1)' to '(6)', and '(15)' and '(16)' of the filed provisional patent application by the equations (1) to (6), and (15) and (16) given here, respectively.

From the bound (6) and the equation (16), it is straightforward to derive the bound (7) on the probability $p'_n$ with which, for at least two different numbers $i, j \in I_M$ and two different numbers $l_i, l_j \in I_m$, Bob cheats successfully, i.e. Bob succeeds in obtaining a message $r'_{l_i}$ in $R_i$ and $r'_{l_j}$ in $R_j$ satisfying $d(r'_{l_i}, r_{l_i}) \leq n\gamma$ and $(r'_{l_j}, r_{l_j}) \leq n\gamma$. Consider a projective measurement $\tilde{M}_i^{s,a} = \{\Pi_{is}^{e_i \oplus a}\}_{e_i \in \Omega^n}$ on $B_i$ for any n-bit string a in the case $\Omega=\{0,1\}$ and $|\Omega|=l=2$, where '⊕' denotes bit-wise sum modulo 2. Extending (16), Bob's cheating probability $p'_n$ is given by $$p'_n = \frac{1}{(l)^{mn}(m!)^n} \sum_{a:w(a) \leq n\gamma, b:w(b) \leq n\gamma} \sum_{s \in \Lambda^n, r \in \Omega^{nm}} \langle \Phi_r^s | \prod_{0s}^{r_{l_0} \oplus a} \otimes \prod_{1s}^{r_{l_1} \oplus b} | \Phi_r^s \rangle, \qquad (17)$$

where w(a) denotes the Hamming weight of the n-bit string a, i.e. the number of bit entries of a equal to '1', and w(b) denotes the Hamming weight of the n-bit string b. The bound (6) applies to any pair of projective measurements on $B_0$ and $B_1$, hence, in particular to the projective measurement $\tilde{M}_i^{s,a} = \{\Pi_{is}^{e_i \oplus a}\}_{e_i \in \Omega^n}$ on $B_i$, for $a \in \{0,1\}^n$ and $i \in \{0,1\}$. It follows from (6), (16) and (17) that $$p'_n \leq \sum_{a:w(a) \leq n\gamma, b:w(b) \leq n\gamma} \left(\frac{m-1+\sqrt{\lambda}}{m}\right)^n \leq 2^{2nh(\gamma)} \left(\frac{m-1+\sqrt{\lambda}}{m}\right)^n, \qquad (18)$$

where in the second inequality it has been used the well known mathematical fact by those of skill in the art that the number of n-bit strings a with Hamming weight not greater than $n\gamma$ is upper bounded by $2^{nh(\gamma)}$, for $\gamma \leq \frac{1}{2}$, and where $h(\gamma)$ is the binary entropy of $\gamma$. The bound (7) follows.

A.4. Discussion about Embodiments with Photons

The embodiments of the present invention can be implemented with any type of quantum system, with some implementations being with photons. The quantum state $|\Psi_r^s\rangle$ may be encoded in degrees of freedom of photons, for example, in polarization degrees of freedom. For example, the transmitted quantum state $|\Psi_r^s\rangle$ may be a tensor product of qubit states, with each qubit state being encoded with one or more photons. For example, each qubit state may be encoded in the polarization degrees of freedom of one or more photons.

The quantum channel between Alice's laboratory $L^A$ and Bob's laboratory $L^B$ could be, for example, optical fibre, the atmosphere near the Earth surface—or even the empty space if $L^A$ and $L^B$ were on the region of satellites orbiting the Earth or beyond into the solar system. As previously discussed, in some embodiments Alice's laboratories are secure from Bob and Bob's laboratories are secure from Alice. In photonic implementations, this means in practice that the laboratories must be checking side channel attacks in which the other party tries to obtain information about the inner working of the laboratory of the other party. For example, using reflectometry techniques, Alice's laboratory $L^A$ could analyse the light that is reflected from the optical devices in Bob's laboratory $L^B$, for example through the optical fibre acting as quantum channel, and obtain some information about the interior of $L^B$. In order to countermeasure these security attacks, called Trojan horse attacks, Bob's laboratory could be equipped with a power meter at the entrance of the quantum channel in order to detect light that is sufficiently intense that could be subject to Trojan horse attacks.

Different kind of photonic sources could be used in the step of the transmission of the quantum state $|\Psi_r^s\rangle$. For example, Alice's laboratory may have a single photon source that works by preparing pairs of entangled photons in the polarization degrees of freedom—using parametric down conversion, for example—and then measure the polarization degrees of freedom of one photon in the pair along one of several bases, and then send the other unmeasured photon to Bob's laboratory $L^B$. This process may be repeated many times in order to encode messages $r_0, r_1, \ldots, r_{m-1}$ of one or several bits in the quantum state $|\Psi_r^s\rangle$. Other type of single-photon sources may be used. Another type of source is a weak coherent source that emits single-photon pulses with some probability, but also pulses of zero photons with non-zero probability and pulses of two or more photons with non-zero probability.

The quantum measurement implemented by Bob's laboratory $L^B$ may require the adjustment of various optical components, and may also require photon-detectors, which may be single-photon detectors.

In photonic implementations, as in any other physical implementation, there are imperfections of the devices. For example, there are losses of photons through the quantum channel, the single-photon detectors have detection efficiencies smaller than unity, the detectors have small but finite dark count probabilities, etc.

Because of losses through the quantum channel and because of the non-unit detection efficiencies of the detectors, Bob's laboratory $L^B$ is not able to detect all photons prepared by Alice's laboratory $L^A$. $L^B$ may send signals to $L^A$ indicating which photon pulses sent by $L^A$ activated a detection in his detectors. In this way, $L^B$ is informing to $L^A$ of a quantum system A to which a quantum state $|\Psi_r^s\rangle$ was effectively transmitted to $L^B$, and $L^A$ knows in this way what quantum state $|\Psi_r^s\rangle$ was effectively transmitted to $L^B$. It may be a feature that such signals from $L^B$ to $L^A$ do not leak any information about the choice c of measurement implemented by $L^B$, or that the leaked information about c is bounded to be small.

Measures to avoid that information from Bob's laboratory $L^B$ about his choice of measurement $c \in I_m$ to Alice's laboratory $L^A$ in a step in which $L^B$ reports to $L^A$ photon pulses that activate a detection may include, for example, verifying that the probabilities with which $L^B$ reports detection of photon pulses to $L^A$ are the same for all measurements $M_c$ for $c \in I_m$, which may require Bob to previously test the detection probabilities by the detectors in his laboratory $L^B$ and correct by appropriate factors so that the reported detection events by $L^B$ occur with the same probability for all $c \in I_m$. Another measure by $L^B$ may include testing the statistics of the detection events in his detectors according to various experimental parameters, including the implemented measurement $M_c$ for all $c \in I_n$, and provide that the detection events reported to $L^A$ do not leak any information about c, even for different parameters that could be controlled by Alice's laboratory $L^A$.

A.4.1 Embodiments with Weak Coherent States

In a particular embodiment of the present invention, Alice's laboratory $L^A$ has a weak coherent source of photon pulses with small average photon number μ. The polarization degrees of freedom of the photons of each pulse are prepared along one of various states. For example, the polarization of some photon pulses may be prepared by Alice to be vertical, horizontal, diagonal, etc., and then sent to Bob's laboratory $L^B$ through an optical fibre or through empty space. As such, the laboratories $L^A$ and $L^B$ are close to each other in order to decrease the amount of losses of transmitted photons. Alice's laboratory may include a phase randomizer so that the photon pulses received by Bob's laboratory can be treated as mixed in the number of photons, with the probability that a photon-pulse has k photons be $q_k = e^{-\mu} \mu^k / k!$, for $k = 0, 1, 2, 3, \ldots$, i.e. a Poisson distribution. For small average photon number μ, the probability of generating pulses of two or more photons is small, but positive. One then needs to consider attacks by Bob in which he can measure one photon in one basis and the other photon in another basis, or more general attacks. But for average photon number μ small enough, for example for average photon number $\mu \ll 1$, the probability that Bob's laboratory receives multi-photon pulses is very small, hence, the probability that security against Bob is violated can be made small.

B. EXTENDED PART OF THE INVENTION

B.1 Allowing Alice to Generate her Input Messages in Real Time

In the SCOT method of the present invention described above, the quantum state $|\Psi_r^s\rangle$ encoding Alice's string of m messages $r = (r_0, r_1, \ldots, r_{m-1})$ must be transmitted to Bob's laboratory $L^B$ in the intersection of the causal past of at least one spacetime point of $R_i$, for all $i \in I_M$ in order to allow Bob to effectively obtain his chosen message $r_c$ (or a message $r_c'$ sufficiently close to $r_c$ according to a predetermined threshold), for any $c \in I_m$, in a plurality of the output spacetime regions $R_0, R_1, \ldots, R_{M-1}$ of his choice. It is discussed below how the SCOT method of the present invention is extended so that Alice has the freedom of choosing her input message $x_i$ within the causal past of at least one spacetime point of the output spacetime region $R_i$, for $i \in I_M$, but without requiring her to generate $x_i$ within the causal past of any spacetime point of $R_j$, for any $j \in I_M \setminus \{i\}$.

For $i \in I_A$, Alice's laboratory $L_i^A$ generates an input $x_i$ in the causal past of at least one spacetime point of $R_i$; the laboratory $L_i^A$ computes a message $t_i$ in the causal past of at least one spacetime point of $R_i$, wherein $t_i$ is an encoding of $x_i$ using $r_{l_i}$, the encoding $t_i$ satisfying the property that $x_i$ can be obtained effectively from $t_i$ and $r_{l_i}$, and that $x_i$ cannot be obtained effectively from $t_i$ only, or from $r_{l_i}$ only, and wherein $l_i \in I_m = \{0, 1, \ldots, m-1\}$; the laboratory $L_i^A$ transmits $t_i$ within the causal past of at least one spacetime point of the spacetime region $R_i$, for $i \in I_A$. For $i \in I_A \cap I_B$, the laboratory $L_i^B$ receives $t_i$ within the causal past of at least one spacetime point of the spacetime region $R_i$. If $c = l_i$ and $i \in I_A \cap I_B$, the laboratory $L_i^B$ may compute $x_i$ from $t_i$ and $r_{l_i} = r_c$ in the output spacetime region $R_i$, or in the causal past of at least one spacetime point of $R_i$.

Some embodiments are considered in which $m = M$ and $l_i = \pi(i)$, wherein r is a permutation of the elements from the set $I_m = \{0, 1, \ldots, m-1\}$. The properties I), II) and III) discussed for the method of previous embodiments applies to the extended SCOT method here. Firstly, property I) provides that Bob may effectively obtain a message equal to, or very close to, $r_c$ in any output spacetime region $R_i$ for $i \in I_A \cap I_B$, according to his choice $c \in I_m$. As discussed in the previous paragraph, in this extended SCOT method, Bob can use $r_c = r_{\pi[\pi^{-1}(c)]}$ and $t_{\pi^{-1}(c)}$ to effectively compute $x_{\pi^{-1}(c)}$ in $R_{\pi^{-1}(c)}$ if $\pi^{-1}(c) \in I_A \cap I_B$.

However, if Alice's laboratories transmit $t_{\pi^{-1}(c)}$ in the causal past of at least one spacetime point of $R_j$, for some $j \in I_m$ with $j \neq \pi^{-1}(c)$ and one of Bob's laboratories receives $t_{\pi^{-1}(c)}$ and also $r_c$ in the causal past of at least one spacetime point of $R_j$, then Bob can also compute $x_{\pi^{-1}(c)}$ in $R_j$. If this situation is desired to be avoidable, then Alice's laboratories should transmit $t_i$ in a spacetime region that is not in the causal past of the spacetime region $R_j$, for $j \in I_m$ with $j \neq i$, for example, Alice's laboratories should transmit $t_i$ in the spacetime region $Q_i$, for $i \in I_A$.

The property of security against Alice, property II), in the method of embodiments described above (in previous sections) provides that Alice cannot effectively learn Bob's choice c anywhere in spacetime. In the extended method described here, since Bob does not give any further information to Alice, this property implies that Alice cannot effectively learn which of her messages $x_i$, with $i \in I_A$, Bob has obtained.

The property of security against Bob, property III), in various embodiments described above (in the previous sections) provides that Bob cannot effectively obtain $r_j$ in $R_{\pi'(j)}$ and $r_{j'}$ in $R_{\pi'(j')}$ for any pair of different numbers j and j' from the set $I_m$ and for any permutation $\pi'$ of the m elements from the set $I_m$, which implies $\pi'(j), \pi'(j') \in I_m$ and $\pi'(j) \neq \pi'(j')$ as used in the discussion of satisfaction of the security condition III). In the extended method of the present invention described here (in this section), Bob cannot effectively obtain $x_i$ in $R_i$ and $x_{i'}$ in $R_{i'}$ for any pair of different numbers i, i' from the set $I_m$. For $j \in I_n$, since $x_j$ is only effectively obtained from $t_j$ and $r_{\pi(j)}$ for a permutation $\pi$ of the m elements from the set $I_m$, in order for Bob to obtain $x_i$ in $R_i$ and $x_{i'}$ in $R_{i'}$, Bob needs to obtain $r_{\pi(i)}$ in $R_i$ and $r_{\pi(i')}$ in $R_{i'}$. But as previously discussed, the SCOT method of the present invention satisfies the security condition that Bob cannot effectively obtain $r_j$ in $R_{\pi'(j)}$ and $r_{j'}$ in $R_{\pi'(j')}$ for any pair of different numbers j and j' from the set $I_m$ and for any permutation $\pi'$ of the m elements from the set $I_m$. In particular, where $\pi'=\pi^{-1}$, Bob cannot effectively obtain $r_{\pi(i)}$ in $R_{\pi'[\pi(i)]}=R_i$ and $r_{\pi(i')}$ in $R_{\pi'[\pi(i')]}=R_{i'}$, hence, Bob cannot effectively obtain $x_i$ in $R_i$ and $x_{i'}$ in $R_{i'}$ for any pair of different numbers i, i' from the set $I_m$. More precisely, the probability that Bob obtains a message $x_{i'}$ equal or sufficiently close to $x_i$ according to a predetermined threshold in the output spacetime region $R_i$ for more than one element i from the set $I_m$ is smaller than unity, which may be negligible, and which may decrease exponentially with n in embodiments in which $r_0, r_1, \ldots, r_{m-1}$ are expressed as strings of n bits.

Figure 7:
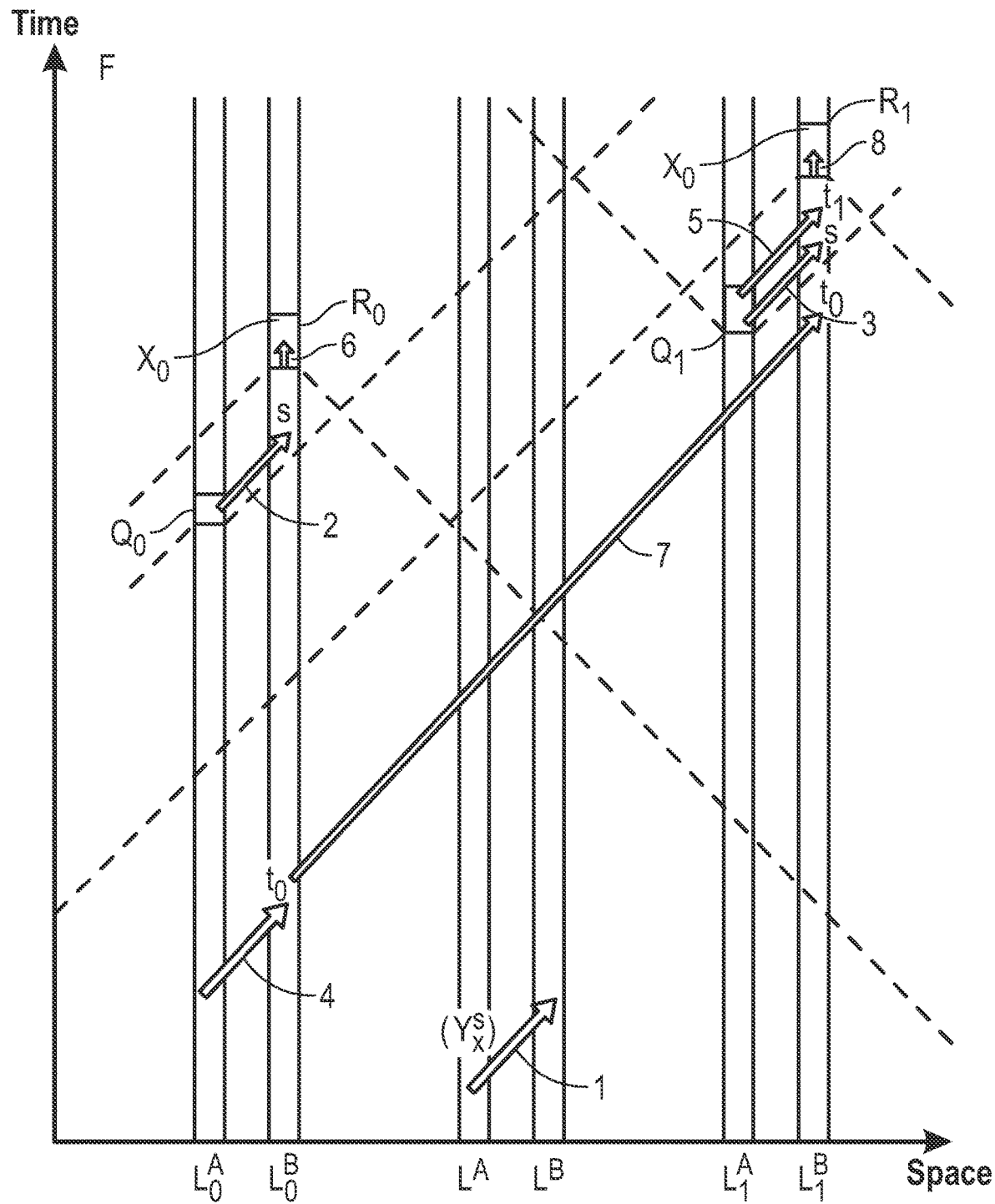
FIG. 7 shows a two-dimensional spacetime diagram in accordance with one or more embodiments.
Figure 8:
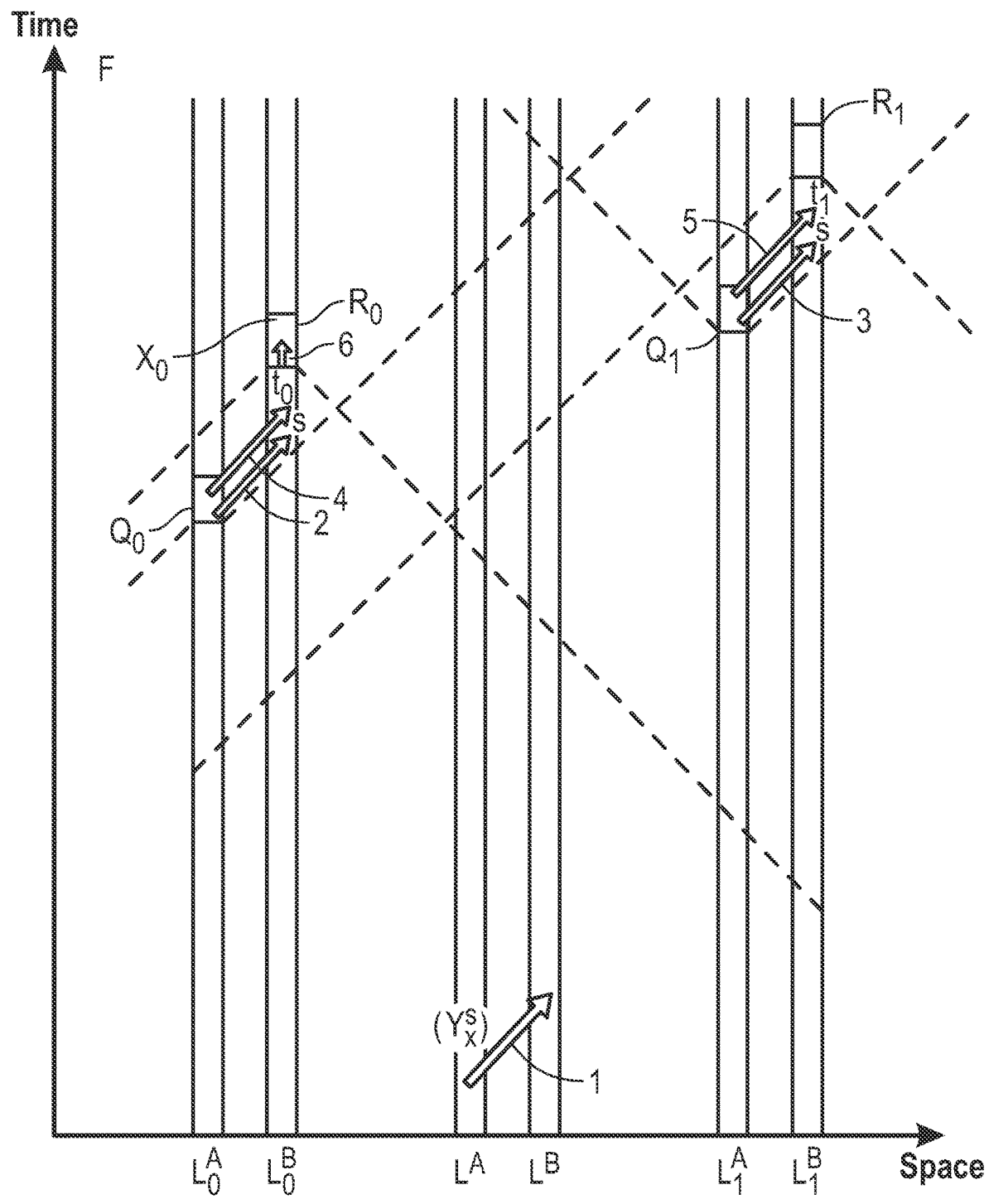
FIG. 8 shows a two-dimensional spacetime diagram in accordance with one or more embodiments.

FIGS. 7 and 8 illustrate the extended SCOT method for the simple example m=M=2 and $I_A=I_B=\{0,1\}$ in a two dimensional spacetime diagram in which spacetime is Minkowski, or approximately Minkowski, in a reference frame F. The worldlines in spacetime of Alice's and Bob's laboratories, and the spacetime regions $Q_0, Q_1, R_0$ and $R_1$ are illustrated. The dotted lines represent light rays enclosing light cones. The steps labelled by the numbers 1, 2 and 3 correspond to actions performed for the method described in some embodiments above (in previous sections), while steps labelled by the numbers 4 and forward correspond to actions that may be taken in this extended method. In a step 1, the quantum state $|\Psi_r^s\rangle$ is transmitted to Bob's laboratory $L^B$; in a step 2 (3), s is communicated from Alice's laboratory $L_0^A(L_1^A)$ to Bob's laboratory $L_0^B(L_1^B)$, with the spacetime region $Q_0(Q_1)$ where the transmission step from Alice's laboratory takes place is illustrated as a small rectangle. FIGS. 7 and 8 illustrate the example in which Bob obtains the message $r_0$ in the causal past of a spacetime point of $R_i$, for both $i \in \{0,1\}$. Additionally, in this example, the permutation $\pi$ is simply the identity permutation, hence, $t_i$ encodes $x_i$ using $r_i$, for $i \in \{0,1\}$.

In FIG. 7, the step (labelled by 4) in which $L_0^A$ communicates $t_0$ to $L_0^B$ takes place within the causal past of at least one spacetime point of $R_0$, as required, but also within the causal past of a spacetime point of $R_1$. Thus, $L_0^B$ can communicate $t_0$ to $L_1^B$ in a step labelled by 7, with reception by $L_1^B$ taking place in the causal past of a spacetime point of $R_1$. On the other hand, the step (labelled by 5) in which $L_1^A$ communicates $t_1$ to $L_1^B$ takes place within the causal past of at least one spacetime point of $R_1$, as required, but not within the causal past of any spacetime point of $R_0$. Thus, $L_1^B$ cannot communicate $t_1$ to $L_0^B$ so that $L_0^B$ receives it in the causal past of at least one spacetime point of $R_0$. In the illustrated example Bob obtains the message $r_0$ in the causal past of a spacetime point of $R_i$, for both $i \in \{0,1\}$. Additionally, in this example, the permutation $\pi$ is simply the identity permutation, hence, $t_i$ encodes $x_i$ using $r_i$, for $i \in \{0,1\}$. Therefore, $L_0^B$ has s, $r_0$ and $t_0$ in the causal past of a spacetime point of $R_0$ and can compute and output $x_0$ in $R_0$ (step labelled by 6). Furthermore, $L_1^B$ also has s, $r_0$ and $t_0$ in the causal past of a spacetime point of $R_1$ and can compute and output $x_0$ in $R_1$ too (step labelled by 8). However, since the method described in the embodiments discussed above (in previous sections) provides that Bob cannot effectively obtain $r_1$ in $R_1$, because he chooses to obtain $r_0$ in $R_0$, Bob cannot effectively obtain $x_1$ in $R_1$, as this requires to have both $t_1$ and $r_1$ in the causal past of at least one spacetime point of $R_1$. Furthermore, since Bob cannot receive $t_1$ in the causal past of at least one spacetime point of $R_0$, Bob could not obtain $x_1$ in $R_0$, if he had chosen to obtain $r_1$ in $R_1$ (to obtain $x_1$ in $R_1$) rather than $r_0$ in $R_0$.

In FIG. 8, the step in which $L_0^A$ communicates $t_0$ to $L_0^B$ (step labelled by 4) is not in the causal past of any spacetime point of the spacetime region $R_1$. Thus, differently to the case illustrated in FIG. 7, Bob cannot receive to in the causal past of any spacetime point of $R_1$, hence, Bob cannot obtain $x_0$ in $R_1$. Similarly to FIG. 7, the step in which $L_1^A$ communicates $t_1$ to $L_1^B$ (step labelled by 5) is not in the causal past of any spacetime point of the spacetime region $R_0$, hence, Bob could not obtain $x_1$ in $R_0$, if he had chosen to obtain $r_1$ in $R_1$ (to obtain $x_1$ in $R_1$) rather than $r_0$ in $R_0$.

For $i \in I_A$, in embodiments in which the messages $x_i$ and $r_{l_i}$ are strings of $n_i$ bits, the encoding $t_i$ of $x_i$ using $r_{l_i}$ may be given, for example, by $t_i = x_i \oplus r_{l_i}$, wherein '$\oplus$' denotes bitwise sum modulo 2; in which case $x_i$ is decoded as $x_i = t_i \oplus r_{l_i}$. Thus, if Bob obtains a message $r'_{l_i}$ that is not exactly equal to $r_{l_i}$, but which is close according to the Hamming distance $d(r'_{l_i}, r_{l_i}) \leq \delta_i$ for some small integer number $\delta_i$, then Bob can compute a message $x'_i = t_i \oplus r'_{l_i}$ which is also close to the message $x_i$, satisfying $d(x'_i, x_i) = d(r'_{l_i}, r_{l_i}) \leq \delta_i$. Alice and Bob may agree in advance on a threshold for which Bob's output message $x'_i$ may be considered correct, for example, they may agree that it should hold that the Hamming distance satisfies $d(x'_i, x_i) \leq n_i \gamma_i$, for some small positive number $\gamma_i < 1$, for $i \in I_M$. This property also applies to the embodiments discussed above in which M=m and $l_i=\pi(i)$, for $i \in I_m$ and for a permutation $\pi$ of the elements from the set $I_m=\{0, 1, \ldots, m-1\}$.

This extension of the SCOT method of the present invention is particularly useful in embodiments in which it takes a considerably long time to complete the step in which the quantum state $|\Psi_r^s\rangle$ is transmitted to Bob's laboratory $L^B$ and is convenient that Alice chooses her input message $x_i$ just slightly in the past of a spacetime point of $R_i$, for $i \in I_A$. For example, in embodiments in which Alice's laboratory $L^A$ encodes the quantum state $|\Psi_r^s\rangle$ by transmitting photons to Bob's laboratory $L^B$, because of the losses on the quantum channel and the non-unit detection efficiencies of the photon-detectors, it could take a considerably long time for Bob's laboratory $L^B$ to detect a sufficiently large number of photons able to encode messages $r_i$ of many bits, for $i \in I_m$. This time could be, for example, some seconds, minutes, hours, or even a few days. However, in some applications, it would be necessary that messages $x_i$ are chosen by Alice in real time, for $i \in I_A$, i.e choosing these messages hours or days, or even a few seconds, in advance to the time at which Bob is able to receive them might not be useful for Bob.

For example, in some applications in the stock market, for $i \in I_M$, $x_i$ may correspond to some financial information generated by Alice in some local stock market with location $L_i$ at real time, and the output spacetime region may correspond to the location $L_i$ of the corresponding market slightly in the future of Alice generating $x_i$. In some embodiments relating to the stock market, small latencies of the order of fractions of a millisecond are very important. For example, in high frequency trading strategies (HFT) in the stock market, many transactions are completed within half a millisecond. Alice may be a financial institution selling financial information about several international stock markets at real time. Bob may be a trader who buys information from Alice in order to trade using HFT strategies. The output spacetime regions may correspond to the locations of some international stock markets within a small interval of time (e.g. of the order of half a millisecond). Alice's input messages $x_i$ may be the messages that Alice offers to Bob, from which Bob may only access one of his choice at the respective stock market within the corresponding small interval of time.

B.2 Giving Bob More Freedom on the Time at which he Generates his Input

In the SCOT method described above, Bob must choose what message $r_c$ to obtain from Alice's encoded messages $r_0$, $r_1, \ldots, r_{m-1}$ at the time, or before, his laboratory $L^B$ performs the quantum measurement $M_c$ on the transmitted quantum state $|\Psi_r^s\rangle$. This means, for example, in the extended SCOT method considered above that Bob chooses to obtain Alice's message $x_i$ (or a message $x_i'$ sufficiently close to $x_i$ according to a predetermined threshold) in a plurality of output spacetime regions that may include $R_i$, for a plurality of numbers $i \in I_M$ with the property that $l_i = c$, at the time or before the quantum measurement $M_c$ is implemented on the quantum state by his laboratory $L^B$—recalling that Alice encodes her message $x_i$ with a message $t_i$ and the message $r_{l_i}$, for $l_i \in I_m$ and $i \in I_A$. For example, in the embodiments discussed above with M=m and $l_i = \pi(i)$ for $i \in I_m$ with $\pi$ an arbitrary permutation of the m elements from the set $I_m$, Bob chooses to obtain Alice's message $x_{\pi^{-1}(c)}$ in a plurality of output spacetime regions that may include $R_{\pi^{-1}(c)}$, at the time, or before, the quantum measurement $M_c$ is implemented on the quantum state by his laboratory $L^B$. Here the SCOT method of the present invention is extended further so that Bob has more freedom on the time at which he chooses which of Alice's messages $x_0, x_1, \ldots, x_{m-1}$ he wants to learn, for example, within his laboratory $L^B$ after the quantum measurement $M_c$ is completed.

Below, embodiments satisfying M=m and Alice's message $x_i$ being encoded by a message $t_i$ and by the message $r_{l_i} = r_{\pi(i)}$, are considered again, for $i \in I_A$, and where $\pi$ is an arbitrary permutation of the m elements from the set $I_m$. The laboratory $L^B$ obtains a number $b \in I_B$. The laboratory $L^B$ communicates b to a plurality of laboratories $L_i^B$, for $i \in B$, including at least the laboratory $L_b^B$. The laboratory $L^B$ computes the number b'=b+c modulo m, and transmits it to the laboratory $L^A$. The laboratory $L^A$ transmits the number b' to the laboratory $L_i^A$, for $i \in I_A$. Alice and Bob agree in advanced that the permutation $\pi$ of the SCOT method above would be $\pi(i)$=b'−i modulo m. It follows that $\pi^{-1}(c)$=b and $\pi(b)$=c. Therefore, Bob effectively obtains $r_c$ in a plurality of output spacetime regions that includes $R_b$, and Bob effectively computes the message $x_b$ from $t_b$ and $r_{\pi(b)} = r_c$ in a plurality of output spacetime regions that includes $R_b$. Thus, the property I) of the method described in some embodiments above (in previous sections) may continue to hold.

Figure 9:
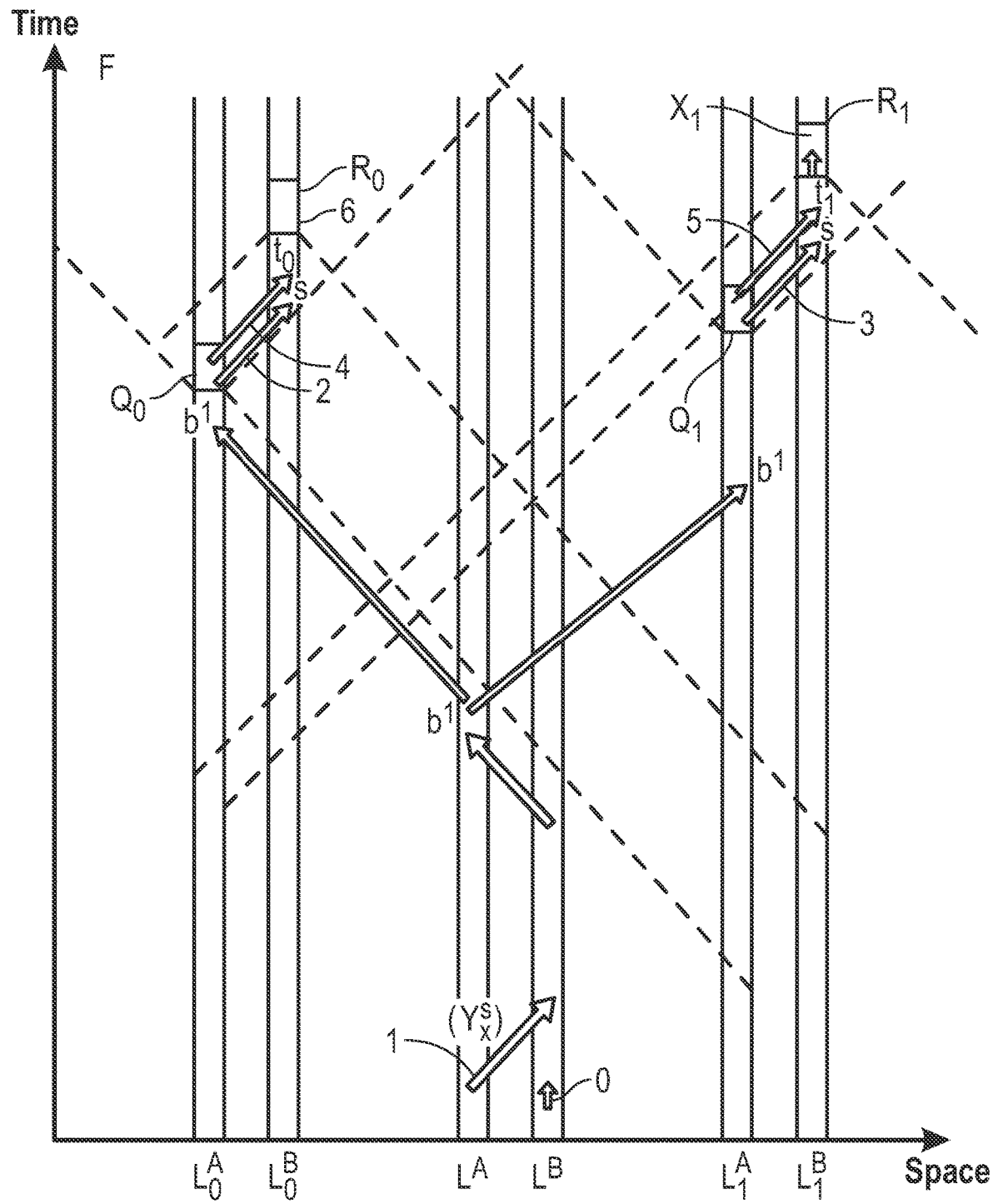
FIG. 9 shows a two-dimensional spacetime diagram in accordance with one or more embodiments.

FIG. 9 illustrates this extended SCOT method for the simple example m=M=2 and $I_A = I_B = \{0,1\}$ in a two dimensional spacetime diagram in which spacetime is Minkowski, or approximately Minkowski, in a reference frame F. The worldlines in spacetime of Alice's and Bob's laboratories, and the spacetime regions $Q_0, Q_1, R_0$ and $R_1$ are illustrated. The dotted lines represent light rays enclosing light cones. The steps labelled by the numbers 1, 2, 3, 4, and 5 correspond to actions performed for the method described in some embodiments above (in previous sections), for example, those of FIG. 8. The step labelled by the number 0 corresponds to Bob's laboratory $L^B$ obtaining the input c=0, meaning the measurement $M_0$ is implemented on the received quantum state $|\Psi_r^s\rangle$. It is also illustrated how the laboratory $L^B$ inputs b=1 and then computes b'=b+c modulo 2, which corresponds to b'=b⊕c=1 in the illustrated example, and then b' is transmitted to Alice's laboratory $L^A$, which then communicates it to $L_i^A$, for $i \in \{0,1\}$. In this example the step is illustrated in which Bob outputs $x_b = x_1$ in the output spacetime region $R_b = R_1$.

The extended SCOT method of the present invention described above allows Bob to have more freedom on the time when he chooses the number $b \in I_B$, as he can choose this number after the quantum measurement $M_c$ is completed. It may be a feature that the steps in which Bob's laboratory $L^B$ obtains $b \in I_B$, computes b'=b+c modulo m, and transmits it to the laboratory $L^A$, are completed within the intersection of the causal past of at least one spacetime point of $R_i$ for all $i \in I_A$, or for all $i \in I_m$. This property allows Alice's laboratory $L^A$ to transmit b' to Alice's laboratory $L_i^A$ on time so that it receives it within the intersection of the causal past of at least one spacetime point of $R_i$, and can then compute $t_i$ using $x_i$ and $r_{b'-i}$ and then transmit it within the intersection of the causal past of at least one spacetime point of $R_i$, for all $i \in I_A$.

If c is randomly chosen by Bob's laboratory $L^B$ from $I_m$, and the security condition that Alice cannot obtain any (or much) information about c anywhere in spacetime is satisfied, as stated by the property II) in the method of some embodiments described above (in previous sections), then Alice cannot obtain any (or much) information about b from the message b'=b+c modulo m that Alice's laboratory $L^A$ receives from Bob's laboratory $L^B$. Thus, the condition of security against Alice, property II), may still hold in this extended method.

The security condition III) (security against Bob) holds in the extended method of the present invention described here. This means that Bob cannot effectively obtain a message $x_i'$ in the output spacetime region $R_i$ and a message $x_j'$ in the output spacetime region $R_j$, with $x_i'$ and $x_j'$ being respectively equal or close to $x_i$ and $x_j$ according to a predetermined threshold, for any pair of different numbers i, j from the set $I_m$. Consider a general cheating strategy by Bob in which he tries to output a message $x_i'$ in the output spacetime region $R_i$ and a message $x_j'$ in the output spacetime region $R_j$, with $x_i'$ and $x_j'$ being respectively equal or close to $x_i$ and $x_j$ according to a predetermined threshold, for some pair of different numbers i, j from the set $I_m$. Since Alice encodes the message $x_i$ with the messages $t_i$ and $r_{b'-i}$, satisfying the property that $x_i$ cannot be decoded effectively with $t_i$ only, or with $r_{b'-i}$ only, for $i \in I_m$ and since Alice gives Bob the message $t_i$ (in the causal past of a spacetime point of $R_i$) and encodes the messages $r_0, r_1, \ldots, r_{m-1}$, in the quantum state $|\Psi_r^s\rangle$ that she gives Bob, Bob's general cheating strategy consists in obtaining a guess $r'_{b'-i}$ of $r_{b'-i}$ in the causal past of a spacetime point of $R_i$ and a guess $r'_{b'-j}$ of $r_{b'-j}$ in the causal past of a spacetime point of $R_j$ using s, respectively, in order to obtain a message $x_i'$ in $R_i$, using $r'_{b'-i}$ and $t_i$, and a message $x_j'$ in $R_j$, using $r'_{b'-j}$ and $t_j$, wherein $x_i'$ and $x_j'$ are respectively equal or close to $x_i$ and $x_j$ according to a predetermined threshold, if $r'_{b',i}$ and $r'_{b',j}$ are respectively equal to or close to $r_{b',i}$ and $r_{b',j}$ according to a predetermined threshold.

In order to show unconditional security against Bob, it is assumed that $I_B = I_m$, i.e. that Bob has enough laboratories for this to hold. It is recalled that embodiments satisfying M=m are being considered. Similarly, it is assumed that $I_A = I_m$, as if Bob cannot cheat if $I_A = I_m$ then it is even more difficult for Bob to cheat if $I_A$ is a proper subset of $I_m$. Therefore, Bob's general strategy consists of three main steps. In the first step, Bob's laboratory $L^B$ receives the quantum state $|\Psi_r^s\rangle$ in a quantum system A from Alice's laboratory $L^A$ and applies a quantum operation O on A and an extra ancillary system E consisting in a unitary operation U on AE, independent of r and independent of s, producing two quantum systems $B_0$ and $B_1$, including also a measurement $\tilde{M}'$ producing a classical outcome (b', i, j)∈Γ encoded in a system B'', where $\Gamma = \{(k, i, j) \in I_m \times I_m \times I_m | i \neq j\}$. $L^B$ then sends b' to $L^A$ (who sends b' to $L_k^A$, for k∈$I_m$) and he sends the quantum system $B_0$ and the classical message (b', i, j) encoded in a classical system $B_0''$ to Bob's laboratory $L_i^B$, and the quantum system $B_1$ and the classical message (b', i, j) encoded in a classical system $B_1''$ to Bob's laboratory $L_j^B$. Thus, $L^B$ sends $B_0 B_0''$ to $L_i^B$ and $B_1 B_1''$ to $L_j^B$, while B'' is held by $L^B$, except for b', which $L^B$ sends to $L^A$.

In the second step, after reception of s from $L_i^A$, and after reception of the classical message (b', i, j) and of the quantum system $B_0$ from $L^B$, $L_i^B$ applies a quantum measurement $\tilde{M}_{0,b',i,j}^s$—depending on both s and (b', i, j)—on $B_0$ and obtains the guess $r'_{b',i}$ of $r_{b',i}$. Similarly, after reception of s from $L_j^A$, and after reception of the classical message (b', i, j) and of the quantum system $B_1$ from $L^B$, $L_j^B$ applies a quantum measurement $\tilde{M}_{1,b',i,j}^s$ on $B_1$ and obtains the guess $r'_{b',j}$ of $r_{b',j}$.

As shown in the Appendix, the two steps above are mathematically equivalent to the following situation. More precisely, for any pair of different numbers i, j∈$I_m$, it is shown that the joint probability that Bob's laboratory $L_i^B$ obtains a particular outcome $r'_{b',i}$ as his guess of $r_{b',i}$ and Bob's laboratory $L_j^B$ obtains a particular outcome $r'_{b',j}$ as his guess of $r_{b',j}$ in the procedure of the two steps above is the same in the procedure described in the paragraph below.

Bob's laboratory $L^B$ applies a quantum operation O' on the received quantum state $|\Psi_r^s\rangle_A$ and an extra ancillary system $E' = EB_0''B_1''B''$, producing two quantum systems $B_0' = B_0 B_0''B''$ and $B_1' = B_1 B_1''$. The operation O' consists in $L^B$ applying the unitary operation U on AE of the quantum operation O above, partitioning AE into two subsystems $B_0$ and $B_1$, applying the quantum measurement $\tilde{M}'$ on $B_0 B_1$ and preparing each of the quantum systems $B_0''$, $B_1''$ and B'' in a quantum state $|\mu_{b',i,j}\rangle$, conditioned on the outcome of $\tilde{M}'$ being (b', i, j), for (b', i, j)∈Γ, where $\{|\mu_{b',i,j}\rangle | (b', i, j) \in \Gamma\}$ is an orthonormal basis of each of the quantum systems $B_0''$, $B_1''$ and B''. Conditioned on the outcome of $\tilde{M}'$ being (b', i, j), $L^B$ sends b' to Alice's laboratory $L^A$ in part of the system B'', and $L^B$ sends the joint system $B_0 B_0''$ ($B_1 B_1''$) to Bob's laboratory $L_i^B$ ($L_j^B$). A quantum measurement $\tilde{M}_0^s$ is applied on the joint system $B_0' = B_0 B_0''B''$, with $L_i^B$ obtaining the outcome $r'_{b',i}$ from $B_0 B_0''$, which is his guess of $r_{b',i}$. Bob's laboratory $L_j^B$ applies a quantum measurement $\tilde{M}_1^s$ on the joint system $B_1' = B_1 B_1''$ and obtains a classical outcome $r'_{b',j}$, which is his guess of $r_{b',j}$.

Finally, in the third step, after reception of the message $t_i$ from $L_i^A$, $L_i^B$ computes his guess $x_i'$ of $x_i$, using $t_i$ and $r'_{b',i}$, and outputs it in $R_i$. Similarly, after reception of the message $t_j$ from $L_j^A$, $L_j^B$ computes his guess $x_j'$ of $x_j$, using $t_j$ and $r'_{b',j}$, and outputs it in $R_j$.

As follows from the method of the present invention, for any quantum operation O independent of r and independent of s on the quantum state $|\Psi_r^s\rangle$ producing quantum systems $B_0'$ and $B_1'$, the probability to obtain respective outcomes $r'_{b',i}$ and $r'_{b',j}$ that are respectively very close to $r_{b',i}$ and $r_{b',j}$ according to a predetermined threshold, by respectively applying $\tilde{M}_0^s$ on $B_0'$ and $\tilde{M}_1^s$ on $B_1'$, is smaller than unity, which may be negligible, and which may decrease exponentially with n in embodiments in which $r_0, r_1, \ldots, r_{m-1}$ can be expressed as strings of n bits, for any pair of different numbers i, j∈$I_m$. It follows that for any pair of different numbers i, j∈$I_m$, the probability that Bob obtains a message $x_i'$ in the output spacetime region $R_i$ sufficiently close to $x_i$ according to a predetermined threshold, and a message $x_j'$ in the output spacetime region $R_j$ sufficiently close to $x_j$ according to a predetermined threshold, is smaller than unity, which may be negligible, and which may decrease exponentially with n in embodiments in which $r_0, r_1, \ldots, r_{m-1}$ can be expressed as strings of n bits.

The extension above allows Bob's laboratory $L^B$ to have the freedom to choose his input b after the quantum state that is transmitted to $L^B$ by Alice's laboratory $L^A$ has been received and measured; this is useful in situations where the transmission, reception and measurement of the quantum state takes a long time (e.g., from seconds to minutes, hours, or even days), while Bob wants to decide which message to obtain within a short time (e.g., a fraction of a second) in the past of the output spacetime regions $R_0, R_1, \ldots, R_{m-1}$. Additionally, Alice's laboratory $L^A$ has the freedom to send the messages s, $r_0, r_1, \ldots, r_{m-1}$ to Alice's laboratory $L_i^A$ before knowing b', for i∈$I_A$; this is helpful when b' is announced by $L^B$ to $L^A$ slightly in the past (e.g., a fraction of a second in the past) of the spacetime regions $R_0, R_1, \ldots, R_{m-1}$ and given that the size of the messages s, $r_0, r_1, \ldots, r_{m-1}$ could be considerably large it could be easier and less expensive for Alice to send these via conventional classical channels (e.g., Internet channels) which could take a considerably long time to transmit the messages (e.g., a few minutes) rather than via faster classical channels.

Different variations may be considered. For example, in one variation Bob's laboratory $L^B$ does not send b to the laboratory $L_i^B$, which acts assuming that b=i, for i∈$I_B$. In another variation, Alice's laboratory $L^A$ obtains or generates $x_i$ in the causal past of at least one spacetime point of $R_i$ and sends $x_i$ to the laboratory $L_i^A$, who receives it in the causal past of at least one spacetime point of $R_i$, for i∈$I_A$.

B.3 Applications to the Secure Exchange of Information about the Trajectories of Moving Objects As mentioned above, a potential application of SCOT corresponds to situations where Alice and Bob have moving objects, probably at high speeds, for which they want to keep their locations and trajectories secret to the other party. But some information about their locations or trajectories must be disclosed to the other party in some situations, for example if there is danger of collision. Particularly, one potential application of SCOT is related to the avoidance of the collision of satellites. Consider that the owners of two satellites want to keep their satellite's trajectories secret, while avoiding their satellites to collide.

Consider that Alice has a satellite $L_a^A$ and Bob has another satellite $L_b^B$. They want to keep their trajectories secret from each other, but they want to avoid their satellites to collide. In addition to $L_a^A$ ($L_b^B$), Alice (Bob) may have further satellites or laboratories in different regions of space. Alice and Bob perform a SCOT protocol, which might reveal some information from Alice to Bob about the planned trajectory of Alice's satellite $L_a^A$. The SCOT method of the present invention may provide to Bob that Alice does not obtain much information about the location of Bob's satellite for large m: the larger is m the less information Alice has about the location of Bob's satellite $L_b^B$. It may be provided to Alice and Bob that if they follow the protocol honestly, then Bob's satellite $L_b^B$ obtains information about the planned trajectory of Alice's satellite $L_a^A$ only if there is risk of collision, in which case Bob's satellite can change its planned trajectory and avoid collision. Additionally, some embodiments may provide to Alice that if Bob does not follow the protocol honestly, the probability that any of Bob's laboratories learns the future trajectory planned for Alice's laboratory $L_a^A$ is small for large m. Moreover, some embodiments also may provide that satellites from a third party Charlie, who does not perform SCOT with Alice (nor with Bob), do not obtain any information about the planned trajectories of Alice's and Bob's satellites.

Figure 10:
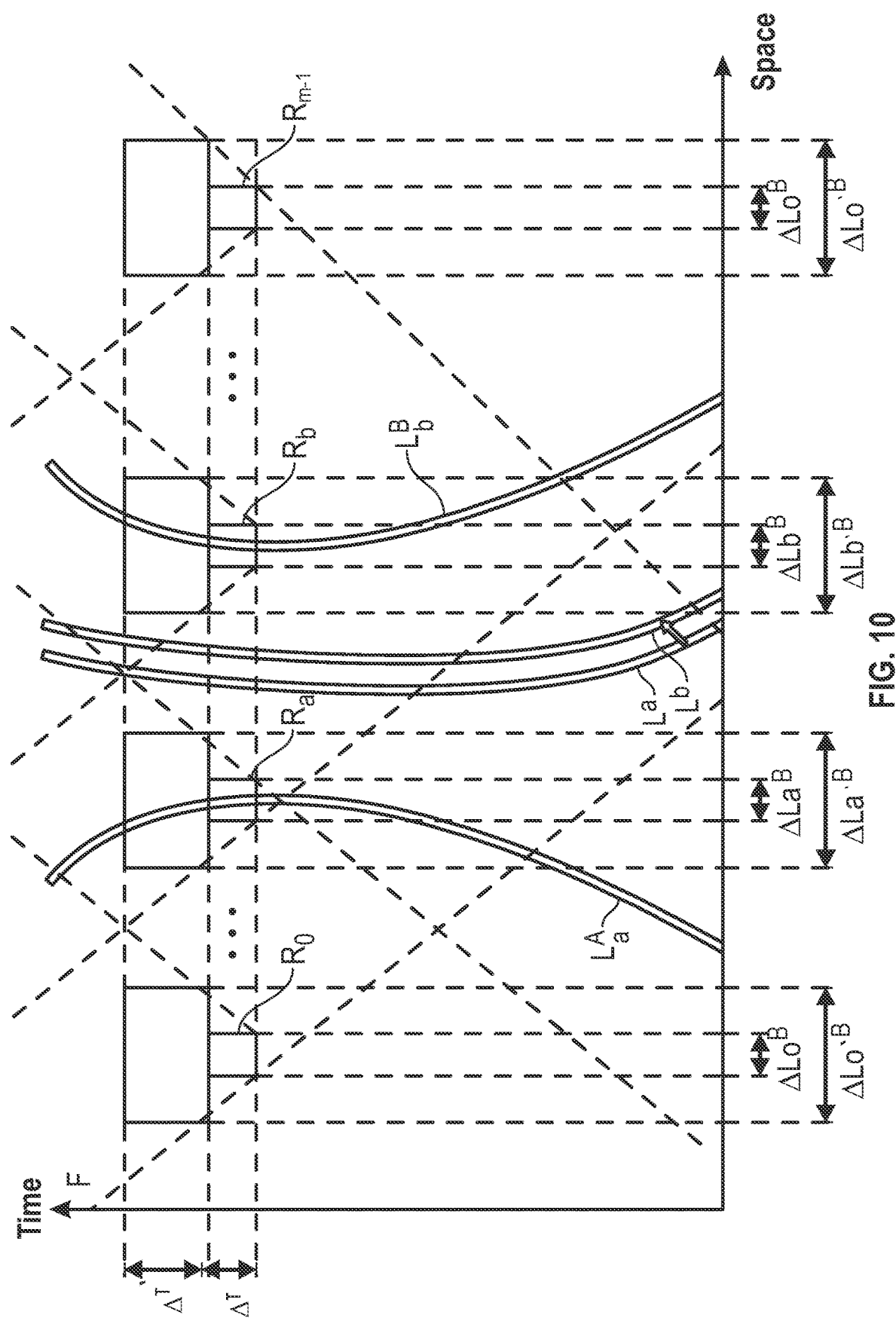
FIG. 10 shows a two-dimensional spacetime diagram in accordance with one or more embodiments.

FIG. 10 illustrates the following situation in a two-dimensional spacetime diagram in a spacetime that is approximately Minkowski, as in the region of satellites orbiting the Earth. Dotted lines represent light rays enclosing light cones. Alice and Bob agree in a reference frame F, where the following spacetime coordinates are defined. Bob owns a satellite that within a short interval of time $\Delta\tau'$ is programmed to be in one of m continuous regions of three-dimensional space $\Delta L_0'^B$, $\Delta L_1'^B$, $\Delta L_{m-1}'^B$. Alice owns another satellite. Examples of worldlines of Alice's and Bob's satellites are illustrated. Alice's satellite is labelled as $L_a^A$, and Bob's satellite is labelled as $L_b^B$. Alice and Bob have close laboratories $L^A$ and $L^B$ on the Earth surface to implement the quantum communication stage of the method, in which the quantum state $|\Psi_r^s\rangle$ is transmitted to Bob's laboratory $L^B$, where $r=(r_0, r_1, \ldots, r_{m-1})$. Alice and Bob agree that the output spacetime region $R_j$ of some embodiments is the three-dimensional region of space $\Delta L_j^B$ within a time interval $\Delta\tau$, which is slightly in the past of the time interval $\Delta\tau'$, where $\Delta L_j'^B$ is a neighborhood of $\Delta L_j^B$, as illustrated, for $j \in I_m$. The spacetime region $R_i$ is defined as the set of spacetime points with three dimensional space coordinates $\Delta L_i^B$ and time interval $\Delta\tau$, for $i \in I_m$. The regions $\Delta L_0^B, \Delta L_1^B, \ldots, \Delta L_{m-1}^B$ are sufficiently far away and the time interval $\Delta T$ is short enough so that the spacetime regions $R_0, R_1, \ldots, R_{m-1}$ are pair-wise causally disconnected, as required by the method. Alice and Bob perform the extended SCOT method of the present invention in which Alice can input messages $x_i$ in real time, i.e. slightly in the past of $R_i$, for $i \in I_A$, and Bob can input $b \in I_m$ slightly in the past of the output spacetime regions $R_0, R_1, \ldots, R_{m-1}$ using the encoding b'=b+c modulo m. Bob inputs the set $I_B=\{b\}$ for some $b \in I_m$, where the value of b indicates that Bob's satellite is planned to be in $\Delta L_b'^B$ within the time interval $\Delta\tau'$. For $a \in I_m$, if Alice's satellite is programmed to pass by $\Delta L_a'^B$ within the time interval $\Delta\tau'$, then Alice performs the following actions: Alice inputs the set $I_A=\{a\}$; Alice's satellite inputs a message $x_a$ indicating her future programmed trajectory within the time interval $\Delta\tau'$; Alice's satellite transmits the message $t_a$ that encodes $x_a$ using $r_{b'·a}$, and also the message s so that these messages can be received in $\Delta L_a^B$ within the time interval $\Delta\tau$. If a=b then Bob's satellite receives s and $t_b$ in $\Delta L_b^B$ within the time interval $\Delta\tau$ and decodes $r_{b'·b}=r_c$ using s, and c and the measurement outcome d received from $L^B$, and then decodes $x_b$ using $r_c$ and $t_b$, in which case if there is danger of collision Bob's satellite can change his trajectory on time to avoid collision. It follows that satellites of a third party Charlie who has not performed SCOT with Alice or Bob cannot learn Alice's information $x_a$ nor the location of Bob's satellite. If Alice's satellite sends $t_a$ (and s) within a spacetime region $Q_a$ satisfying a property that it is not causally connected to any output spacetime region $R_j$, for $j \in I_m \setminus \{a\}$ (in addition to be in the causal past of at least one spacetime point of $R_a$), and if $a \neq b$, then Bob's satellite does not learn $x_a$ within the time interval $\Delta\tau$. Bob could in principle learn $x_a$ in a future time, but he would require sufficient resources in space to be able to intercept Alice's transmitted messages s and $t_a$. Furthermore, Bob could have other satellites, laboratories, or devices in different regions of space trying to track Alice's satellite and/or trying to learn its programmed future trajectory. The method guarantees to Alice that within the time interval $\Delta\tau$, Bob cannot effectively learn the information $x_a$ on the programmed trajectory of Alice's satellite $L_a^A$ for the time interval $\Delta\tau'$ unless Bob followed the SCOT method honestly and input b=a, which has a small probability for large m if Bob does not have a priori any, or much, information about Alice's input a from the set $\{0, 1, \ldots, m-1\}$. Moreover, Alice cannot learn Bob's input b, hence, she has little information about the location that Bob's satellite has within the time interval $\Delta\tau'$, for m large: the larger m the less information Alice has. FIG. 10 illustrates the case $a \neq b$. This method can be iterated several times to extend the time interval of its application.

B.4 Extension to Higher Number of Messages

The method of the present invention can be extended to situations in which, in addition to the steps of the method described above (in previous sections), for a plurality of numbers $i \in I_A$: Alice's laboratory $L_i^A$ inputs a plurality of messages $x_i^{(k)}$, for $k \in I_{N_i}=\{0, 1, \ldots, N_i-1\}$, in the causal past of at least one spacetime point of $R_i$, for some integer $N_i \geq 1$; the laboratory $L_i^A$ computes a plurality of messages $t_i^{(k)}$ in the causal past of at least one spacetime point of $R_i$, wherein $t_i^{(k)}$ is an encoding of $x_i^{(k)}$ using $r_{l_i^k}$, the encoding $t_i^{(k)}$ satisfying the property that $x_i^{(k)}$ can be obtained effectively from $t_i^{(k)}$ and $r_{l_i^k}$, and that $x_i^{(k)}$ cannot be obtained effectively from $t_i^{(k)}$ only, or from $r_{l_i^k}$ only, wherein $r_{l_i^k} \in \{r_0, r_1, \ldots, r_{m-1}\}$, i.e. $l_i^k \in I_m$, for $k \in I_{N_i}$; the laboratory $L_i^A$ transmits the plurality of messages $t_i^{(k)}$ within the causal past of at least one spacetime point of the spacetime region $R_i$; the laboratory $L_i^B$ receives the plurality of messages $t_i^{(k)}$ within the causal past of at least one spacetime point of the spacetime region $R_i$, if $i \in I_B$; the laboratory $L_i^B$ computes $x_i^{(k)}$ (or a message $x_i'^{(k)}$ sufficiently close to $x_i^{(k)}$ according to a predetermined threshold) from $t_i^{(k)}$ and $r_{l_i^k}$ (or a message $r_{l_i^k}'$ sufficiently close to $r_{l_i^k}$ according to a predetermined threshold) in the spacetime region $R_i$, or in the causal past of at least one spacetime point of $R_i$, if $i \in I_B$ and if the laboratory $L_i^B$ decodes $r_{l_i^k}$ (or a message $r_{l_i^k}'$ sufficiently close to $r_{l_i^k}$ according to a predetermined threshold) in $R_i$ or in the causal past of at least one spacetime point of $R_i$.

In some embodiments, for a plurality of numbers $i \in I_A$ and for $k \in I_{N_i}$: the messages $x_i^{(k)}$ and $r_{l_i^k}$ are strings of $n_i^{(k)}$ bits; the encoding $t_i^{(k)}$ is given by $t_i^{(k)}=x_i^{(k)} \oplus r_{l_i^k}$; the decoding $x_i^{(k)}$ is given by $x_i^{(k)}=t_i^{(k)} \oplus r_{l_i^k}$; wherein '$\oplus$' denotes bit-wise sum modulo 2.

C. FINAL REMARKS

Figure 13:
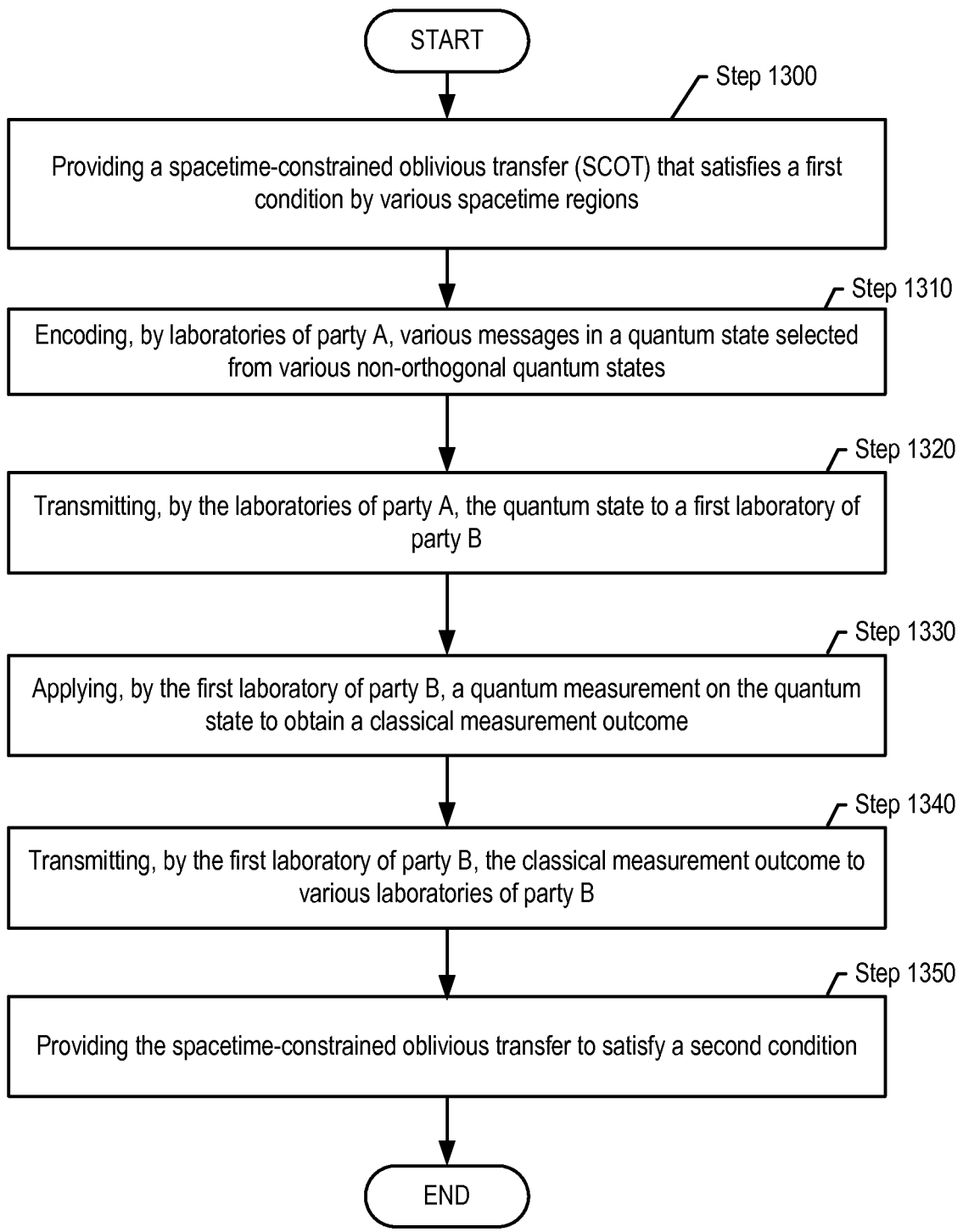
FIG. 13 shows a flowchart in accordance with one or more embodiments.

Turning to FIG. 13, a method for performing spacetime-constrained oblivious transfer (SCOT) according to various embodiments is illustrated. One or more blocks in FIG. 13 may be performed by one or more components as described above in FIGS. 1-12. While the various blocks in FIG. 13 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Step 1300, a spacetime-constrained oblivious transfer is provided that satisfies a first condition by various spacetime regions in accordance with one or more embodiments. The conditions may be similar to one or more conditions described above with respect to FIGS. 1-12 and the accompanying description. In Step 1310, various message are encoded by various laboratories of party A in a quantum state selected from various non-orthogonal quantum states in accordance with various embodiments. In Step 1320, a quantum state is transmitted by various laboratories of party A to a first laboratory of party B in accordance with various embodiments. In Step 1330, a quantum measurement is applied by the first laboratory of party B on the quantum state to obtain a classical measurement outcome in accordance with various embodiments. In Step 1340, the classical measurement outcome is transmitted by the first laboratory of party B to various laboratories of party B in accordance with one or more embodiments. In Step 1350, the spacetime-constrained oblivious transfer is provided to satisfy a second condition in accordance with one or more embodiments.

Multiple variations of the above described systems and methods in accordance with one or more embodiments exist. For example, information may be encoded in qubits implemented in quantum systems in various ways, including the polarization degrees of freedom of photons, the time-bin degrees of freedom of photons, or the spin degrees of freedom of electrons, atoms, nucleus, molecules, etc. Further, while the above described systems and methods do not rely on quantum memory, alternatives that include quantum memories may be implemented in accordance with various embodiments. Alice's and Bob's laboratories may contain quantum memories, which allow the generated quantum states by Alice to be stored in Alice's and Bob's laboratories at different steps of the above described method.

Figure 14:
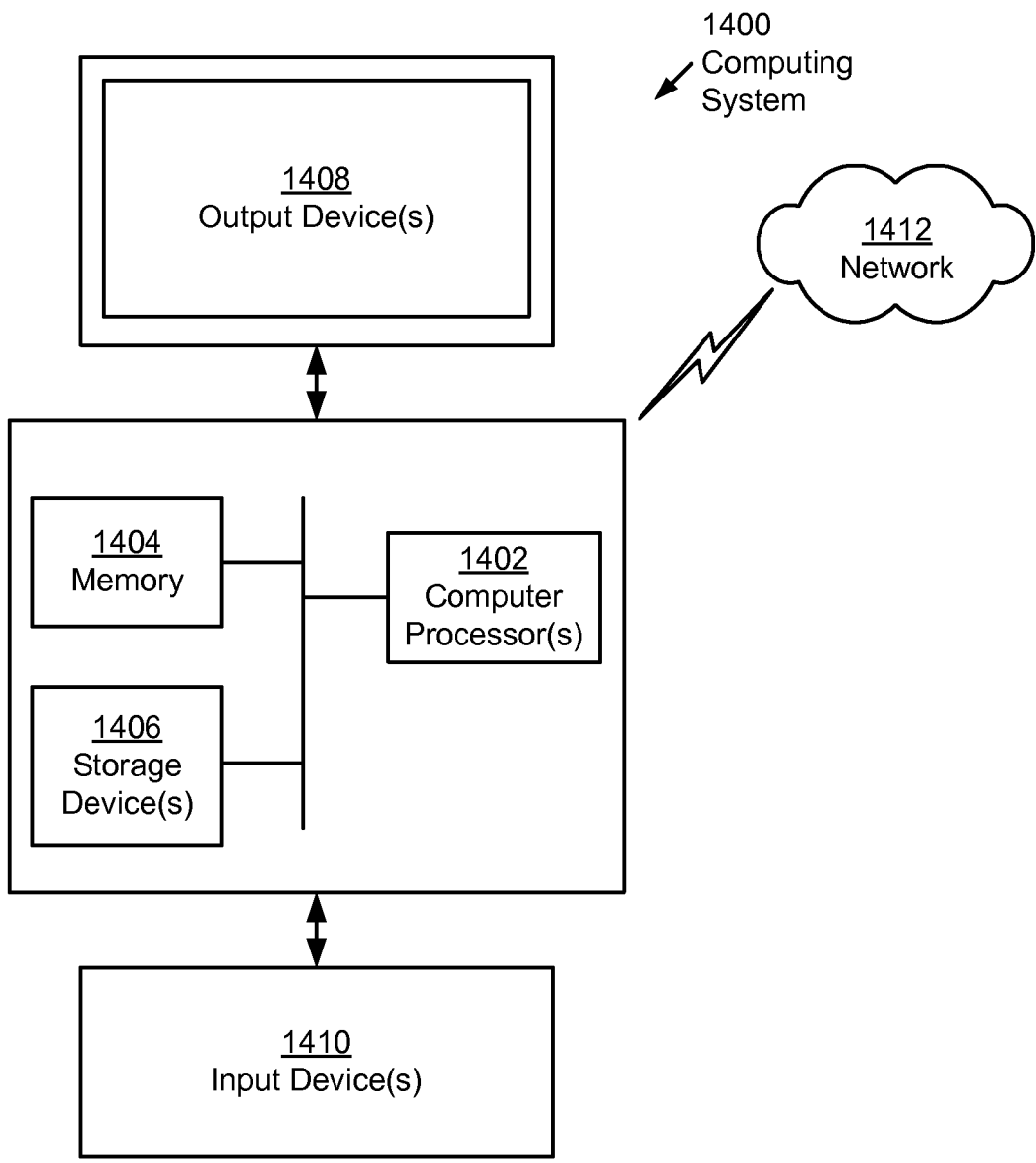
FIG. 14 shows a computing system in accordance with one or more embodiments.

Embodiments may be implemented on a computing system. Any combination of mobile, desktop, server, router, switch, embedded device, or other types of hardware may be used. For example, as shown in FIG. 14, the computing system (1400) may include one or more computer processor(s) (1402), associated memory (1404) (e.g., random access memory (RAM), cache memory, flash memory, etc.), one or more storage device(s) (1406) (e.g., a hard disk, an optical drive such as a compact disk (CD) drive or digital versatile disk (DVD) drive, a flash memory stick, etc.), and numerous other elements and functionalities. The computer processor(s) (1402) may be an integrated circuit for processing instructions. For example, the computer processor(s) may be one or more cores, or micro-cores of a processor. The computing system (1400) may also include one or more input device(s) (1410), such as a touchscreen, keyboard, mouse, microphone, touchpad, electronic pen, or any other type of input device. Further, the computing system (1400) may include one or more output device(s) (1408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1400) may be connected to a network (1412) (e.g., a local area network (LAN), a wide area network (WAN) such as the Internet, mobile network, or any other type of network) via a communication interface connection (not shown). The input and output device(s) may be locally or remotely (e.g., via the network (1412)) connected to the computer processor(s) (1402), memory (1404), and storage device(s) (1406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (1400) may be located at a remote location and connected to the other elements over a network (1412). Additionally, embodiments may be implemented on a distributed system having a plurality of nodes, where each portion of the invention may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

D. APPENDIX

Here it is shown that the following two procedures (1) and (2) described below are mathematically equivalent. More precisely, for any pair of different numbers i, $j \in I_m$, it is shown that the joint probability that Bob's laboratory $L_i^B$ obtains a particular outcome $e_i$ as its guess of $r_{b',i}$ and Bob's laboratory $L_j^B$ obtains a particular outcome $e_j$ as its guess of $r_{b',j}$ in procedure (1) is the same in procedure (2), for any $e_i, e_j \in \Omega$, where it is assumed that $\Omega$ is the set of possible values of $r_k$, for $k \in m$.

In the procedure (1), Bob's laboratory $L^B$ receives the quantum state $|\Psi_r^s\rangle$ in a quantum system A from Alice's laboratory $L^A$, it introduces an ancillary system E and applies a unitary operation U on AE, then it applies a quantum measurement $\tilde{M}'$ on AE obtaining a classical outcome (b', i, j)$\in\Gamma$, with (b', i, j) being recorded in systems $B_0''$, $B_1''$ and B'', where $\Gamma = \{(k, i, j) \in I_m \times I_m \times I_m \times I_m | i \neq j\}$. $L^B$ partitions the joint system AE into $B_0$ and $B_1$. $L^B$ inspects (b', i, j) from its system B'' and then it sends b' to Alice's laboratory $L^A$, and $B_0$ ($B_1$) and $B_0''$ ($B_1''$) to Bob's laboratory $L_i^B$ ($L_j^B$). Bob's laboratory $L_i^B$ ($L_j^B$) obtains the value (b', i, j) from the system $B_0''$ ($B_1''$) and then applies a projective measurement $\tilde{M}_{0,b',i,j}^s$ ($\tilde{M}_{1,b',i,j}^s$) on $B_0$ ($B_1$) and obtains a classical outcome $e_i$ ($e_j$) which is its guess of the message $r_{b',i}$ ($r_{b',j}$).

In the procedure (2), $L^B$ applies the following quantum operation O' on AE', where $E' = EB_0''B_1''B''$: $L^B$ prepares the quantum system $B_0"B_1"B"$ in a quantum state $|\mu_{0,0,1}\rangle_{B_0"} \otimes |\mu_{0,0,1}\rangle_{B_1"} \otimes |\mu_{0,0,1}\rangle_{B"}$ it applies a unitary operation U on AE, and then it applies a unitary operation U' on the total system $B_0 B_1 B_0" B_1" B"$, where the joint system AE is partitioned into the subsystems $B_0$ and $B_1$ (as in the procedure (1)). The unitary operation U' consists in $L^B$ applying the quantum measurement $\tilde{M}'$ on $B_0 B_1$ and preparing each of the quantum systems $B_0"$, $B_1"$ and $B"$ in a quantum state $|\mu_{b',i,j}\rangle$, conditioned on the outcome of $\tilde{M}'$ being (b', i, j), where $\{|\mu_{b',i,j}\rangle | (b', i, j) \in \Gamma\}$ is an orthonormal basis of each of the quantum systems $B_0"$, $B_1"$ and $B"$, for (b', i, j)∈Γ. Conditioned on the outcome of $\tilde{M}'$ being (b', i, j), $L^B$ sends b' to Alice's laboratory $L^A$ in part of the system $B"$, and $L^B$ sends the joint system $B_0 B_0"$ ($B_1 B_1"$) to Bob's laboratory $L_i^B$ ($L_j^B$). A quantum measurement $\tilde{M}_0^s$ is applied on the joint system $B_0'=B_0 B_0"$, with $L_i^B$ obtaining the outcome $e_i$ from $B_0 B_0"$, which is its guess of $r_{b'-i}$. Bob's laboratory $L_j^B$ applies a quantum measurement $\tilde{M}_1^s$ on the joint system $B_1'=B_1 B_1"$ and obtains a classical outcome $e_j$, which is its guess of $r_{b'-j}$.

Now details are given of the procedures (1) and (2) described above. The quantum state $|\Psi_r^s\rangle_A$ is transmitted to Bob's laboratory $L^B$. Bob's laboratory $L^B$ introduces an ancillary system E', which includes a system E of arbitrary finite Hilbert space dimension and extra ancillary systems $B_0"$, $B_1"$ and $B"$, each one of Hilbert space dimension $m^2(m-1)$. The system E is set initially to an arbitrary quantum state $|\chi\rangle$, and the systems $B_0"$, $B_1"$ and $B"$ are set initially to the state $|\mu_{0,0,1}\rangle$, where $\{|\mu_{k,i,j}\rangle | (k, i, j) \in \Gamma\}$ is an orthonormal basis of $B_0"$, $B_1"$ and $B"$, and where $\Gamma = \{(k, i, j) \in I_m \times I_m \times I_m | i \neq j\}$. Bob's laboratory $L^B$ applies an arbitrary unitary operation U on the joint quantum system AE. The global state is transformed into the state $$|\Phi_r^s\rangle_{B_0 B_1} = U_{AE} |\Psi_r^s\rangle_A |\chi\rangle_E \quad (A1)$$

and where the joint quantum system AE is partitioned into two subsystems $B_0$ and $B_1$.

Consider the unitary operation U' applied on the whole system $AE'=B_0 B_1 B_0" B_1" B"$:

$$U' = \Sigma_{(b',i,j) \in \Gamma} (R_{b',i,j})_{B_0 B_1} \otimes (W_{b',i,j})_{B_0"} \otimes (W_{b',i,j})_{B_1"} \otimes (W_{b',i,j})_{B"}, \quad (A2)$$

where $W_{b',i,j}$ is a unitary operation acting on a Hilbert space of dimension $m^2(m-1)$ satisfying $W_{b',i,j} |\mu_{0,0,1}\rangle = |\mu_{b',i,j}\rangle$, for (b', i, j)∈Γ; and where $\tilde{M}' = \{R_{b',i,j}\}_{(b',i,j) \in \Gamma}$ is a projective measurement on $B_0 B_1$. Consider the projective measurement $\tilde{M}_{a,b',i,j}^s \{\Pi_{a,s,b',i,j}\}_{e \in \Omega}$ on $B_a$, for a∈{0,1}, (b', i, j)∈Γ and s∈$\Omega_{basis}$, where $\Omega_{basis}$ is the set of possible values of s. Consider the projectors $$\Pi_{0,s}^e = \Sigma_{(b',i,j) \in \Gamma} (\Pi_{0,s,b',i,j}^e)_{B_0} \otimes (|\mu_{b',i,j}\rangle\langle\mu_{b',i,j}|)_{B_0"} \otimes 1_{B"}, \quad (A3)$$

acting on $B_0' = B_0 B_0" B"$, and the projectors $$\prod_{1,s}^e = \sum_{(b',i,j) \in \Gamma} (\prod_{1,s,b',i,j}^e)_{B_1} \otimes (|\mu_{b',i,j}\rangle\langle\mu_{b',i,j}|)_{B_1"}, \quad (A4)$$

acting on $B_1' = B_1 B_1"$, for e∈Ω and s∈$\Omega_{basis}$. It is straightforward to see that $\tilde{M}_a^s = \{\Pi_{a,s}^e\}_{e \in \Omega}$ is a projective measurement acting on $B_a'$, for a∈{0,1} and s∈$\Omega_{basis}$.

It is straightforward to see that, for any pair of different numbers i, j∈$I_m$, the joint probability that $L_i^B$ obtains a particular outcome $e_i$ as its guess of $r_{b'-i}$ and $L_j^B$ obtains a particular outcome $e_j$ as its guess of $r_{b'-j}$ in procedure (1) is the same in procedure (2), for any $e_i$, $e_j \in \Omega$, as claimed.

What is claimed is:

1. A method for performing spacetime-constrained oblivious transfer between a plurality of laboratories of a first party A and a plurality of laboratories of a second party B, comprising:

providing the spacetime-constrained oblivious transfer to satisfy a first condition by a first spacetime region $R_j$ and a second spacetime region $R_k$ that there does not exist any causal curve in spacetime that connects any spacetime point of the first spacetime region $R_j$ to any spacetime point of the second spacetime region $R_k$;

encoding, by the plurality of laboratories of the first party A, a first plurality of messages $r_i$ in a quantum state selected from a plurality of non-orthogonal quantum states;

transmitting, by the plurality of laboratories of the first party A, the quantum state to a first laboratory $L^B$ of the second party B;

applying, by the first laboratory $L^B$ of the second party B, a quantum measurement on the quantum state to obtain a classical measurement outcome;

transmitting, by the first laboratory $L^B$ of the second party B, the classical measurement outcome to a plurality of laboratories of the second party B, wherein communication among different laboratories of the second party B is only classical, and wherein communication over distant laboratories of the plurality of laboratories of the first party A and the plurality of laboratories of the second party B is only classical; and providing the spacetime-constrained oblivious transfer to satisfy a second condition selected from a group consisting of:

(2.1) a plurality of laboratories of the second party B receive, in the causal past of at least one spacetime point of the first spacetime region $R_j$, a second plurality of messages comprising information about the quantum state from a plurality of laboratories of the first party A, and the classical measurement outcome obtained by the first laboratory $L^B$ of the second party B;

a plurality of laboratories of the second party B use the classical measurement outcome received from the first laboratory $L^B$ of the second party B and the messages received from the plurality of laboratories of the first party A to decode, in a plurality of spacetime regions comprising the first spacetime region $R_j$, a first message from the first plurality of messages $r_i$ encoded by the plurality of laboratories of the first party A; and no laboratory among the plurality of laboratories of the second party B can decode, in the second spacetime region $R_k$, a second message from the first plurality of messages $r_i$ encoded by the plurality of laboratories of the first party A; and (2.2) no laboratory among the plurality of laboratories of the second party B receive, in the causal past of any spacetime point of the first spacetime region $R_j$, any message comprising information about the quantum state from the plurality of laboratories of the first party A; and no laboratory among the plurality of laboratories of the second party B can decode, in the first spacetime region $R_j$, any message from the first plurality of messages $r_i$ encoded by the plurality of laboratories of the first party A.

2. The method of claim 1, wherein communication among the distant laboratories is implemented via internet channels.

3. The method of claim 1, wherein the plurality of laboratories of the first party A cannot determine which message from the first plurality of messages $r_i$ is obtained by the plurality of laboratories of the second party B, and wherein this condition may be provided with unconditional security.

4. The method of claim 1, wherein the condition (2.1) is satisfied with unconditional security.

5. The method of claim 1, wherein, for some integer m≥2, the first plurality of messages $r_i$ encoded in the quantum state by the plurality of laboratories of the first party A are m messages $r_0$, $r_1, \ldots, r_{m-1}$;

the transmitted quantum state belong to a set of non-orthogonal quantum states $$\{|\Psi_r^s\rangle | r \in \Omega_{outcome}, s \in \Omega_{basis}\}$$

labelled by classical messages $r \in \Omega_{outcome}$ and $s \in \Omega_{basis}$, wherein $r \in \Omega_{outcome}$ are strings of m messages given by $r=(r_0, r_1, \ldots, r_{m-1})$, and wherein $\Omega_{outcome}$ is the set of possible values of r and $\Omega_{basis}$ is the set of possible values of s;

the applied quantum measurement is a measurement $M_c$ that belongs to a set of measurements $\{M_i\}_{i \in I_m}$, wherein $c \in I_m \equiv \{0, 1, \ldots, m-1\}$;

the set of quantum states $$\{|\Psi_r^s\rangle | r \in \Omega_{outcome}, s \in \Omega_{basis}\},$$

the probability distributions for $r \in \Omega_{outcome}$ and for $s \in \Omega_{basis}$, and the set of measurements $\{M_i\}_{i \in I_m}$ satisfy the following properties:

by applying the quantum measurement $M_c$ on the quantum state $|\Psi_r^s\rangle$, and knowing the measurement outcome, knowing the measurement $M_c$ that is implemented, and knowing the message s, it is possible to decode the message $r_c$, or a message $r'_c$ that is very close to $r_c$ according to a predetermined threshold, with a probability equal to unity, or close to unity, for $r \in \Omega_{outcome}$, $s \in \Omega_{basis}$ and $c \in I_m$;

for any pair of different numbers i, j from the set $I_m$, for any quantum operation O independent of s and independent of r acting on the quantum state $|\Psi_r^s\rangle$ that produces at least two quantum systems $B_0$ and $B_1$, and for any sets of quantum measurements $$\{\tilde{M}_0^s\}_{s \in \Omega_{basis}} \text{ and } \{\tilde{M}_0^s\}_{s \in \Omega_{basis}},$$

the probability to obtain respective outcomes $r'_i$ and $r'_j$ that are respectively close to $r'_i$ and $r'_j$ according to a predetermined threshold, by respectively applying $\tilde{M}_0^s$ on $B_0$ and $\tilde{M}_1^s$ on $B_1$, is smaller than unity, which may be negligible, and which may decrease exponentially with some security parameter, which may comprise the number n of bits of the messages $r_i$ if the messages $r_i$ are strings of bits, for $i \in I_m$.

6. The method of claim 1, wherein the first plurality of messages $r_i$ encoded by the plurality of laboratories of the first party A in the quantum state that is transmitted to the first laboratory $L^B$ of the second party B, and the second plurality of messages transmitted by the plurality of laboratories of the first party A to the plurality of laboratories of the second party B, are used by the plurality of laboratories of the first party A to encode a third plurality of messages $x_a$.

7. The method of claim 1, wherein the first and second spacetime regions $R_j$ and $R_k$ are different elements from a set of M different spacetime regions $R_0, R_1, \ldots, R_{M-1}$ specified by the plurality of laboratories of parties A and B, for some integer M≥2, satisfying the property that there does not exist any causal curve in spacetime that connects any spacetime point of $R_a$ to any spacetime point of $R_{a'}$, for any pair of different numbers a and a' from the set $I_M \equiv \{0, 1, \ldots, M-1\}$.

8. The method of claim 1, wherein, for some integer m≥2, the first plurality of messages $r_i$ encoded in the quantum state by the plurality of laboratories of the first party A are m messages $r_0$, $r_1, \ldots, r_{m-1}$;

the transmitted quantum state belong to a set of non-orthogonal quantum states $$\{|\Psi_r^s\rangle | r \in \Omega_{outcome}, s \in \Omega_{basis}\}$$

labelled by classical messages $r \in \Omega_{outcome}$ and $s \in \Omega_{basis}$, wherein $r \in \Omega_{outcome}$ are strings of m messages given by $r=(r_0, r_1, \ldots, r_{m-1})$, and wherein $\Omega_{outcome}$ is the set of possible values of r and $\Omega_{basis}$ is the set of possible values of s;

the applied quantum measurement is a measurement $M_c$ that belongs to a set of measurements $\{M_i\}_{i \in I_m}$, wherein $c \in I_m \equiv \{0, 1, \ldots, m-1\}$;

the condition (2.1) further comprises the condition:

(2.1.1) a laboratory $L_j^A$ of the first party A transmits the value of s within a third spacetime region $Q_j$, wherein the third spacetime region $Q_j$ satisfies a first property that it lies within the causal past of at least one spacetime point of the first spacetime region $R_j$, and a second property that it is not in the causal past of any spacetime point of the second spacetime region $R_k$;

a laboratory $L_j^B$ of the second party B receives, within the causal past of at least one spacetime point of the first spacetime region $R_j$, the value of s from the laboratory $L_j^A$ of the first party A and the classical measurement outcome obtained by the first laboratory $L^B$ of the second party B;

the laboratory $L_j^B$ of the second party B knows, in the causal past of at least one spacetime point of the first spacetime region $R_j$, the label c of the quantum measurement $M_c$ implemented by the first laboratory $L^B$ of the second party B;

the laboratory $L_j^B$ of the second party B uses the classical measurement outcome, the value of s, and the label c of the implemented measurement $M_c$, to decode a message $r'_c$ that is equal to the message $r_c$, or close to $r_c$ according to a predetermined threshold, with a probability that is equal to unity, or close to unity, in the first spacetime region $R_j$, or in the causal past of at least one spacetime point of the first spacetime region $R_j$;

no laboratory among the plurality of laboratories of the second party B can decode, in the second spacetime region $R_k$, a message $r'_i$ that is equal to the message $r_i$, or close to $r_i$ according to a predetermined threshold, with a probability that is equal to unity, or close to unity, for any $i \in I_m$ with i≠c; and the condition (2.2) further comprises the condition:
(2.2.1) no laboratory among the plurality of laboratories of the second party B receives, in the causal past of any spacetime point of the first spacetime region $R_j$, any message including information about the value of s from a plurality of laboratories of the first party A; and no laboratory among the plurality of laboratories of the second party B can decode, in the first spacetime region $R_j$, any message from the first plurality of messages $r_0, r_1, \ldots, r_{m-1}$ encoded by the plurality of laboratories of the first party A.

9. The method of claim 1, wherein,
for an integer m≥2, the first plurality of messages $r_i$ encoded in the quantum state by the plurality of laboratories of the first party A are m messages $r_0, r_1, \ldots, r_{m-1}$;
the transmitted quantum state belong to a set of non-orthogonal quantum states $$\{|\Psi_r^s\rangle | r \in \Omega_{outcome}, s \in \Omega_{basis}\}$$

labelled by classical messages $r \in \Omega_{outcome}$ and $s \in \Omega_{basis}$, wherein $r \in \Omega_{outcome}$ are strings of m messages given by $r = (r_0, r_1, \ldots, r_{m-1})$, and wherein $\Omega_{outcome}$ is the set of possible values of r and $\Omega_{basis}$ is the set of possible values of s;
the set of quantum states $$\{|\Psi_r^s\rangle | r \in \Omega_{outcome}, s \in \Omega_{basis}\}$$

and the probability distributions for $r \in \Omega_{outcome}$ and $s \in \Omega_{basis}$ satisfy a plurality of conditions selected from a group consisting of:
the quantum states $|\Psi_r^s\rangle$ cannot be effectively cloned without knowing s,
the quantum states $|\Psi_r^s\rangle$ and $|\Psi_r^{s'}\rangle$ are not orthogonal for any pair of different messages s and s' from the set $\Omega_{basis}$, and for a plurality of messages $r \in \Omega_{outcome}$,
the message r is generated from the set $\Omega_{outcome}$ with a probability distribution that is random, or very close to be random, and
the value of s is generated from the set $\Omega_{basis}$ with a probability distribution that is random, or very close to be random.

10. The method of claim 1, wherein the spacetime-constrained oblivious transfer satisfies a plurality of conditions selected from a group consisting of:
the plurality of laboratories of the first party A and the plurality of laboratories of the second party B are secure,
messages communicated among the plurality of laboratories of the second party B are communicated through communication channels that comprise a plurality of classical communication channels, which may be secure and authenticated, and
messages communicated among the plurality of laboratories of the first party A are communicated through communication channels comprising a plurality of classical communication channels, which may be secure and authenticated.

11. The method of claim 1, wherein a plurality of laboratories of the first party A and a plurality of laboratories of the second party B align spacetime reference frames.

12. The method of claim 1, wherein if in the transmission of the quantum state from the plurality of laboratories of the first party A to the first laboratory $L^B$ of the second party B, signals are sent from a plurality of laboratories of the second party B to a plurality of laboratories of the second party A then the signals do not leak more than a predetermined amount of information about the quantum measurement that is implemented on the transmitted quantum state.

13. The method of claim 1, wherein the spacetime-constrained oblivious transfer satisfies a plurality of conditions selected from a group consisting of:
the transmitted quantum state is the tensor product of qubit states;
the transmitted quantum state is the tensor product of qubit states that are selected from the set of BB84 states;
the transmitted quantum state is encoded in a plurality of photons;
the transmitted quantum state is encoded in polarization degrees of freedom of photons;
the transmission of the quantum state to the first laboratory $L^B$ of the second party B includes a step comprising the exchange of weak coherent states with small average photon number between a plurality of laboratories of the first party A and the first laboratory $L^B$ of the second party B; and
the transmission of the quantum state to the first laboratory $L^B$ of the second party B includes a step comprising the communication of classical messages from the first laboratory $L^B$ of the second party B to a plurality of laboratories of the first party A indicating a quantum system to which the quantum state is transmitted.

14. The method of claim 1, wherein the first plurality of messages encoded by the plurality of laboratories of the first party A in the quantum state that is transmitted to the first laboratory $L^B$ of the second party B, and the second plurality of messages transmitted by the plurality of laboratories of the first party A to the plurality of laboratories of the second party B, are used by the plurality of laboratories of the first party A to encode information about the trajectory of a plurality of moving objects.

15. The method of claim 9, wherein
for some integer m≥2, the plurality of messages $r_i$ encoded in the quantum state by the plurality of laboratories of the first party A are m messages $r_0, r_1, \ldots, r_{m-1}$;
the transmitted quantum state belong to a set of non-orthogonal quantum states $$\{|\Psi_r^s\rangle | r \in \Omega_{outcome}, s \in \Omega_{basis}\}$$

labelled by classical messages $r \in \Omega_{outcome}$ and $s \in \Omega_{basis}$, wherein $r \in \Omega_{outcome}$ are strings of m messages given by $r = (r_0, r_1, \ldots, r_{m-1})$, and wherein $\Omega_{outcome}$ is the set of possible values of r and $\Omega_{basis}$ is the set of possible values of s;
for $i \in I_m = \{0, 1, \ldots, m-1\}$, the messages $r_i$ are of the form $r_i = (r_i^1, r_i^2, \ldots, r_i^n) \in \Omega^n$, i.e. with $r_i^j \in \Omega$, for $j \in [n]$, wherein $\Omega$ is a set of l≥2 different elements, and wherein $[n] = \{1, 2, \ldots, n\}$;
the messages $s \in \Omega_{basis}$ are of the form $s = (s^1, s^2, \ldots, s^n) \in \Lambda^n$, i.e. with $s^i \in \Lambda$, wherein $s^j = (s_0^j, s_1^j, \ldots, s_{m-1}^j)$, for $j \in [n]$, wherein $\Lambda = \{(a_0, a_1, \ldots, a_{m-1}) | a_i \in I_m$ and $a_i \neq a_{i'}$, if $i \neq i'$, for i, i'$\in I_m$}, i.e. the set $\Lambda$ is in one-to-one correspondence with the set of permutations of m distinct elements;

the quantum state $|\Psi_r^s\rangle$ is transmitted to a quantum system with Hilbert space A at the first laboratory $L^B$ of the second party B, wherein the Hilbert space A is of the form $$A = \bigotimes_{i \in I_m, j \in [n]} A_i^j,$$

with the dimension of the Hilbert space $A_i^j$ being equal to 1, for all $i \in I_m$ and for all $j \in [n]$;

the transmitted quantum state is of the form $$|\Psi_r^s\rangle_A = \bigotimes_{i \in I_m, j \in [n]} \left|\alpha_{r_i^j}^i\right\rangle_{A_i^j_{s_i^j}},$$

with the set of quantum states $\mathcal{D}_i = \{|\alpha_r^i\rangle\}_{r \in \Omega}$ being an orthonormal basis of an l-dimensional Hilbert space, for $i \in I_m$; and it holds that $\lambda < 1$, wherein $$\lambda = \max_{i \neq i'} |\langle \alpha_r^i | \alpha_{r'}^{i'} \rangle|^2,$$

and wherein the maximum is taken over all r, r'$\in \Omega$ and over all i, i'$\in I_m$ with $i \neq i'$.

\* \* \* \* \*